(12) United States Patent
Kwon et al.

(10) Patent No.: US 11,665,363 B2
(45) Date of Patent: May 30, 2023

(54) METHOD, APPARATUS, SYSTEM AND COMPUTER-READABLE RECORDING MEDIUM FOR FEATURE MAP INFORMATION

(71) Applicant: Electronics and Telecommunications Research Institute, Daejeon (KR)

(72) Inventors: Hyoung-Jin Kwon, Daejeon (KR); Ji-Hoon Do, Daejeon (KR); Dong-Hyun Kim, Daejeon (KR); Youn-Hee Kim, Daejeon (KR); Jong-Ho Kim, Daejeon (KR); Joo-Young Lee, Daejeon (KR); Se-Yoon Jeong, Daejeon (KR); Jin-Soo Choi, Daejeon (KR); Tae-Jin Lee, Daejeon (KR); Jee-Hoon Kim, Seoul (KR); Dong-Gyu Sim, Seoul (KR); Seoung-Jun Oh, Seongnam-si (KR); Min-Hun Lee, Uijeongbu-si (KR); Yun-Gu Lee, Seongnam-si (KR); Han-Sol Choi, Dongducheon-si (KR); Kwang-Hwan Kim, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/535,926

(22) Filed: Nov. 26, 2021

(65) Prior Publication Data
US 2022/0167000 A1 May 26, 2022

(30) Foreign Application Priority Data

Nov. 26, 2020 (KR) .................. 10-2020-0161700
Nov. 19, 2021 (KR) .................. 10-2021-0160528

(51) Int. Cl.
*H04N 19/503* (2014.01)
*H04N 19/11* (2014.01)

(52) U.S. Cl.
CPC .......... *H04N 19/503* (2014.11); *H04N 19/11* (2014.11)

(58) Field of Classification Search
None
See application file for complete search history.

(56) References Cited

U.S. PATENT DOCUMENTS 10,257,528 B2   4/2019   Jeong et al.
10,733,767 B2 * 8/2020   Cho .................... G06N 3/0454
(Continued)

FOREIGN PATENT DOCUMENTS

KR   1020160096460 A   8/2016
KR   1020180131073 A   12/2018

*Primary Examiner* — Chikaodili E Anyikire
(74) *Attorney, Agent, or Firm* — William Park & Associates Ltd.

(57) ABSTRACT

Disclosed herein are a method, apparatus, system, and computer-readable recording medium for image compression. An encoding apparatus performs preprocessing of feature map information, frame packing, frame classification, and encoding. A decoding apparatus performs decoding, frame depacking, and postprocessing in order to reconstruct feature map information. By encoding the feature map information, inter-prediction and intra-block prediction for a frame are performed. The encoding apparatus provides the decoding apparatus with a feature map information bitstream for reconstructing the feature map information along with an image information bitstream.

18 Claims, 65 Drawing Sheets

(56) References Cited

U.S. PATENT DOCUMENTS

| | | | |
|---|---|---|---|
| 11,030,480 B2* | 6/2021 | Cho | H04N 19/103 |
| 11,375,204 B2* | 6/2022 | Zhang | H04N 19/103 |
| 2017/0011288 A1* | 1/2017 | Brothers | G06F 9/3017 |
| 2018/0224950 A1 | 8/2018 | Kim et al. | |
| 2018/0350110 A1* | 12/2018 | Cho | G06V 10/454 |
| 2019/0220742 A1* | 7/2019 | Kuo | G06N 3/063 |
| 2019/0347526 A1* | 11/2019 | Sunkavalli | G06N 3/084 |
| 2020/0234099 A1* | 7/2020 | Wang | G06N 3/0454 |
| 2021/0021866 A1* | 1/2021 | Djokovic | G06N 3/04 |
| 2022/0116627 A1* | 4/2022 | Liu | H04N 19/154 |
| 2022/0132125 A1* | 4/2022 | Yao | H04N 19/85 |

\* cited by examiner

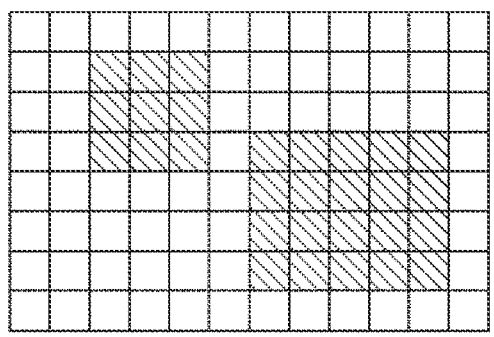
CHANNEL
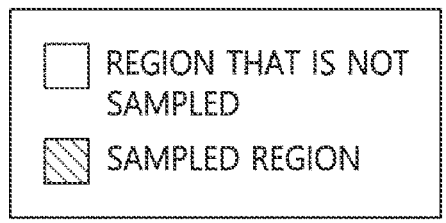
FIG. 12

```
PredictionUnit {
    prediction_type
    if(prediction_type == INTRA)
        ...
    else if(prediction_type == INTER)
    {
        num_of_predictor
        for(i = 0; 1 < num_of_predictor; i++)
        {
            ref_pic_idx
            if(same_type_packing_unit_in_ref_pic)
            {
                packing_unit_idx
            }
            else
            {
                motion_vector
            }
        }
    }
    else if(prediction_type == INTRA_BLOCK)
    {
        for(i = 0; 1 < num_of_predictor; i++)
        {
            if(same_type_packing_unit_in_curr_pic)
            {
                packing_unit_idx
            }
            else
            {
                motion_vector
            }
        }
    }
}
```

FIG. 59

```
Video_Frame_Feature_Info_Parameter_Set {
  featuremap_num
  for(i = 0; i < featuremap_num; i++)
  {
    featuremap_idx
    transfrom_flag
    if(transform_flag == 1)
    {
      matrix_flag
      if(matrix_flag == 1)
      {
        matrix_width
        matrix_height
        matrix_depth
      }
      mean_channel_flag
      if(mean_channel_flag == 1)
      {
        mean_channel_weidth
        mean_channel_height
        mean_channel_depth
      }
      coef_width
      coef_height
      coef_depth
    }
    else
    {
      featuremap_width
      featuremap_height
      featuremap_depth
    }
  }
}
```

FIG. 60

```
featuremap_num = 3

First_feature_map
{
featuremap_idx = 0
transform_flag = 0
coef_width = 512
coef_height = 256
coef_depth = 256
}
Second_feature_map
{
featuremap_idx = 1
transform_flag = 0
coef_width = 256
coef_height = 128
coef_depth = 256
}

Third_feature_map
{
featuremap_idx = 2
transform_flag = 0
coef_width = 128
coef_height = 64
coef_depth = 256
}
```

FEATURE MAP 0   FEATURE MAP 1   FEATURE MAP 2

```
Video_Frame_Feature_Info_Parameter_Set {
  feature_frame_width
  feature_frame_height
  same_category_flag
  if(!same_category_flag)
    packing_unit_category_num
  for(i = 0; i < packing_unit_category_num; i++)
  {
    packing_unit_num
    reordering_flag
    if(reordering_flag)
    {
      for(i = 0; i < packing_unit_num; i++)
        reordering_index[i]
    }
    input_domain_info
    featuremap_level
    if(Featuremap_is_transformed)
    {
      transform_data_type
      start_idx
      end_idx
    }
    else
    {
      start_idx
      end_idx
    }
  }
}
```

FIG. 62

METHOD, APPARATUS, SYSTEM AND COMPUTER-READABLE RECORDING MEDIUM FOR FEATURE MAP INFORMATION

CROSS REFERENCE TO RELATED APPLICATIONS

This application claims the benefit of Korean Patent Application No. 10-2020-0161700, filed Nov. 26, 2020, and No. 10-2021-0160528, filed Nov. 19, 2021, which are hereby incorporated by reference in their entireties into this application.

BACKGROUND OF THE INVENTION

1. Technical Field

The following embodiments relate generally to a method, apparatus, system and computer-readable recording medium for image compression, and more particularly, a method, apparatus, system, and computer-readable recording medium for feature map information are disclosed.

2. Description of the Related Art

A Video Coding for Machines (VCM) encoder encodes input image information or feature map information extracted from the input image information and transmits the encoded input image information or the encoded feature map information.

A VCM decoder receives a bitstream of image information or feature map information as the input thereof and outputs image information that is reconstructed using the input bitstream. Also, the decoder performs one or multiple tasks according to an application using feature map information that is reconstructed using the input bitstream.

SUMMARY OF THE INVENTION

An embodiment may provide an apparatus, method, system, and recording medium for reordering and packing feature map information and image information in a form for input to an encoding apparatus.

An embodiment may provide an apparatus, method, system, and recording medium for predicting information generated by reordering and packing.

An embodiment may provide an apparatus, method, system, and recording medium for splitting feature map information and image information.

An embodiment may provide an apparatus, method, system, and recording medium for reordering and packing information, generated by splitting feature map information and image information, into a form facilitating an encoding procedure.

An embodiment may provide an apparatus, method, system, and recording medium for encoding information, generated by reordering and packing, by predicting the information.

An embodiment may provide an apparatus, method, system, and recording medium for generating a bitstream by encoding information generated by reordering and packing and for storing and transmitting the bitstream.

An embodiment may provide an apparatus, method, system, and recording medium for receiving a bitstream, decoding the received bitstream, and performing depacking and inverse reordering using information transmitted through the bitstream.

An embodiment may provide an apparatus, method, system, and recording medium for using the results of depacking and inverse reordering for a machine-learning task of a neural network.

According to one aspect, there is provided an encoding method including generating feature map information based on image information; and performing packing of the feature map information.

Performing the packing of the feature map information may include performing reordering of the feature map information into a reordering unit; and performing the packing of the feature map information to which the reordering is applied.

The reordering may be performed based on a specific axis of input multi-dimensional information.

The packing may comprise splitting input multi-dimensional information based on a specific axis of the multi-dimensional information and concatenating pieces of information generated by the split in a specific order, thereby a frame.

The frame may be configured to have a rectangular shape by padding for the frame in a case that the frame does not have a rectangular shape.

The encoding method may further include generating a feature map information bitstream by performing encoding on the frame.

When the encoding is performed, inter-prediction using a reconstructed frame is performed, whereby a prediction block for a current block of a current frame may be generated.

The reconstructed frame is a frame to which packing is applied.

A first location corresponding to the current block may be acquired in a reconstructed frame, A second location corresponding to the current block in a second packing unit having the same category as a category of a first packing unit comprising the current block may be derived in a specific region determined based on the acquired first location.

The prediction block may be generated with reference to the derived second location.

A scale of the first packing unit may be derived through a comparison with the second packing unit.

The corresponding second location may be derived in consideration of the scale.

One or more prediction blocks may be searched for in the reconstructed frame.

The prediction block may be generated through weighted addition of the one or more prediction blocks.

A weight of the weighted addition may be determined based on a distance or a picture order count between a current frame comprising the current block and the reconstructed frame comprising the prediction block Filtering may be performed for the one or more prediction blocks.

When the encoding is performed, a prediction block for the current block may be generated by performing intra block prediction using already reconstructed information of the fame including a current block.

a size of a packing unit of the packing may be w×h, and when the prediction block is searched for, a size of a vertical motion vector of a block motion vector indicating the prediction block may be integer multiples of w, and a size of a horizontal motion vector of the block motion vector is integer multiples of h.

Searching of a region may be limited in a case that a packing unit comprising the region having an already reconstructed information accessed through the block motion vector is different from a packing unit comprising the current block.

A size of the prediction block may be determined based on a first scale and a second scale in a case the first scale of a packing unit having an already reconstructed information accessed through the block motion vector is different from the second scale of a packing unit comprising the current block.

A correction for the prediction block may be performed based on an error between specific samples of the current block and a mapping function using specific samples of the prediction block.

one or more prediction blocks may be searched for in the frame.

the prediction block may be generated through weighted addition of the one or more prediction blocks.

In another aspect, there may be provided a decoding method including generating reconstructed feature map information by performing decoding on encoded feature map information of a feature map information bitstream; and generating postprocessed reconstructed feature map information by performing postprocessing on the reconstructed feature map information.

According to a further aspect, there is provided a non-transitory computer-readable recoding medium for storing a bitstream, the bitstream includes encoded feature map information, reconstructed feature map information is generated by performing decoding on the encoded feature map information, and postprocessed reconstructed feature map information is generated by performing postprocessing on the reconstructed feature map information.

BRIEF DESCRIPTION OF THE DRAWINGS

The above and other objects, features, and advantages of the present invention will be more clearly understood from the following detailed description taken in conjunction with the accompanying drawings, in which:

FIG. 12 illustrates a sampling method using feedback according to an embodiment;

FIG. 59 illustrates the syntax of a prediction unit according to an example;

FIG. 60 illustrates the syntax of a video frame feature information parameter set according to an example;

FIG. 62 illustrates the syntax of a video frame feature parameter set according to an example;

DESCRIPTION OF THE PREFERRED EMBODIMENTS

Figure 1:
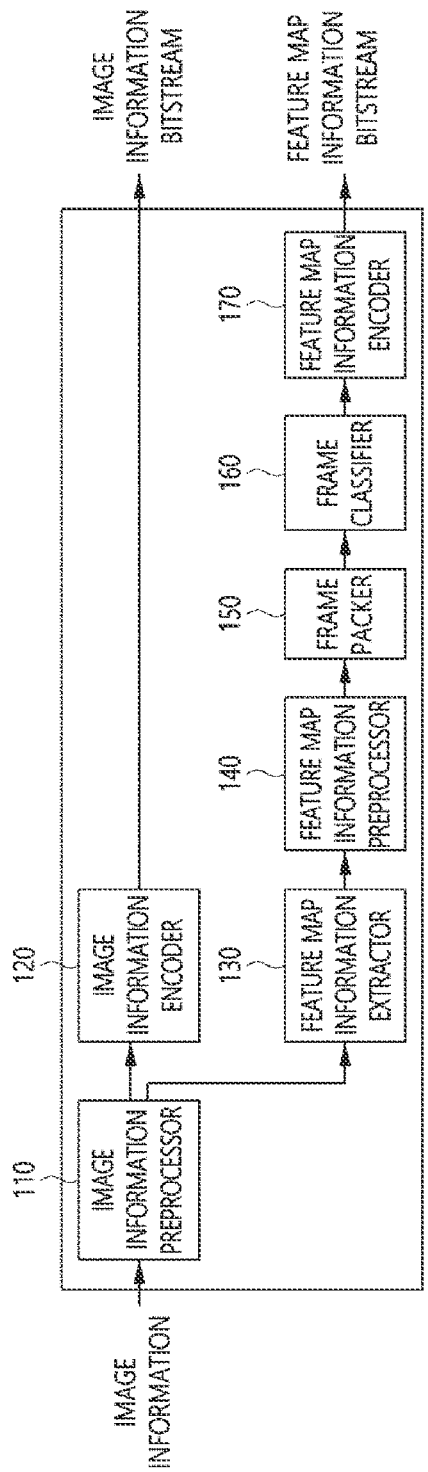
FIG. 1 is a structural diagram of an encoding apparatus according to an embodiment.

Hereinafter, embodiments will be described in detail with reference to the accompanying drawings. It should be understood that the embodiments differ from each other, but are not necessarily mutually exclusive.

The terms used in describing the embodiments are to be interpreted based on substantial meanings thereof and the whole context of the present specification, rather than simply based on the names of the terms.

In the embodiments, a connection between a specific part and another part may include not only a direct connection therebetween but also an indirect connection, through which the two parts are connected via an intervening part therebetween. The same reference numerals in the drawings designate corresponding portions.

Detailed descriptions of the following exemplary embodiments will be made with reference to the accompanying drawings illustrating specific embodiments. These embodiments are described in detail so that those having ordinary knowledge in the technical field to which the present disclosure pertains can practice the embodiments. It should be understood that the various embodiments differ from each other, but are not necessarily mutually exclusive. For example, specific shapes, structures, and characteristics described herein may be implemented as other embodiments without departing from the spirit and scope of the present disclosure in relation to an embodiment. Further, it should be understood that the locations or arrangement of individual components in each of the disclosed embodiments can be changed without departing from the spirit and scope of the present disclosure. Therefore, the following detailed description is not to be taken in a limiting sense, and the scope of the present disclosure is limited only by the accompanying claims along with equivalents thereof, as long as they are appropriately described.

In the drawings, similar reference numerals designate the same or similar functions in various aspects. The shapes, sizes, and the like of components in the drawings may be exaggerated to make the description clear.

The terms used in connection with the embodiments are for the purpose of describing the embodiments and are not intended to limit the present disclosure. In the embodiments, the singular forms are intended to include the plural forms as well, unless the context clearly indicates otherwise. The terms "comprises" and/or "comprising" used herein mean that additional components may be included in the practice or the technical spirit of exemplary embodiments, but do not preclude the presence or addition of components, steps, operations, and/or elements other than the stated components, steps, operations, and/or elements. It will be understood that, when a component is referred to as being "connected" or "coupled" to another component, the two components can be directly connected or coupled to each other, or an intervening component may be present therebetween.

Although the terms "first," "second," etc. may be used herein to describe various components, these components should not be limited by these terms. These terms are only used to distinguish one component from another component. For example, a first component could be termed a second component without departing from the teachings of the present disclosure. Similarly, the second component could also be termed the first component.

Also, components described in connection with the embodiments are illustrated as being separate in order to indicate the different characteristic functions thereof, but this does not mean that each of the components is formed of a separate piece of hardware or software. That is, the components are arranged as respective components for convenience of description. For example, at least two of the components may be combined into one component, or one component may be further divided into multiple components. An embodiment in which the components are integrated or an embodiment from which some components are removed is also included in the scope of the present disclosure as long as it does not depart from the essence of the present disclosure.

Also, some components are not essential components for performing essential functions, but may be optional components merely for improving performance. Embodiments may be implemented using only essential components for implementing the essence of the embodiments, and for example, a structure from which optional components, such as components used merely to improve performance, are excluded is also included in the scope of the present disclosure.

Hereinafter, embodiments will be described in detail with reference to the accompanying drawings so that those having ordinary knowledge in the technical field to which the present disclosure pertains can easily practice the embodiments. When the embodiments are described, descriptions of known functions and configurations which have been deemed to unnecessarily obscure the gist of the present disclosure will be omitted below.

In an embodiment, an image may indicate multiple images or video.

Structure and Function of Encoding Apparatus

FIG. 1 is a structural diagram of an encoding apparatus according to an embodiment.

The encoding apparatus 100 may perform encoding on feature map information and image information.

The encoding apparatus 100 may include an image information preprocessor 110, an image information encoder 120, a feature map information extractor 130, a feature map information preprocessor 140, a frame packer 150, a frame classifier 160, and a feature map information encoder 170.

Image information may be input to the encoding apparatus 100. The image information may be information representing an original image.

Also, feedback information may be input to the encoding apparatus 100.

The encoding apparatus 100 may output an image information bitstream and a feature map information bitstream.

In embodiments, the image information bitstream may be referred to as a first bitstream. The feature map information bitstream may be referred to as a second bitstream.

The functions, operations, and the like of the image information preprocessor 110, the image information encoder 120, the feature map information extractor 130, the feature map information preprocessor 140, the frame packer 150, the frame classifier 160, and the feature map information encoder 170 will be described in more detail below.

Figure 2:
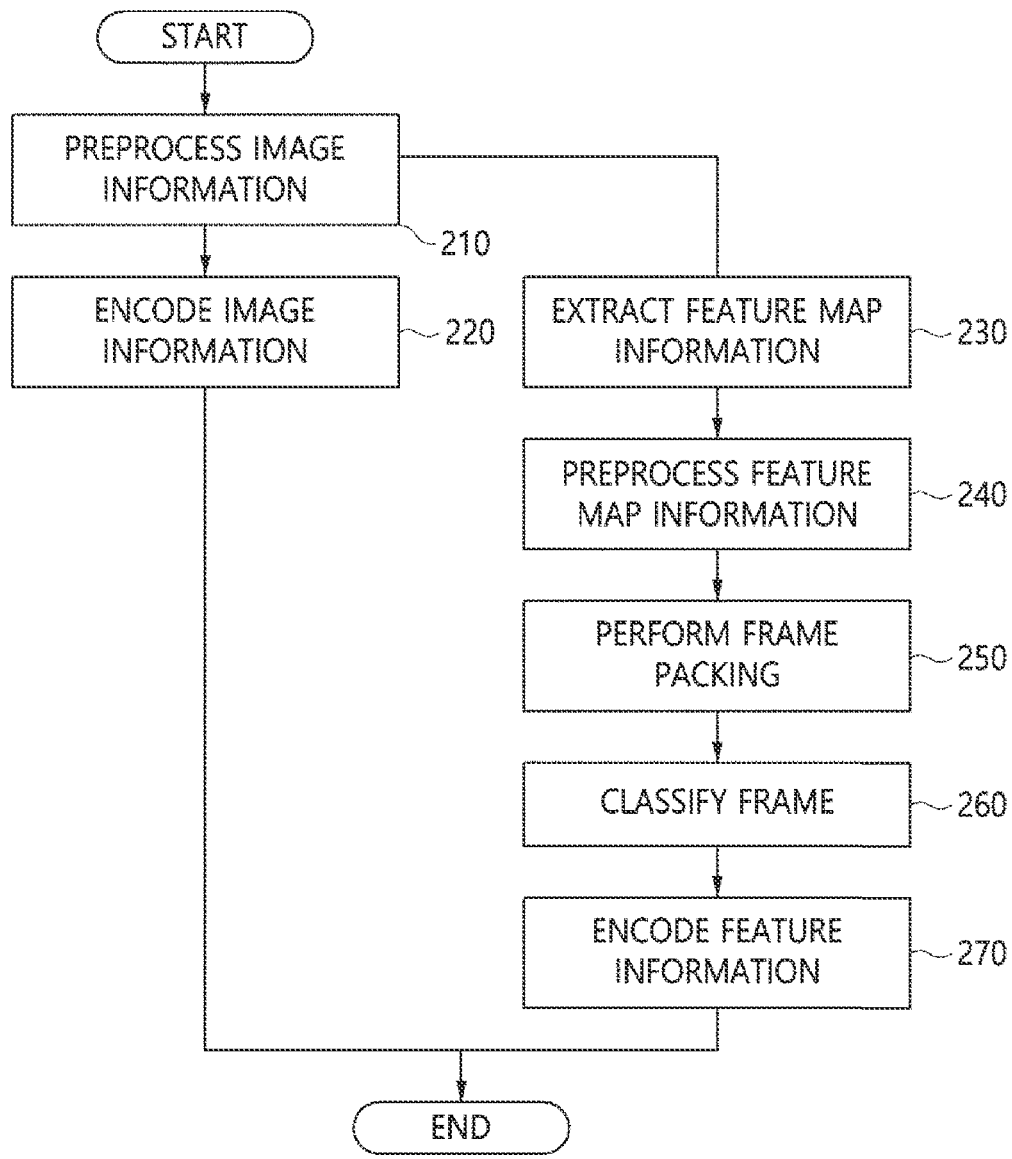
FIG. 2 is a flowchart of a method for encoding feature map information and image information according to an embodiment.

FIG. 2 is a flowchart of a method for encoding feature map information and image information according to an embodiment.

Image information may be input to the image information preprocessor 110.

At step 210, the image information preprocessor 110 performs preprocessing on the image information, thereby generating preprocessed image information.

In an embodiment, the preprocessing may include one or more of color format transformation and sub-sampling. The sub-sampling may include one or more of resolution sub-sampling, temporal sub-sampling, and spatial sub-sampling.

Feedback information may be information that is transmitted from a decoding apparatus 3800 to the encoding apparatus 100.

The preprocessed image information may be input to the image information encoder 120.

The preprocessing at step 210 may be optionally performed. When preprocessing is not performed, the preprocessed image information in the embodiments may be considered the image information.

At step 220, the image information encoder 120 performs encoding on the preprocessed image information (or the image information), thereby generating encoded image information.

The image information encoder 120 may output an image information bitstream including the encoded image information.

The image information bitstream may include information indicating the preprocessing performed by the image information preprocessor 110. The information indicating the preprocessing may specify the types of preprocessing performed by the image information preprocessor 110.

The image information encoder 120 may generate reconstructed image information and an image information bitstream.

In an embodiment, the image information encoder 120 performs decoding on the encoded image information, thereby generating reconstructed image information. That is, the reconstructed image information may be an image acquired by the decoding apparatus 3800 to be described later performing decoding on the encoded image information of the image information bitstream.

The image information encoder 120 may output the reconstructed image information to the feature map information extractor 130.

At step 230, the feature map information extractor 130 may extract feature map information from the image information or the preprocessed image information output from the image information preprocessor 110.

In embodiments, the feature map information may comprise one or more pieces of feature map information.

The feature map information extractor 130 may extract the feature map information using a single frame of the image information or the preprocessed image information.

The feature map information extractor 130 may generate feature map information based on the image information or the preprocessed image information.

Hereinafter, the feature map information may indicate feature map information extracted from the image information or the preprocessed image information, along with the result of application of specific processing to the extracted feature map information.

At step 240, the feature map information preprocessor 140 performs preprocessing on the feature map information, thereby generating preprocessed feature map information.

The feature map information may comprise multiple pieces of feature map information.

In an embodiment, the preprocessing may include one or more of sub-sampling, quantization, and domain transformation.

The preprocessing at step 240 may be selectively and/or partially performed.

At step 250, the frame packer 150 may receive multi-dimensional feature map information and/or domain-transformed feature map information as the input thereof.

The feature map information may comprise multiple pieces of feature map information. The domain-transformed feature map information may comprise multiple pieces of domain-transformed feature map information.

The frame packer 150 may perform reordering and packing of the feature map information and/or the domain-transformed feature map information. The frame packer 150 may perform packing of the feature map information and/or the domain-transformed feature map information into a specific unit.

The frame packer 150 may generate a packed frame through packing.

The packed frame may comprise multiple packed frames.

The feature map information may indicate one or more packed frames. Alternatively, one or more frames of the feature map information may be packed.

At step S260, the frame classifier 160 may group the multiple packed frames into specific units.

At step S270, the feature map information encoder 170 performs encoding on the feature map information, thereby generating encoded feature map information.

The feature map information encoder 170 may generate a feature map information bitstream including the encoded feature map information.

The preprocessing information may indicate the types of processing performed on the feature map information, among sub-sampling, domain transformation, and quantization.

For example, the preprocessing information may include sub-sampling information. The sub-sampling information may indicate whether sub-sampling is applied to the feature map information.

For example, the preprocessing information may include domain transformation information. The domain transformation information may indicate whether domain transformation is applied to the feature map information.

For example, the preprocessing information may include quantization information. The quantization information may indicate whether quantization is applied to the feature map information.

The order in which sub-sampling, domain transformation, and quantization are performed may be changed.

The preprocessing information may indicate the order in which the processing tasks, among sub-sampling, domain transformation, and quantization, are performed on the feature map information.

The feature map information encoder 170 performs encoding on the preprocessing information, thereby generating encoded preprocessing information.

The encoded feature map information may include the encoded preprocessing information.

The pieces of information generated and/or transmitted by the above-described feature map information encoder 170 may be transmitted as information pertaining to High-Level Syntax (HLS). In an embodiment, the upper level of the high-level syntax may be a sequence level or a picture level.

Figure 3:
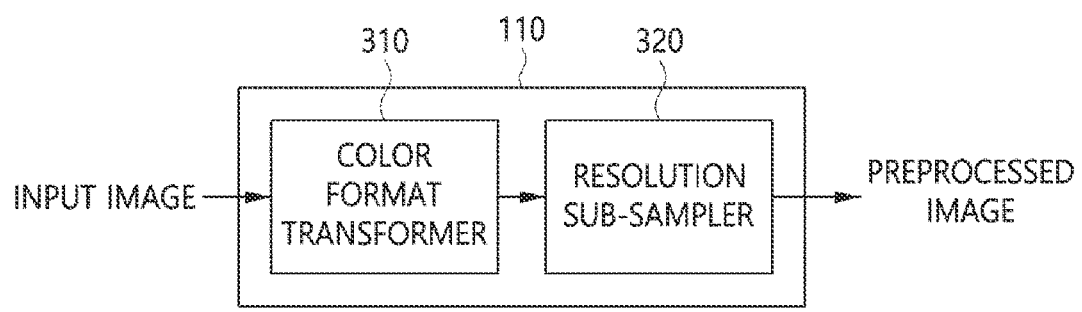
FIG. 3 illustrates the structure of an image information preprocessor according to an embodiment.

FIG. 3 illustrates the structure of an image information preprocessor according to an embodiment.

The image information preprocessor 110 may include one or more of a color format transformer 310 and a resolution sub-sampler 320.

Image information may be input to the color format transformer 310.

The resolution sub-sampler 320 may generate preprocessed image information.

The functions, operations, and the like of the color format transformer 310 and the resolution sub-sampler 320 will be described in more detail below.

Figure 4:
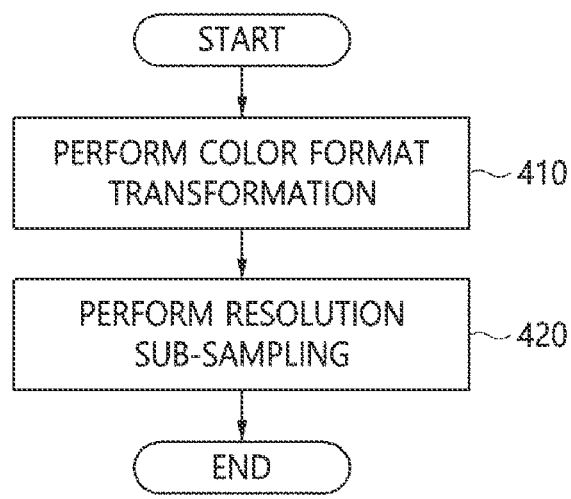
FIG. 4 is a flowchart of a method for preprocessing image information according to an embodiment.

FIG. 4 is a flowchart of a method for preprocessing image information according to an embodiment.

Step 210, described above with reference to FIG. 2, may include steps 410 and 420.

Through steps 410 and 420, one or more of preprocessing tasks, such as color format transformation, resolution sub-sampling, and the like, may be performed on the image information input to the image information preprocessor 110. These preprocessing tasks may be performed using the feedback information input to the image information preprocessor 110.

At step 410, the color format transformer 310 transforms the color format of the input image information, thereby generating an image, the color format of which is transformed.

Through transformation of the color format, the color format transformer 310 may transform the color format of the input image information to YCbCr, RGB, gray, or the like.

The color format transformation information may include 1) information (or a flag) indicating whether transformation of a color format is performed and/or 2) information representing color formats.

The color formats may include a color format before transformation and a color format after transformation.

1) The information indicating whether transformation of a color format is performed and/or 2) the information representing color formats may be encoded.

The encoded image information may include the encoded color format transformation information.

For example, when the color format of the image information is RGB and when the RGB color format is transformed to a YCbCr color format through color format transformation performed by the color format transformer 310, the color format transformation information may include 1) information indicating that transformation of the color format is performed and/or 2) information indicating that the color format before transformation is RGB and that the color format after transformation is YCbCr.

The color format transformation information may be transmitted to the image information encoder 120. The image information encoder 120 performs encoding on the color format transformation information, thereby generating encoded color format transformation information. The encoded image information may include the encoded color format transformation information. An image information bitstream may include the encoded color format transformation information. The encoded color format transformation information may be transmitted to the decoding apparatus 3800 through the image information bitstream.

At step 420, the resolution sub-sampler 320 performs resolution sub-sampling on the image, the color format of which is transformed, thereby generating a resolution-sub-sampled image.

Feedback information may be used for resolution sub-sampling at step 420.

The resolution sub-sampling information may include 1) information (or a flag) indicating whether resolution sub-sampling is performed and/or 2) unit information indicating the unit based on which resolution sub-sampling is performed.

For example, the unit information may indicate whether the unit based on which resolution sub-sampling is performed is the entire image or a frame of the image. The unit information may represent a sampling rate. For example, the sampling rate may be 50% of the resolution or 75% of the resolution.

The resolution sub-sampling information may be transmitted to the image information encoder 120. The image information encoder 120 performs encoding on the resolution sub-sampling information, thereby generating encoded resolution sub-sampling information. The encoded image information may include the encoded resolution sub-sampling information. The image information bitstream may include the encoded resolution sub-sampling information. The encoded resolution sub-sampling information may be transmitted to the decoding apparatus 3800 through the image information bitstream.

The pieces of information generated and/or transmitted by the above-described image information preprocessor 110 may be transmitted as information pertaining to High-Level Syntax (HLS) and/or low-level syntax. Here, the upper level of the high-level syntax may be a sequence level or a picture level.

All or some of the image preprocessing at step 210 may be omitted. That is, some of steps 410 and 420 of the image-preprocessing method may be omitted, and the order of steps 410 and 420 may be changed.

Depending on the omission or a change in the order, the image information, the image, the color format of which is transformed, the resolution-sub-sampled image, or the preprocessed image information at steps 410 and 420 described above may be replaced with image information, an image, the color format of which is transformed, a resolution-sub-sampled image, or preprocessed image information.

When the image preprocessing by the image information preprocessor 110 is omitted, the image information may be transmitted to the image information encoder 120 and the feature map information extractor 130.

The image-preprocessing information may indicate whether each of color format transformation and resolution sub-sampling is applied. Also, the image-preprocessing information may indicate the order in which color format transformation and resolution sub-sampling are performed.

At step 220, the image information encoder 120 performs encoding on the image-preprocessing information, thereby generating encoded image-preprocessing information. The image information bitstream may include the encoded image-preprocessing information.

Reference is again to be made to FIG. 2.

At step 220, the image information encoder 120 performs encoding using the preprocessed image information (or the image information that is not preprocessed) and information generated in the preprocessing task, thereby generating encoded image information and reconstructed image information. The image information encoder 120 may output an image information bitstream, including the encoded image information, and the reconstructed image information.

The information generated in the preprocessing task may include information such as the flag, the index, and the like described above with reference to FIG. 4.

The image information encoder 120 performs decoding on the encoded image information, thereby generating reconstructed image information.

At step 230, the feature map information extractor 130 may extract feature map information from the preprocessed image information.

The image information preprocessor 110 may transmit feature map extraction information, indicating whether to extract feature map information, to the feature map information extractor 130, and the feature map information extractor 130 may extract feature map information using the feature map extraction information.

The preprocessed image information (or the image information) may be input to a neural network. The neural network may include a single layer or multiple layers.

The feature map information may be the final result extracted from the neural network or the result from an intermediate layer of the neural network.

Omission information may indicate whether the processing procedure performed by the feature map information extractor 130 is omitted. The omission information may be transmitted from the feature map information extractor 130 or the feature map information preprocessor 140 to the feature map information encoder 170. The feature map information encoder 170 performs encoding on the omission information, thereby generating encoded omission information. The encoded feature map information may include the encoded omission information.

The feature map extraction information may include 1) neural network information and 2) layer location information.

The neural network information may indicate the type of neural network that is used to extract the feature map information. The neural network information may be an index indicating which neural network among multiple neural networks is used to extract feature map information.

The layer location information may indicate the layer from which feature map information is extracted, among multiple layers of the neural network. The layer location information may be an index indicating the layer from which the feature map information is extracted, among the multiple layers.

The feature map information extractor 130 may transmit the feature map extraction information to the feature map information preprocessor 140. The feature map information preprocessor 140 may transmit the feature map extraction information to the feature map information encoder 170.

The feature map information encoder 170 performs encoding on the feature map extraction information, thereby generating encoded feature map extraction information. The encoded feature map information may include the encoded feature map extraction information.

At step 240, the feature map information preprocessor 140 performs preprocessing on the feature map information, thereby generating preprocessed feature map information. The feature map information may comprise multiple pieces of feature map information.

In an embodiment, the preprocessing may include one or more of sub-sampling, domain transformation, and quantization.

Figure 5:
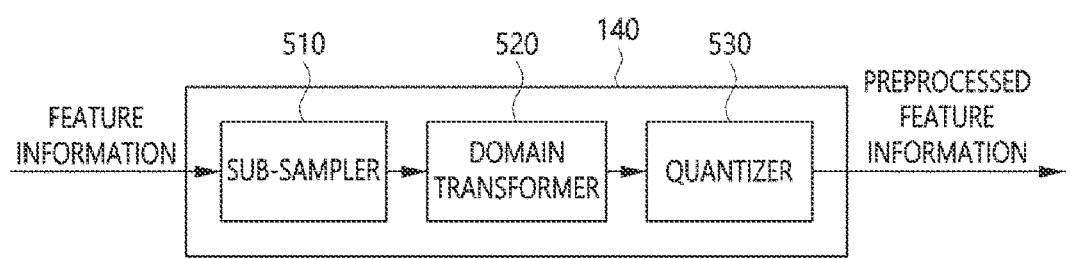
FIG. 5 illustrates the structure of a feature map information preprocessor according to an embodiment.

FIG. 5 illustrates the structure of a feature map information preprocessor according to an embodiment.

The feature map information preprocessor 140 may include one or more of a sub-sampler 510, a domain transformer 520, and a quantizer 530.

Feature map information or multiple pieces of feature information may be input to the sub-sampler 510.

The quantizer 530 may generate preprocessed feature map information.

The functions, operations, and the like of the sub-sampler 510, the domain transformer 520, and the quantizer 530 will be described in more detail below.

Figure 6:
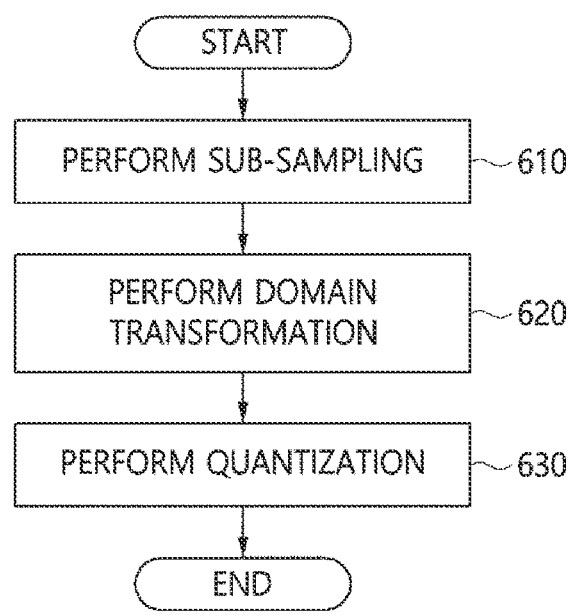
FIG. 6 is a flowchart of a method for preprocessing feature map information according to an embodiment.

FIG. 6 is a flowchart of a method for preprocessing feature map information according to an embodiment.

Step 240, described above with reference to FIG. 2, may include steps 610, 620, and 630.

Through steps 610, 620, and 630, one or more of preprocessing tasks, such as sub-sampling, domain transformation, quantization, and the like, may be performed on the feature map information input to the feature map information preprocessor 140.

At step 610, the sub-sampler 510 may perform sub-sampling on the feature map information.

The sub-sampler 510 performs sub-sampling on the feature map information, thereby generating a feature map. The feature map may comprise multiple feature maps.

For example, the sub-sampled feature map information may be in the form of a feature map. Alternatively, the sub-sampler 510 may output the sub-sampled feature map information in the form of a feature map.

The sub-sampler 510 may perform sub-sampling on the feature map information in units of channels or in units of feature regions. Also, the sub-sampler 510 may perform fixed sampling or non-fixed sampling on the feature map information.

When sub-sampling in units of channels is applied to the feature map information, sub-sampling may be performed on one or more channels.

The sub-sampling method information may indicate the type of sub-sampling that is applied to the feature map information. The sub-sampling method information may be an index indicating the sub-sampling method that is applied to the feature map information, among multiple sub-sampling methods. The feature map information encoder 170 performs encoding on the sub-sampling method information, thereby generating encoded sub-sampling method information. The encoded feature map information may include the encoded sub-sampling method information.

The sub-sampling method information may include sampling rate information and sampling criterion information.

When fixed sampling is performed on the feature map information, the sub-sampler 510 may perform sub-sampling on the feature map information in units of channels at a specific sampling rate.

The sampling rate information may indicate the sampling rate at which sub-sampling is applied to the feature map information. The feature map information encoder 170 performs encoding on the sampling rate information, thereby generating encoded sampling rate information. The encoded feature map information may include the encoded sampling rate information.

Also, the encoded feature map information may include the index of the first sampled channel.

In an embodiment, when non-fixed sampling is performed on the feature map information, the sub-sampler 510 may perform sampling on a single channel or multiple channels indicated by the feature map information according to specific criteria.

Sampling criterion information may indicate the specific criteria for non-fixed sampling. The sampling criterion information may include the number of sampled channels, the range of the sampled channels, and/or the indices of the sampled channels. The feature map information encoder 170 performs encoding on the sampling criterion information, thereby generating encoded sampling criterion information. The encoded feature map information may include the encoded sampling criterion information.

Figure 7:
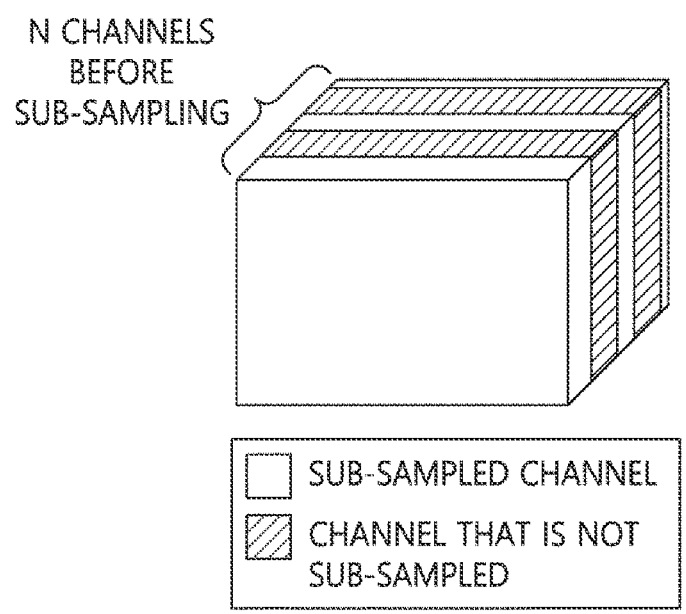
FIG. 7 illustrates the case in which a channel that is not sub-sampled is filled with a specific value according to an embodiment.
Figure 8:
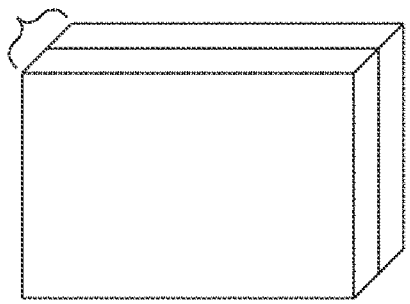
FIG. 8 illustrates the case in which, after sub-sampling is performed in units of channels, only sub-sampled channels are transmitted according to an embodiment.

FIG. 7 and FIG. 8 illustrate methods for performing sub-sampling in units of channels according to an embodiment.

FIG. 7 illustrates the case in which a channel that is not sub-sampled is filled with a specific value according to an embodiment.

FIG. 8 illustrates the case in which, after sub-sampling is performed in units of channels, only the sub-sampled channels are transmitted according to an embodiment.

In an embodiment, the sub-sampler 510 may fill the location of the channel removed by sampling with a specific value, as illustrated in FIG. 7.

For example, the specific value may be 0. Alternatively, the specific value may be the median of the values corresponding to one or more channels adjacent to the removed channel. In embodiments, the median value and the average value may be used interchangeably with each other.

In an embodiment, only information about the channels remaining after sub-sampling is performed may be transmitted as the encoded feature map information, as illustrated in FIG. 8.

Alternatively, the sub-sampler 510 may copy a channel adjacent to the channel removed by sampling to the removed channel, or may copy the weighted average channel of multiple channels adjacent to the channel removed by sampling to the removed channel.

The sub-sampler 510 may output the preprocessed feature map information so as to have the same size as the feature map information through the above-described filling or copying process. When output is performed in this way, the above-described sub-sampling method information may not be transmitted.

Figure 9:
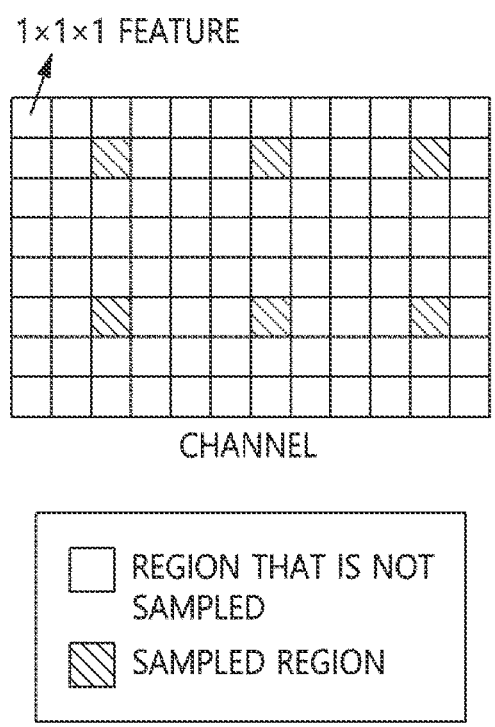
FIG. 9 illustrates a sampling method for a unit of a feature region within a channel according to an embodiment.

FIG. 9 illustrates a method for sampling in units of feature regions within a channel according to an embodiment.

At step 610, the sub-sampler 510 may perform sub-sampling on the feature map information in units of feature regions within a channel.

The sub-sampler 510 may perform sub-sampling on one or more feature regions within a single channel according to specific criteria.

The minimum size of a feature region may be 1. The maximum size of the feature region may be the size of the (entire) channel.

The specific criteria may include a sampling rate and a sampling phase.

The unit of sampling may be a feature group.

For example, sampling may be performed as illustrated in FIG. 9.

The sampling phase may be feature coordinates or an index mapped to the feature coordinates. The feature coordinates may be assigned based on the upper-left corner of the channel.

Sampling may start from the sampling phase, and may be performed while maintaining an interval equal to the sampling rate in a horizontal direction and a vertical direction.

The sampling information may include the sampling rate and the sampling phase. The feature map information encoder 170 performs encoding on the sampling information, thereby generating encoded sampling information. The encoded feature map information may include the encoded sampling information.

The sampling information may be generated and transmitted in units of pictures or in units of picture groups.

Figure 10:
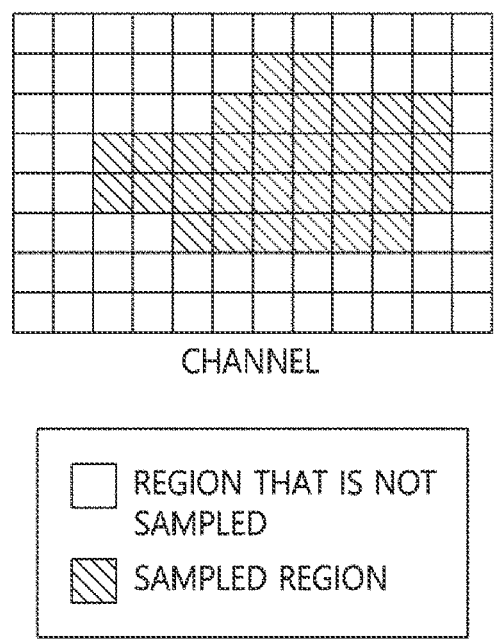
FIG. 10 illustrates another sampling method for a unit of a feature region within a channel according to an embodiment.

FIG. 10 illustrates another method for sampling in units of feature regions within a channel according to an embodiment.

Figure 11:
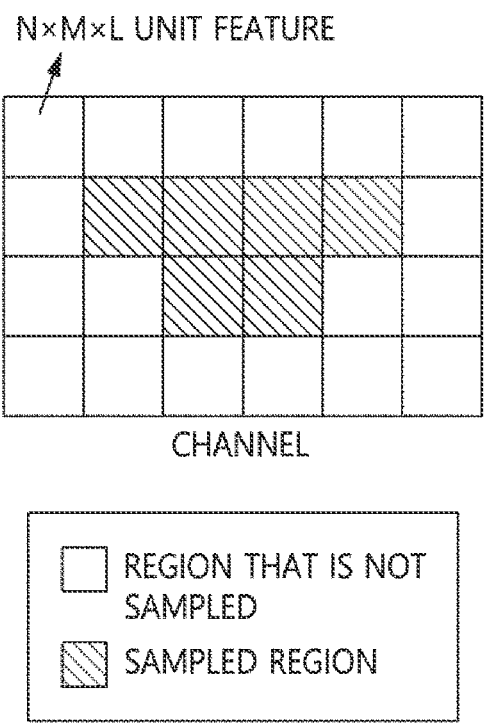
FIG. 11 illustrates a sampling method for a unit feature within a channel according to an embodiment.

FIG. 11 illustrates a method for sampling a unit feature within a channel according to an embodiment.

The specific criteria described above with reference to FIG. 9 may be criteria using the representative value of a unit feature. Sampling based on the specific criteria may be performed as illustrated in FIG. 11.

The unit feature may be a group of features having a size equal to or greater than 1×1×1.

The representative value of the unit feature may be the median value, the average value, the maximum value, the minimum value, or the like of the values of the unit feature.

The sub-sampler 510 may (selectively) perform sub-sampling on a unit feature having a representative value equal to or greater than a specific threshold.

The unit feature map information may indicate the sub-sampled unit feature. For example, the unit feature map information may indicate the index of the sub-sampled unit feature. The feature map information encoder 170 performs encoding on the unit feature map information, thereby generating encoded unit feature map information. The encoded feature map information may include the encoded unit feature map information.

FIG. 12 illustrates a sampling method using feedback according to an embodiment.

The specific criteria described above with reference to FIG. 9 may be derived using the feedback from the decoding apparatus 3800.

The specific criteria may be derived as shown in FIG. 12.

The feedback from the decoding apparatus 3800 may indicate the type of task to be performed in the encoding apparatus 100 that received the feature map information.

When the type of the task is object detection, the sub-sampler 510 may select a region having high importance from the aspect of an object detection task in the respective channels of the feature map information as the sub-sampled region.

Sub-sampling region information may include the number of sub-sampled region(s) in a channel, the coordinates of the upper-left corner of the sub-sampled region, the width of the sub-sampled region, the height of the sub-sampled region, and the like.

The feature map information encoder 170 performs encoding on the sub-sampling region information, thereby generating encoded sub-sampling region information. The encoded feature map information may include the encoded sub-sampling region information.

In an embodiment, information about only the sub-sampled region, among the entirety of the channel, may be transmitted. In other words, preprocessed feature map information may include information pertaining to the sub-sampled region, among the entirety of the channel.

In an embodiment, the region remaining after excluding the sub-sampled region from the entirety of the channel may be packed with a specific value. For example, the specific value may be the median value of the channel, the value of an adjacent sampled feature, or the average value of multiple adjacent sampled features.

By applying such packing, channel size information indicating the size of the channel before sampling may be used. The feature map information encoder 170 performs encoding on the channel size information, thereby generating encoded channel size information. The encoded feature map information may include the encoded channel size information.

When the above-described channel size information is used, the sub-sampling method information and/or information related to sub-sampling according to the sub-sampling method may not be generated or transmitted. Here, the information related to sub-sampling may include the sub-sampling region information.

Reference is again to be made to FIG. 6.

At step 620, the domain transformer 520 performs domain transformation on one or more pieces of feature map information, thereby generating transformed feature map information.

Domain transform type information may indicate the type of domain transform applied to the feature map information, among available types of domain transform. For example, the type of domain transform may be 1) 3-dimensional (3D) Discrete Cosine Transform (DCT), 2) 2D-DCT, 3) orthogonal linear transform, or 4) Principal Component Analysis (PCA).

The feature map information encoder 170 performs encoding on the domain transform type information, thereby generating encoded domain transform type information. The encoded feature map information may include the encoded domain transform type information.

Depending on the type of domain transform, the feature map information preprocessor 140 may output a transform coefficient or a transform basis vector as the result of domain transformation performed on information indicating a picture. The transformed feature map information may include the transform coefficient or the transform basis vector.

Figure 13:
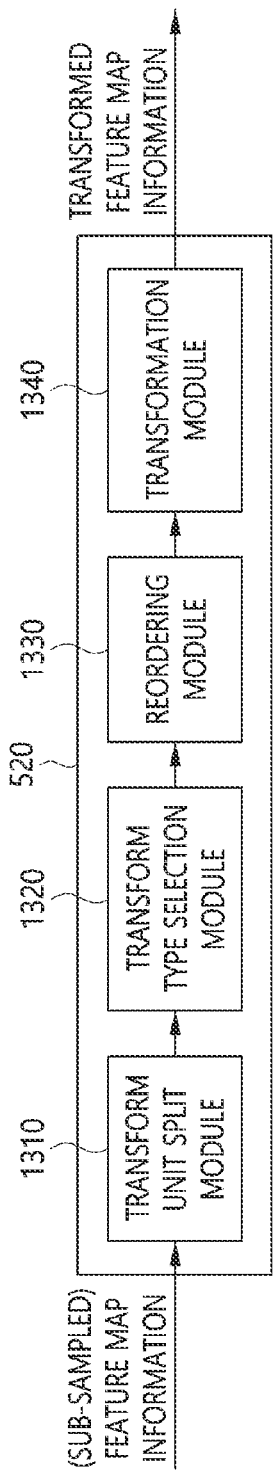
FIG. 13 illustrates the structure of a domain transformer according to an embodiment.

FIG. 13 illustrates the structure of a domain transformer according to an embodiment.

The domain transformer 520 may include one or more of a transform unit split module 1310, a transform type selection module 1320, a reordering module 1330, and a transformation module 1340.

The feature map information (to which sub-sampling is applied) may be input to the transform unit split module 1310.

The transformation module 1340 may generate transformed feature map information.

The functions, operations, and the like of the transform unit split module 1310, the transform type selection module 1320, the reordering module 1330, and the transformation module 1340 will be described in more detail below.

Figure 14:
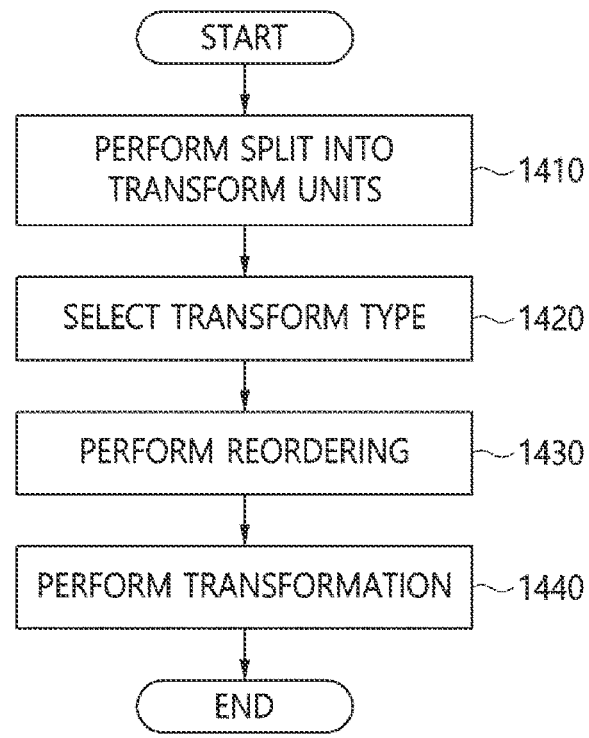
FIG. 14 is a flowchart of a domain transformation method according to an embodiment.

FIG. 14 is a flowchart of a domain transformation method according to an embodiment.

Step 620, described above with reference to FIG. 6, may include steps 1410, 1420, 1430 and 1440.

The order of steps 1410, 1420, 1430 and 1440 may be changed. Also, some of steps 1410, 1420, 1430 and 1440 may be skipped.

Through steps 1410, 1420, 1430 and 1440, one or more of a split into transform units, selection of a transform type, reordering, and transformation may be performed on the feature map information input to the feature map information preprocessor 140.

At step 1410, the transform unit split module 1310 may split the feature map information into multiple transform units.

The feature map information may comprise multiple pieces of feature map information.

The feature map information input to the transform unit split module 1310 may be N-dimensional. The sizes and/or shapes of the pieces of feature map information may be different from each other.

In an embodiment, the transform unit may be each of the multiple pieces of feature map information that are input to the transform unit split module 1310.

In an embodiment, the transform unit may be a segment of feature map information generated by splitting each of the multiple pieces of feature map information.

Figure 15:
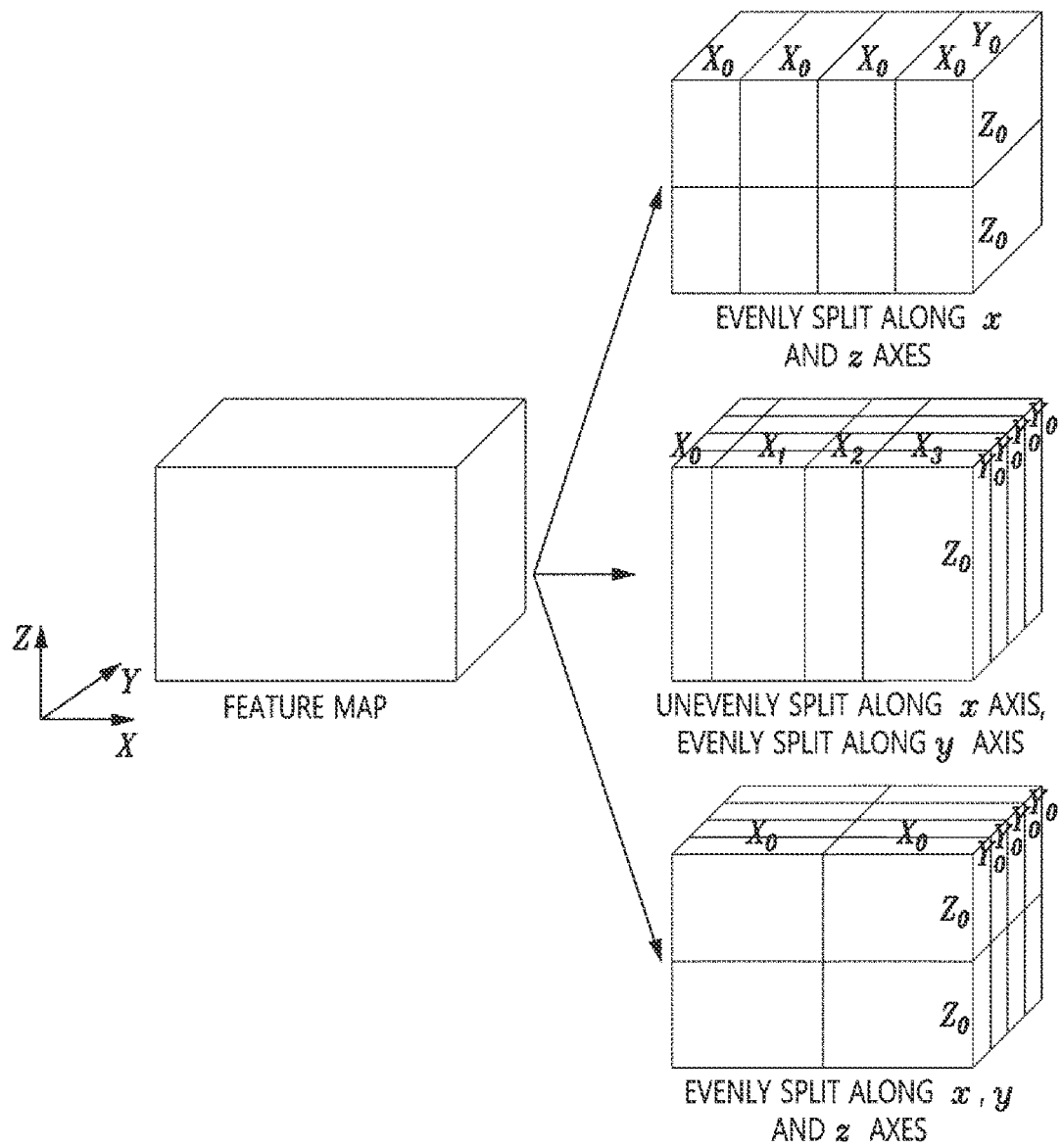
FIG. 15 illustrates a split of a feature map according to an embodiment.

FIG. 15 illustrates a split of a feature map according to an embodiment.

The following methods may be used for a split of a feature map.

1) The transform unit split module 1310 may evenly split a feature map along one or more axes of the feature map, or may unevenly split the same.

The split information may be information indicating a split along one or more axes of the feature map. The one or more axes may include an x-axis, a y-axis, and a z-axis.

The transform unit split module 1310 may generate split information. The feature map information encoder 170 performs encoding on the split information, thereby generating encoded split information.

The encoded feature map information may include the encoded split information.

The split information may include 1) the number of axes along which a split is applied and 2) information indicating the axis to which the split is applied. The information indicating the axis to which the split is applied may be the index of the axis.

When the feature map is evenly split along one or more axes thereof, the split information may include 1) a split ratio applied to each of the one or more axes, 2) the length(s) of segments into which the feature map is split along the respective axes, and 3) the numbers of segments into which the feature map is split along the respective axes. Alternatively, the length(s) of segments into which the feature map is split along the respective axes may be derived using the length(s) of segments into which a feature map smaller than the current feature map is split along the respective axes.

When the feature map is unevenly split along one or more axes thereof, the split information may include 1) the number of segments into which the feature map is split along each axis and 2) the lengths of the multiple segments along the axis.

The split information may include feature map shape information indicating the shape of the feature map. Also, the split information may include feature map split information indicating the method of splitting the feature map.

Also, the split information may include 1) a transform unit index for each transform unit and 2) coordinates of each transform unit in the feature map.

Reference is again to be made to FIG. 14.

At step 1420, the transform type selection module 1320 may select the transform type to be applied to each of the multiple transform units.

For example, the transform type selection module 1320 may select the transform type to be applied to the transform unit, among 3D-DCT, 2D-DCT, orthogonal linear transform, and PCA.

The transform type selection module 1320 may select the transform type to be applied to the transform unit using 1) a distribution of the transform unit, 2) a distribution pattern thereof, or the like.

The transform type information for a transform unit may indicate the transform type selected for the transform unit.

The transform type selection module 1320 may generate transform type information. The feature map information encoder 170 performs encoding on the transform type information, thereby generating encoded transform type information.

The encoded feature map information may include the encoded transform type information.

At step 1430, the reordering module 1330 reorders the transform unit, thereby generating a reordered transform unit. Through the reordering, the shape of the transform unit may be changed.

Reordering of the transform unit may be performed multiple times. The reordering module 1330 may perform different types of reordering of the transform unit.

The reordering module 1330 splits the transform unit along a single axis or multiple axes, thereby generating multiple segments of the transform unit.

The reordering module 1330 concatenates the multiple segments of the transform unit in a specific order along a single direction or multiple directions, thereby generating a reordered transform unit.

Figure 16:
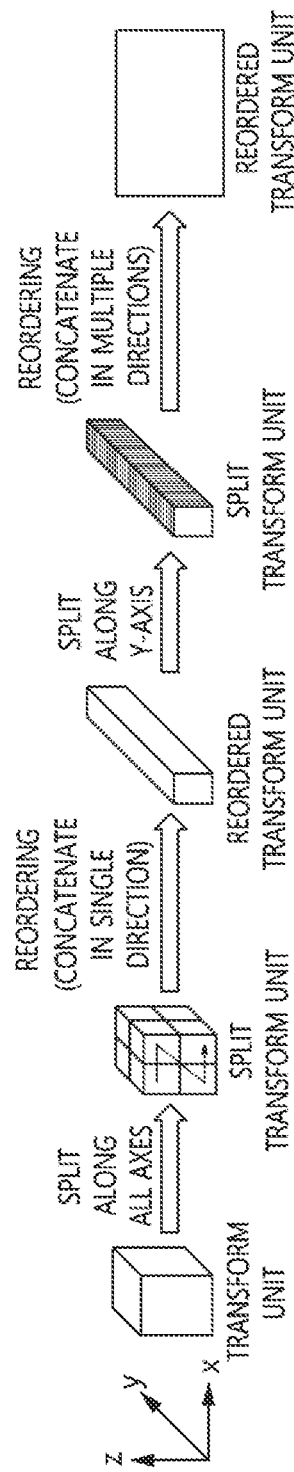
FIG. 16 illustrates that reordering is performed twice according to an example.

FIG. 16 illustrates that reordering is performed twice according to an example.

In FIG. 16, the reordering module 1330 may split a transform unit along all of the three axes, namely an x-axis, a y-axis, and a z-axis. The reordering module 1330 splits the transform unit along all of the axes, thereby generating multiple segments of the transform unit.

The reordering module 1330 may perform reordering by concatenating the multiple segments of the transform unit along the direction of the x-axis. The direction of the x-axis may be an example of a single direction.

The reordering module 1330 performs reordering so as to concatenate the multiple segments of the transform unit along the direction of the x-axis, thereby generating a reordered transform unit.

The reordering module 1330 may again split the reordered transform unit along the y-axis.

The reordering module 1330 splits the reordered transform unit along the y-axis, thereby generating multiple segments of the transform unit. Here, the y-axis may be an example of a single axis.

The reordering module 1330 may perform reordering by concatenating the multiple segments of the transform unit in the directions of the x-axis and the z-axis. The x-axis and the z-axis may be an example of multiple axes.

When multiple types of reordering using different methods are performed, reordering information may be used. The reordering information may indicate the multiple types of reordering applied to the transform unit.

The reordering information may include information indicating the number of times reordering is performed.

When multiple types of reordering using different methods are performed, the reordering module 1330 may generate reordering information. The feature map information encoder 170 performs encoding on the reordering information, thereby generating encoded reordering information.

The encoded feature map information may include the encoded reordering information.

The reordering information may include 1) the number of times reordering is performed and 2) information about each type of reordering when multiple types of reordering are performed.

The information about reordering may include 1) the size and shape of a transform unit before a split, 2) the shape of the split transform unit, 3) the number of axes along which the transform unit is split, 4) the ratio of the split, 5) the number of directions along which the segments of the split transform unit are concatenated, 6) information indicating the direction along which the segments of the split transform unit are concatenated (e.g., the index of the direction), 7) information indicating the scan order in which the segments of the split transform unit are scanned, 8) information indicating the order of reordering, and the like.

The information indicating the scan order may be an index for a scan order table.

The information indicating the order of reordering may be an index for a reordering order table.

When a transform unit is evenly split, the length of an axis of an additional transform unit may be used. Alternatively, when the transform unit is evenly split, the length of the axis of the additional transform unit may be multiplied by a specific scale, and the length of the axis of the additional transform unit multiplied by the specific scale may be used.

The split information may include information indicating the additional transform unit used to split the transform unit. The information indicating the additional transform unit may be an index for the additional transform unit.

The split information may include the specific scale by which the length of the axis of the additional transform unit is multiplied.

Here, the additional transform unit may be a transform unit generated from the multiple pieces of feature map information input to the domain transformer 520.

When the transform unit is evenly split along a specific axis, the length of the axis thereof may not be a multiple of each of the segments of the split axis. When the length of the axis of the transform unit is not a multiple of the length of each segment, the reordering module 1330 may perform padding along the axis such that the length of the axis of the transform unit becomes a multiple of the length of each segment. When the length of the axis becomes a multiple of the length of each segment through padding, the reordering module 1330 may evenly split the transform unit along the specific axis.

Reference is again to be made to FIG. 14.

At step 1440, the transformation module 1340 performs transformation on the reordered transform unit, thereby generating 1) a transform coefficient, 2) a transform matrix, or 3) a transform matrix index.

The transformation module 1340 may perform the selected type of transformation on each transform unit.

The transformation information may indicate the type of transformation applied to the transform unit.

The transformation unit 1340 may generate transformation information. The feature map information encoder 170 performs encoding on the transformation information, thereby generating encoded transformation information.

The encoded feature map information may include the encoded transformation information.

The transformation information may include the transform matrix used for transformation. Alternatively, the transformation information may include information indicating the transform matrix used for transformation. The information indicating the transform matrix used for transformation may be an index for the transform matrix.

The transformation information may include the transform coefficient of the transformation applied to the transform unit.

Alternatively, the transform matrix may be implicitly derived from the transform type.

For example, the transform matrix required for performing transformation may be derived using the current transform unit. All or part of the derived transform matrix may be included in the transformation information.

For example, a single matrix may be selected from a list comprising multiple matrices, and transformation may be performed on the transform unit using the selected matrix. The transformation information may indicate the matrix that is selected for transformation of the transform unit, among the multiple matrices in the list. Here, the transformation information may include the index of the matrix that is selected for transformation of the transform unit, among the multiple matrices in the list.

The matrices included in the list may be 1) matrices derived through optimization of multiple transform units in a single frame or multiple frames or 2) predefined matrices, such as Discrete Cosine Transform (DCT) and Discrete Sine Transform (DST).

When transformation of the transform unit is performed, the transformation module 1340 may transpose one or more specified axes.

The transformation information may include transposition information indicating the transposition applied to the one or more axes.

The order of steps 1410, 1420, 1430 and 1440 may be changed. Also, at least some of steps 1410, 1420, 1430 and 1440 may be skipped.

Reference is again to be made to FIG. 6.

At step 630, the quantizer 530 performs quantization on the transformed feature map information, thereby generating quantized feature map information. The transformed feature map information may be replaced with the feature map information or the sub-sampled feature map information.

The quantization may be fixed quantization or non-fixed quantization.

The transformed feature map information input to the quantizer 530 may have an N-dimensional form.

The quantization method information may indicate the quantization method that is applied to the transformed feature map information, among available quantization methods. For example, the quantization method information may be an index or flag indicating the quantization method that is applied to the transformed feature map information, among available quantization methods.

The quantization method information may include a quantization type, and may include information indicating the unit to which quantization is applied. Also, the quantization method information may include an index or flag indicating the quantization type, and may include an index or flag indicating the unit to which quantization is applied.

The feature map information encoder 170 performs encoding on the quantization method information, thereby generating encoded quantization method information. The encoded feature map information may include the encoded quantization method information.

After the procedure performed by the feature map information preprocessor 140, encoding of the feature map information may be performed. In the procedure of encoding the feature map information, specific high-level information and/or specific low-level information may be generated. The (encoded) quantization method information may be encoded and signaled as additional high-level information and/or additional low-level information that is different from the specific high-level information and/or the specific low-level information. Alternatively, the (encoded) quantization method information may be signaled from the encoding apparatus 100 to the decoding apparatus 3800 in the same manner as the encoded feature map information.

In embodiments, signaling of information may indicate that the information is transmitted from the encoding apparatus 100 to the decoding apparatus 3800 through a bitstream or the like.

Other information described in the embodiments may also be encoded and signaled as the additional high-level information and/or the additional low-level information described above.

Figure 17:
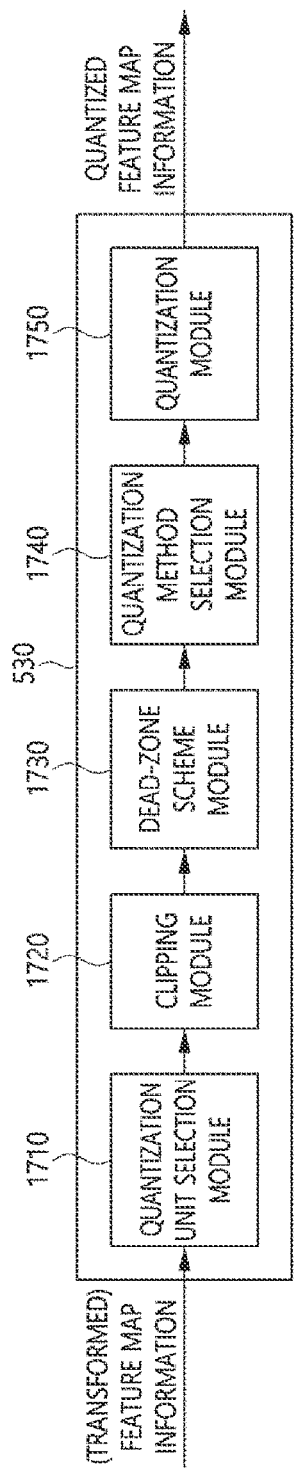
FIG. 17 illustrates the structure of a quantizer according to an embodiment.

FIG. 17 illustrates the structure of a quantizer according to an embodiment.

The quantizer 530 may include one or more of a quantization unit selection module 1710, a clipping module 1720, a dead-zone scheme module 1730, a quantization method selection module 1740, and a quantization module 1750.

The (transformed) feature map information may be input to the quantization unit selection module 1710.

The quantization module 1750 may generate quantized feature map information.

The functions, operations, and the like of the quantization unit selection module 1710, the clipping module 1720, the dead-zone scheme module 1730, the quantization method selection module 1740, and the quantization module 1750 will be described in more detail below.

Figure 18:
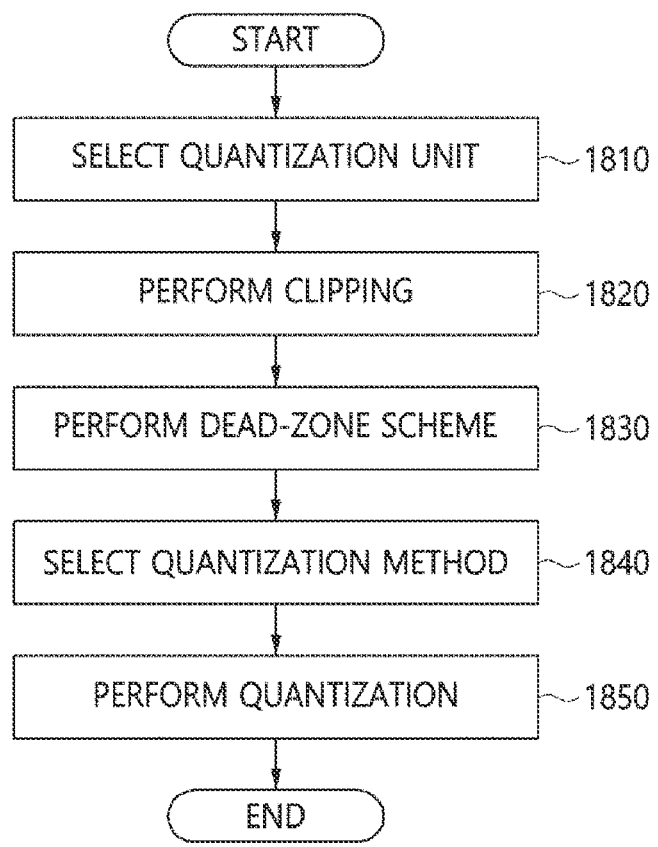
FIG. 18 is a flowchart of a quantization method according to an embodiment.

FIG. 18 is a flowchart of a quantization method according to an embodiment.

Step 630, described above with reference to FIG. 6, may include steps 1810, 1820, 1830, 1840 and 1850.

Through steps 1810, 1820, 1830, 1840 and 1850, one or more of selection of a quantization unit, clipping, a dead-zone scheme, selection of a quantization method, and quantization may be performed on the feature map information input to the feature map information preprocessor 140.

At step 1810, the quantization unit selection module 1710 may select the quantization unit based on which quantization is to be performed on the information input to the quantizer 530.

For example, when the information input to the quantizer 530 is the transformed feature map information output from the domain transformer 520, the quantization unit may be the same as the transform unit used in the domain transformer 520.

When the information input to the quantizer 530 is the transformed feature map information output from the domain transformer 520, quantization may be performed using the same unit as the transform unit used in the domain transformer 520.

In this case, quantization may be performed with reference to information about the transform unit used in the domain transformer 520 even though the quantization unit information indicating the unit for quantization is not signaled.

Depending on the selection by the quantization unit selection module 1710, one or more quantization units may be generated from the information input to the quantizer 530.

At step 1820, the clipping module 1720 may receive the one or more quantization units selected by the quantization unit selection module 1710 as the input thereof.

The clipping module 1720 may perform clipping on the one or more quantization units input thereto. Here, the quantization units to which clipping is applied may be some of the one or more quantization units input to the clipping module 1720.

Clipping may be applied based on a predefined maximum value and/or minimum value. Alternatively, the maximum value and/or minimum value to which clipping is applied may be set depending on the distribution of the values of the information input to the quantizer 530.

For example, when the distribution of the values of the information input to the quantizer 530 follows a normal distribution, the maximum value and/or minimum value to which clipping is applied may be set differently depending on the standard deviation of the values of the information input to the quantizer 530.

When clipping is not performed, quantization by the dead-zone scheme module 1730, the quantization method selection module 1740, and the quantization module 1750, which are performed after the operation of the clipping module 1720, may be performed on all of the distributions of the information received as input. Also, fixed quantization information or non-fixed quantization information may include information indicating the maximum value and minimum value of the quantization unit before quantization.

When clipping is performed, clipping information may be used. The clipping module 1720 may generate clipping information. The feature map information encoder 170 performs encoding on the clipping information, thereby generating encoded clipping information.

The encoded feature map information may include the encoded clipping information.

The clipping information may include information indicating whether clipping is performed. The information indicating whether clipping is performed may be an index or a flag.

The clipping information may include a clipping range (that is, the maximum value and/or minimum value of the clipping range).

Also, the clipping information may include information indicating the quantization method for the clipping range.

Also, when clipping using the maximum value and minimum value fixed for the one or more quantization units input to the clipping module 1720 (that is, the maximum and minimum values common to the one or more quantization units) is performed, the specific maximum value and the specific minimum value may indicate the fixed range for the quantization units on which clipping is performed.

The clipping information may include the specific maximum value and the specific minimum value as a single piece of information.

At step 1830, the dead-zone scheme module 1730 may receive the quantization unit to which clipping is applied and/or the quantization unit to which clipping is not applied as the input thereof.

The dead-zone scheme module 1730 may map all of values present within a specific region in a quantization unit to 0 before fixed quantization and/or non-fixed quantization is performed on the quantization unit.

1) In an embodiment, when the distribution of values in a quantization unit on which quantization is to be performed satisfies [n, m], a dead-zone scheme by which all values falling within the range [q, p] are mapped to 0 may be performed. Here, n may be a specific real number, and m may be a specific real number. q may be a specific real number equal to or greater than n. p may be a specific real number equal to or less than m.

Here, q and p may represent a predefined proportion of the range of the values within the quantization unit on which quantization is to be performed.

q and p may be set by a procedure that is repeated so as to minimize an error. This procedure may be repeated a specific number of times, and may be repeated until the error drops below a specific value.

The error may be a function including a bit rate and performance. Here, the performance may indicate the final result output from a machine-learning processor 3860 using a neural network that operates using reconstructed feature map information.

2) In an embodiment, the region to which the dead-zone scheme is applied may be determined depending on the characteristics of the distribution of values within the quantization unit on which quantization is to be performed. The characteristics of the distribution may include a variance, a standard deviation, and the like.

3) In an embodiment, when the distribution of values within a quantization unit on which quantization is to be performed satisfies [n, m], a dead-zone scheme by which all values falling within the range [q, p] are mapped to 0 may be performed. Here, n may be a specific real number, and m may be a specific real number. q may be a specific real number equal to or greater than n. p may be a specific real number equal to or less than m.

After such mapping is performed, a single new section for connecting a left section and a right section may be defined using the range [q, p] as a reference. The left section may be a section of values that are equal to or less than q. The right section may be a section of values that are equal to or greater than p.

For example, among values within a quantization unit, q may be added to the values falling within the range [n, q]. Also, among the values within the quantization unit, p may be subtracted from the values falling within the range [p, m]. Then, a fixed quantization method and/or a non-fixed quantization method may be performed on the region of the range [n+q, m−p].

The above-described dead-zone scheme may be performed separately on each of the one or more input quantization units. Alternatively, the dead-zone scheme may be performed in common for all of the one or more input quantization units.

When the dead-zone scheme is used, the dead-zone scheme information may be used. The dead-zone scheme module 1730 may generate dead-zone scheme information. The feature map information encoder 170 performs encoding on the dead-zone scheme information, thereby generating encoded dead-zone scheme information.

The encoded feature map information may include the encoded dead-zone scheme information.

The dead-zone scheme information may include information indicating whether the dead-zone scheme is performed. The information indicating whether the dead-zone scheme is performed may be an index or a flag.

The dead-zone scheme information may include information indicating the range for which the dead-zone scheme is performed.

At step 1840, the quantization method selection module 1740 may select a quantization method for the one or more quantization units input thereto.

The one or more input quantization units may be quantization units to which the above-described dead-zone scheme is applied. Alternatively, the one or more input quantization units may be quantization units to which the dead-zone scheme is not applied.

The quantization method selection module 1740 may select individual quantization methods for the one or more quantization units input thereto. The quantization method selection module 1740 may select a common quantization method to be performed on all of the one or more quantization units input thereto.

Figure 19:
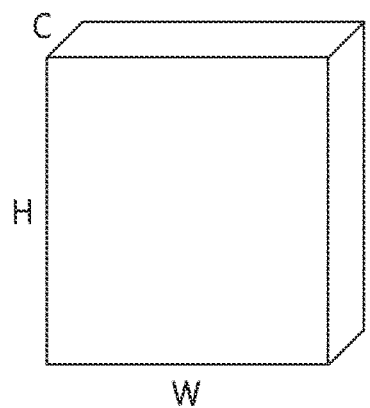
FIG. 19 illustrates a quantization unit based on which quantization is performed according to an example.

FIG. 19 illustrates a quantization unit based on which quantization is performed according to an example.

The quantization unit may have a size of W×H×C. W may be an integer equal to or greater than 1. H may be an integer equal to or greater than 1. C may be an integer equal to or greater than 1.

Figure 20:
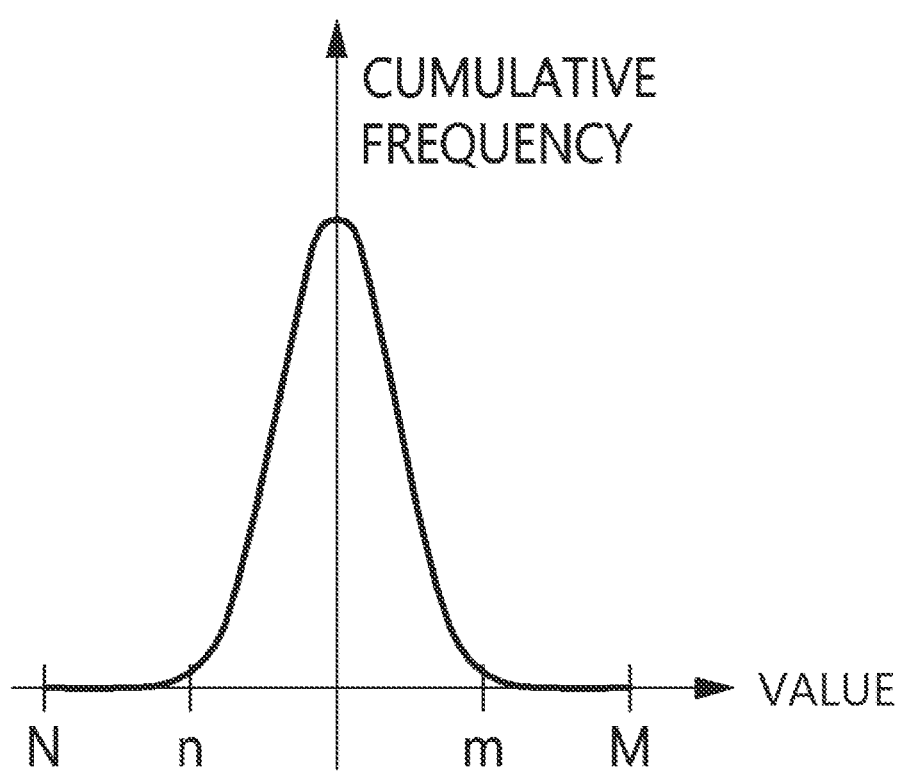
FIG. 20 illustrates the distribution of values within a quantization unit according to an example.

FIG. 20 illustrates the distribution of values within a quantization unit according to an example.

In FIG. 20, the distribution of values within the quantization unit of FIG. 19 is illustrated using a graph.

When the values within the quantization unit have a distribution of [N, M], different quantization methods may be respectively selected for [N, n), [n, m], and 13 (m, M]. N may be a specific real number. M may be a specific real number. n may be a specific real number greater than N. m may be a specific real number less than M. m may be greater than n.

As described above, a quantization method for a specific range may be selected depending on the range or distribution of the values within the quantization unit.

The quantization information may include quantization unit information and quantization method information.

The quantization unit information may indicate a quantization unit.

The quantization method information may indicate the quantization method selected for a specific range of values within the quantization unit. The specific range and the quantization method information corresponding thereto may comprise multiple ranges and multiple pieces of quantization method information, respectively.

For example, the quantization unit information and the quantization method information may be represented as a single index. Alternatively, respective indices may be used for the quantization unit information and the quantization method information.

The quantization method selection module 1740 may generate quantization information. The feature map information encoder 170 performs encoding on the quantization information, thereby generating encoded quantization information.

The encoded feature map information may include the encoded quantization information.

At step 1850, the quantization module 1750 may perform quantization on the quantization unit.

The quantization may be fixed quantization or non-fixed quantization.

Fixed Quantization

Fixed quantization may be performed on one or more quantization units.

Fixed quantization may be performed based on a quantization level. For the quantization unit on which fixed quantization is performed, specific values, among values within the quantization unit, may be segmented at a uniform interval based on L quantization levels. The specific values may be values that are equal to or greater than the minimum value and equal to or less than the maximum value.

When the quantization level is not defined, a specific value may be used as the initial value of the quantization level. Then, a quantization level that enables a quantization error to be minimized may be derived, and quantization may be performed using the derived quantization level.

The quantization error may be acquired using any of methods, such as Mean-Squared Error (MSE), rate-performance optimization, and the like.

Deriving a quantization level may be repeated less than a specific number of times, and may be repeated until the quantization error becomes less than a specific value. Through such repetition, the quantization level may be set.

Through the above-described procedure, the quantization units on which fixed quantization is performed may be separately quantized using different quantization levels.

Fixed quantization information may include information indicating the quantization level used in the fixed quantization procedure and information indicating a quantization parameter and a fixed quantization function.

For example, the quantization level may be $2^{N-1}$. N may be a specific integer greater than 1.

The information indicating the quantization level used in the fixed quantization procedure may be N. That is, the quantization level may be represented by signaling N. In the embodiment to be described below, the quantization level may be signaled and represented using N.

The quantization module 1750 may generate fixed quantization information. The feature map information encoder 170 performs encoding on the fixed quantization information, thereby generating encoded fixed quantization information.

The encoded feature map information may include the encoded fixed quantization information.

Non-Fixed Quantization

For non-fixed quantization, a K-means clustering method, a Lloyd-Max method, or the like may be used.

Non-fixed quantization may be performed on one or more quantization units.

When non-fixed quantization is performed on a quantization unit, the number of quantization levels assigned to a range of values equal to or greater than a specific threshold value, among the full range of values within the quantization unit, may be greater than the number of quantization levels assigned to a range of values less than the specific threshold value.

The specific threshold value may be predefined. Alternatively, the specific threshold value may be set through repeated derivation of the quantization level.

When information input for quantization is feature map information, the greater the value in the feature map information, the greater effect the value has on the performance of the machine-learning task of a neural network. Therefore, non-fixed quantization, in which a greater number of quantization levels is assigned to the values equal to or greater than the threshold value in the quantization unit, may be performed.

For example, k may be an integer equal to or greater than 1, and the quantization level may be $2^{K-1}$. n may be a specific real number. m may be a specific real number. p may be a threshold value, which is a specific positive real number.

When values in the quantization unit fall within the range [n, m], the number of quantization levels assigned to a specific range A may be greater than the number of quantization levels assigned to the remainder of the range.

Here, the absolute values of the values falling within the specific range A may be greater than p. That is, the specific range A may be a range of values, the absolute values of which are greater than p, among the values within the quantization unit.

The remainder of the range may be the range that remains after excluding the specific range A from the full range of the values within the quantization unit.

The different numbers of quantization levels are respectively assigned to the specific range A and the remainder of the range, whereby non-fixed quantization may be performed.

In this case, the full range may be segmented into the specific range A and the remainder. The quantization level for the remainder may be set to $2^{K-U-1}$, and the quantization level for the specific range A may be set to $2^U$. U may be an integer greater than K/2.

The range information for non-fixed quantization may be information for specifying the ranges of non-fixed quantization. In the range information, each range may be specified using K and U. For example, the range information may include K-U and U for the respective ranges.

When the quantization level is not defined in non-fixed quantization, a specific value may be used as the initial value of the quantization level. Then, a quantization level that enables a quantization error to be minimized may be derived, and a value mapped to each section may be derived depending on the quantization level. Through such derivation, non-fixed quantization may be performed.

Using any of methods such as MSE, rate-performance optimization, and the like, the distance between quantization levels that enables the quantization error between a value before quantization and a value after quantization to be minimized may be derived, and quantization may be performed for the value mapped to each section depending on the derived quantization levels. Such derivation and quantization procedures may be repeated less than a specific number of times, and may be repeated until the quantization error reaches a value less than a specific value.

Non-fixed quantization information may include one or more quantization levels used for the above-described fixed quantization and non-fixed quantization.

The non-fixed quantization information may include a quantization parameter.

The non-fixed quantization information may include information about mapping between a value before quantization and a value after quantization. The information about the mapping may include an index for a mapping table and information about the mapping table. The mapping table may be generated in the encoding procedure, or may be a predefined table.

The non-fixed quantization information may include a non-fixed quantization function.

Also, the non-fixed quantization information may include the above-described range information.

The quantization module 1750 may generate non-fixed quantization information. The feature map information encoder 170 performs encoding on the non-fixed quantization information, thereby generating encoded non-fixed quantization information.

The encoded feature map information may include the encoded non-fixed quantization information.

Information related to quantization, such as the non-fixed quantization information, may be generated, used, and signaled for each quantization unit.

According to an embodiment, the domain transformer 520 may perform PCA on the information input thereto, and principal component information extracted by performing PCA may be used as the input to the quantizer 530.

For example, the principal component information extracted by performing PCA may be 1) a basis matrix, 2) a coefficient, 3) a pair comprising an eigen vector and an eigen value (that is, "(eigen vector, eigen value)"), and/or 4) a mean feature.

Depending on the PCA performed by the domain transformer 520, one or more pieces of principal component information may be extracted from the information input to the domain transformer 520.

With regard to the one or more extracted pieces of principal component information, whether quantization is performed, the quantization method that is applied, and the quantization unit may be determined for the unit of the principal component information.

Depending on the information indicating whether quantization is performed, the quantization method that is applied, and the quantization unit, quantization may be performed on the principal component information.

The quantization information may include the information indicating whether quantization is performed, the quantization method that is applied, and the quantization unit.

In the quantization procedure, additional information may be used. With regard to the additional information, quantizer module execution information, which indicates whether each of the modules of the quantizer 530 operates for each piece of principal component information, may be generated as specific high-level information and/or specific low-level information.

The quantization module 1750 may generate quantizer module execution information. The feature map information encoder 170 performs encoding on the quantizer module execution information, thereby generating encoded quantizer module execution information.

The encoded feature map information may include the encoded quantizer module execution information.

In an embodiment, a quantization method may be determined depending on the distribution of values in the information input to the quantizer 530.

When the information input to the quantizer 530 is a basis matrix, a coefficient, and/or a mean feature generated by PCA applied in the domain transformer 520, the basis matrix, the coefficient, and the mean feature may be set as respective quantization units. Also, the subgroups of the basis matrix, the coefficient, and the mean feature may be set as quantization units.

When the quantization units are set, the procedure to be described below may be performed on each of the quantization units.

When the distribution of values within a quantization unit falls within the range [n, m], quantization in which the quantization level for real numbers within the quantization unit is set to an integer having a value of $2^{K-1}$ may be performed.

n may be a real number. m may be a real number.

An escape quantization method may be used for the above-described quantization.

The escape quantization method may be a method in which 1) fixed quantization and/or non-fixed quantization using integer values equal to or greater than 0 and equal to or less than $2^{K-1}$ is performed on the range C and in which 2) quantization using a specially configured table is performed on the range B.

The range B may be a range of values that fall within the range [n, m] but have absolute values greater than p.

The range C may be a range of values that fall out of the range B in the full range of the values in the quantization unit.

As described above, quantization may be separately performed on the range B and the range C in the escape quantization method.

Embodiments of the escape quantization method will be described below.

1) When n is a negative value and when m is a positive value, the range B may be [n, −p) and (p, m].

For the range [−p, p], fixed quantization and/or non-fixed quantization to integers may be performed such that specific sections within the range [−p, p] are mapped to specific integer values.

Here, the quantization level of quantization may be $2^{K-1}$. The specific integer values may be equal to or greater than 0 and equal to or less than $2^{K-1}$.

For the values falling within the range [n, −p) and the range (p, m], quantization may be performed as described below.

2) Values falling within the range [n, −p) may be quantized to a value of t, and values falling within the range (p, m] may be quantized to a value of u.

Here, t may be a quantized value for one end section of the range [−p, p] on which quantization has been performed. In other words, t may be generated through quantization of a value within the range [−p, x]. x may be a real number.

Also, u may be a quantized value for the other end section of the range [−p, p] on which quantization has been performed. In other words, u may be generated through quantization of a value within the range [y, p]. y may be a real number.

When quantization is performed on the values falling within the range [n, −p) and the values falling within the range (p, m], quantization range information may be used. As the quantization range information, information indicating that the quantized value is generated by performing quantization on the value falling out of the range [−p, p] may be used. The quantization range information may be an index and/or a flag.

The quantization module 1750 may generate quantization range information. The feature map information encoder 170 performs encoding on the quantization range information, thereby generating encoded quantization range information.

The encoded feature map information may include the encoded quantization range information.

3) When dequantization is performed on the quantized value, k is used for the real number to which the quantized value is mapped, whereby final dequantization may be performed. The final dequantization may be performed by adding k to the real number value to which the quantized value is mapped or by subtracting k from the real number value to which the quantized value is mapped. In order to perform such final dequantization, a table specifying final dequantization may be configured. k may be a predefined real number, or may be a real number set in the quantization procedure.

The dequantization information may include information about the table. Also, when k is a value set in the quantization procedure, the dequantization information may include k.

The quantization module 1750 may generate dequantization information. The feature map information encoder 170 performs encoding on the dequantization information, thereby generating encoded dequantization information.

The encoded feature map information may include the encoded dequantization information.

4) The above-described table may be configured as described below.

The range [n, −p) may be segmented into s sections. For the real number t acquired by performing dequantization for the range [n, −p), an optimal multiple for each of the s sections may be derived. The optimal multiple may be a multiple that enables the minimum error to be achieved when it is added to t or subtracted from t, among the multiples of the real number k.

The table may include 1) the number of sections, 2) the value of k, 3) the value of the optimal multiple for each of the sections, and 4) addition/subtraction information for each of the sections. The addition/subtraction information may indicate whether the operation performed on t and the optimal multiple is addition or subtraction.

Here, the error may be a result derived after inverse domain transformation and machine-learning processing using a neural network, which are performed after dequantization.

The procedure of deriving such an optimal multiple is 1) repeated a specific number of times or 2) repeated until the error value becomes equal to or less than a reference, whereby components constituting the table may be acquired. Also, using the acquired components, the table for the range [n, −p) may be configured.

Using a method that is the same as or similar to the above-described method for configuring the table for the range [n, −p), a table for the range (p, m] may be configured.

The above-described information about quantization (e.g., information about whether quantization is performed, the method of performing quantization, the quantization unit, and the like) may be specified as an index or a flag, or may be specified as an index for a predefined mapping table.

Figure 21:
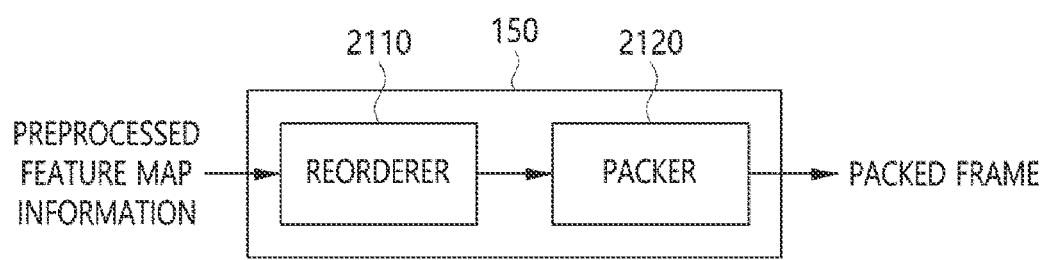
FIG. 21 illustrates the structure of a frame packer according to an embodiment.

FIG. 21 illustrates the structure of a frame packer according to an embodiment.

The frame packer 150 may include one or more of a reorderer 2110 and a packer 2120.

Input to the frame packer 150 may be one or more pieces of feature map information and/or one or more pieces of preprocessed feature map information. For example, the preprocessed feature map information may be the domain-transformed feature map information generated by the domain transformer 520.

The frame packer 150 may pack the input information into a frame. Here, the frame may have the form of the input to the feature map information encoder 170.

High-level information indicating that the information input to the frame packer 150 is information generated using one or more pieces of specific information may be signaled. Here, the high level may be a Video Frame Feature Parameter Set (VFFPS).

Also, domain information pertaining to the input information may be signaled at the high level.

Also, for each piece of input information generated using N pieces of specific information, pieces of low-level information may be signaled. For example, when the specific information is 3-dimensional information, the low-level information may include 1) a width, 2) a height, 3) a channel size, and 4) information about the size of a feature map after frame packing is applied. N may be an integer equal to or greater than 1.

When the one or more pieces of specific information is information to which domain transformation is applied, information about a basis matrix, an intermediate feature, and/or a coefficient may be included in the input information depending on the domain transformation method. Also, a flag indicating whether each of the basis matrix, the intermediate feature, and/or the coefficient is present in the input information may be signaled. The decoding apparatus 3800 parses this flag, thereby acquiring the input information.

One or more pieces of feature map information and/or one or more pieces of preprocessed feature map information may be input to the reorderer 2110. For example, the preprocessed feature map information may be the domain-transformed feature map information.

The packer 2120 may generate one or more packed frames. Through the packer 2120, the feature map information may include the one or more packed frames.

The functions, operations, and the like of the reorderer 2110 and the packer 2120 will be described in more detail below.

Figure 22:
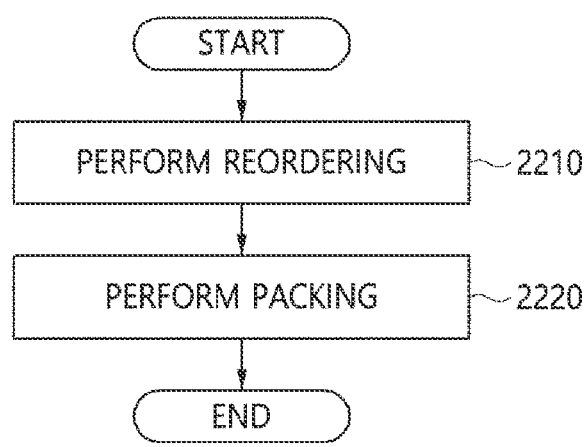
FIG. 22 is a flowchart of a frame-packing method according to an embodiment.

FIG. 22 is a flowchart of a frame-packing method according to an embodiment.

Step 250, described above with reference to FIG. 2, may include steps 2210 and 2220.

At step S2210, the reorderer 2110 may generate input to the packer 2120 by reordering the information input thereto into a reordering unit. The information input to the reorderer 2110 may be one or more pieces of multi-dimensional information.

As a reordering method, one or more of methods including Normalized Cross Correlation (NCC) and Structural SIMilarity (SSIM) may be used for the reordering unit.

For respective units of the input information, the same reordering method may be designated for the reordering units within the input information. Also, a common reordering method may be shared for the entire input information.

Reordering may be performed based on a specific axis of the input multi-dimensional information. The specific axis may comprise one or more axes.

When reordering is performed based on one or more specific axes, an index for each of the one or more specific axes may be signaled at a high level.

At step 2220, the packer 2120 may perform packing for the information input thereto.

The information input to the packer 2120 may be one or more pieces of multi-dimensional information to which reordering is applied, or may be one or more pieces of multi-dimensional information to which reordering is not applied.

The packer 2120 may pack the information input thereto into a form for input to the feature map information encoder 170.

The packer 2120 may split the multi-dimensional information input thereto based on a specific axis of the multi-dimensional information, and may form one or more frames by concatenating the pieces of information, generated by the split, in a specific order. For example, the specific order may be the order in which a raster scan is performed.

When the information input to the packer 2120 has a 3-dimensional form and when the information comprises multiple pieces of information having different heights or different widths, each piece thereof may be split into 2-dimensional forms based on a specific axis according to the order of the sizes of the multiple pieces of input information. The segments of the split input information are concatenated in a specific order, whereby a 2-dimensional frame may be generated. Here, the order of the sizes may be the ascending or descending order of the sizes. The specific order may be the order in which a raster scan is performed.

For the pieces of 3-dimensional information having different sizes, the widths, the heights, and the number of pieces of 2-dimensional information configuring the 3-dimensional information and/or the widths, the heights, and the coordinates thereof may be signaled. Here, the coordinates may represent the location at which the 2-dimensional information is first formed.

Also, when the frame formed by concatenating the pieces of input information according to the order of the sizes thereof does not have a rectangular shape in the above-described exemplary procedure, padding by which the remaining part of the rectangular shape is filled with a specific value may be performed in order to correct the shape. The remaining part may be a part that is not filled with the pieces of input information in the frame. For example, the remaining part may be an intermediate part or the last part in the process of concatenating the pieces of input information. Through such padding, a frame having a rectangular shape may be formed.

When padding is used, information thereabout may be signaled as a flag and/or an index.

For each frame generated by the packer 2120, information indicating which piece of information, among the one or more pieces of multi-dimensional information input to the framer packer 150, is included in the frame may be signaled at a high level.

Figure 23:
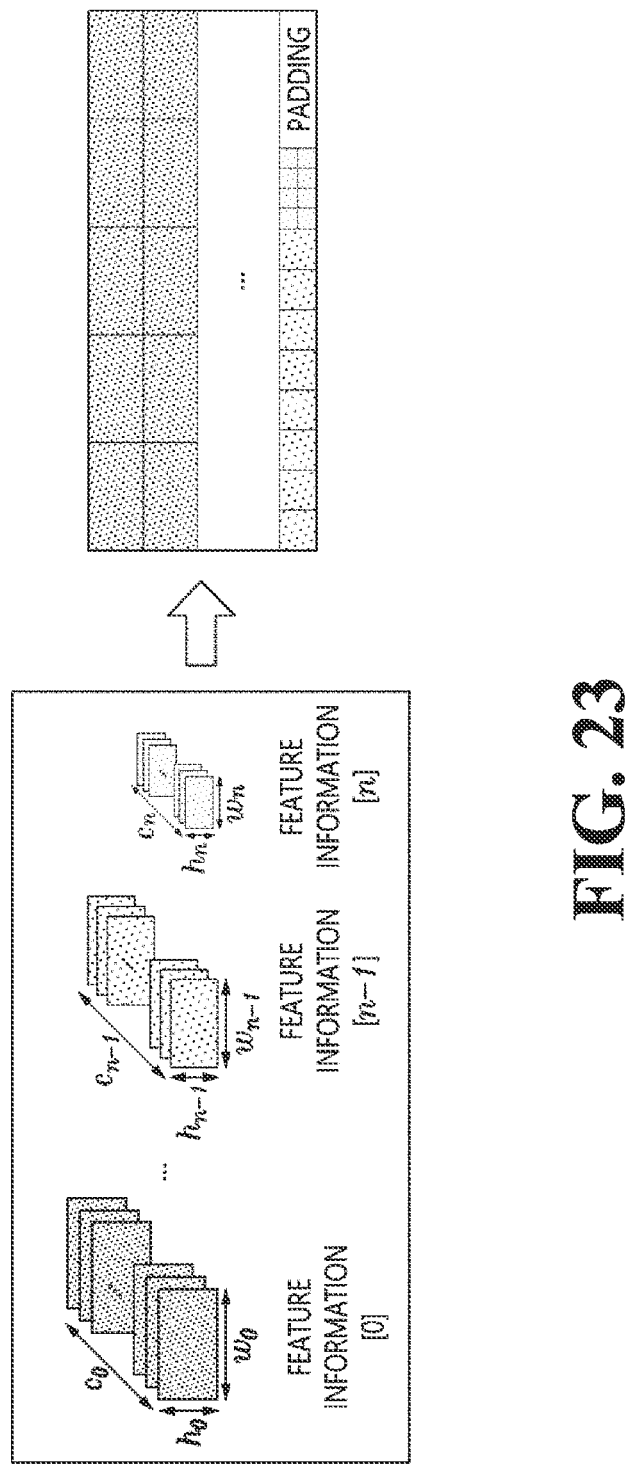
FIG. 23 illustrates a first packing method according to an example.

FIG. 23 illustrates a first packing method according to an example.

The packer 2120 may perform packing described with reference to FIG. 23.

The information input to the packer 2120 may be feature map information that is classified according to a pyramid level. The feature map information classified according to a pyramid level may be output from a feature pyramid network.

When the pyramid level of the feature pyramid network is n+1, n+1 pieces of feature map information may be split along the respective channel axes thereof, and the pieces of 2-dimensional feature map information generated by the split are concatenated in a specific order, whereby frame packing may be performed. Here, the specific order may be the order in which a raster scan is performed.

For each pyramid level, the height of the feature map information, the width thereof, and the number of channels therein may be signaled at a high level.

If a frame having a rectangular shape is not formed when all of the pieces of information input to the packer 2120 are concatenated in a specific order, padding is performed for the remaining part, whereby a rectangular frame may be generated. Here, the remaining part may indicate the part for which padding is required in order to make the frame have a rectangular shape.

Figure 24:
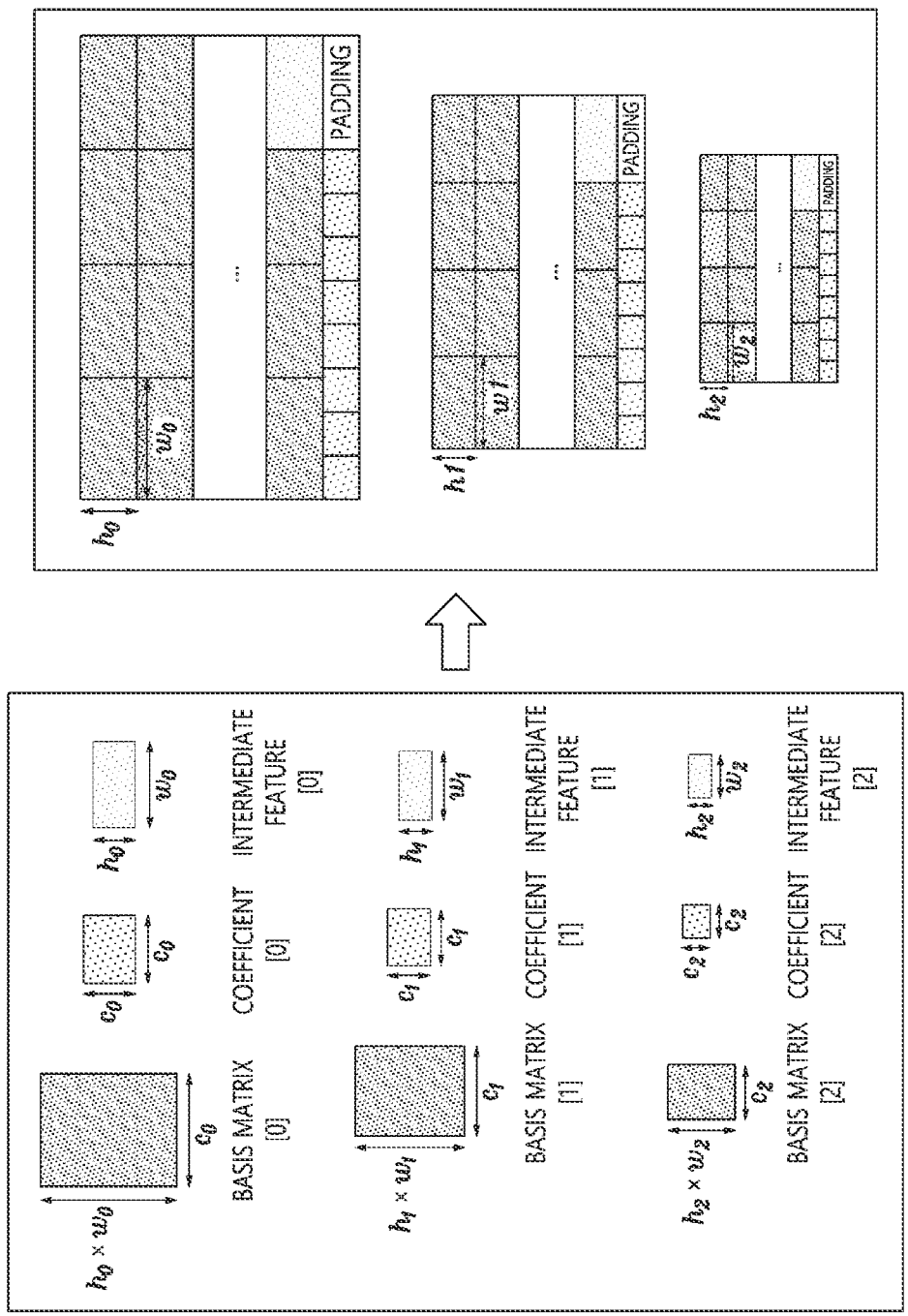
FIG. 24 illustrates a second packing method according to an example.

FIG. 24 illustrates a second packing method according to an example.

The packer 2120 may perform packing described with reference to FIG. 24.

The information input to the frame packer 150 may be output from a feature pyramid network having three pyramid levels. The domain transformer 520 of the feature map information preprocessor 140 may perform PCA for each of three pieces of feature map information. Through PCA, the basis matrix, the coefficient, and the intermediate feature of each piece of feature map information may be acquired.

The basis matrix of each feature level of the feature map information may be split to have the size $h_i \times w_i (i \in \{0, 1, 2\})$. The segments of the split basis matrix may be concatenated in the order in which a raster scan is performed.

Subsequently, an intermediate feature may be additionally concatenated.

Subsequently, the coefficients may be split using $a_i$ and $b_i$, and the split coefficients may be additionally concatenated. ($i \in \{0, 1, 2\}$)

Here, $a_i$ and $b_i$ may satisfy Equation (1) below.

$$a_i \times b_i = c_i \qquad (1)$$

Subsequently, when the frame generated by the concatenations does not have a rectangular shape, padding may be performed for the remaining part. Through such concatenations and padding, a single frame may be generated for each pyramid level.

Information for generating a frame may include 1) the order in which pieces of information constituting the frame are concatenated, 2) a basis matrix for each pyramid level, 3) the sizes of coefficients for each pyramid level, 4) $a_i$, and 5) $b_i$. ($i \in \{0, 1, 2\}$)

The information for generating a frame may be signaled as high-level information and/or low-level information.

Reference is again to be made to FIG. 2.

At step 260, the frame classifier 160 may receive the multiple packed frames output from the frame packer 150 as the input thereof.

The frame classifier 160 may group the multiple packed frames into a specific unit. For example, the specific unit may be a Group of Pictures (GOP).

When a single frame is output from the frame packer 150, processing performed by the frame classifier 160 may be omitted, and the single frame output from the frame packer 150 may be used as the input to the feature map information encoder 170.

The multiple packed frames may be included in different GOPs. When the frame classifier 160 classifies N input frames into M GOPs, information indicating the frames constituting each of the GOPs may be signaled as high-level information and/or low-level information. N may be an integer equal to or greater than 1. M may be an integer equal to or greater than 1.

Figure 25:
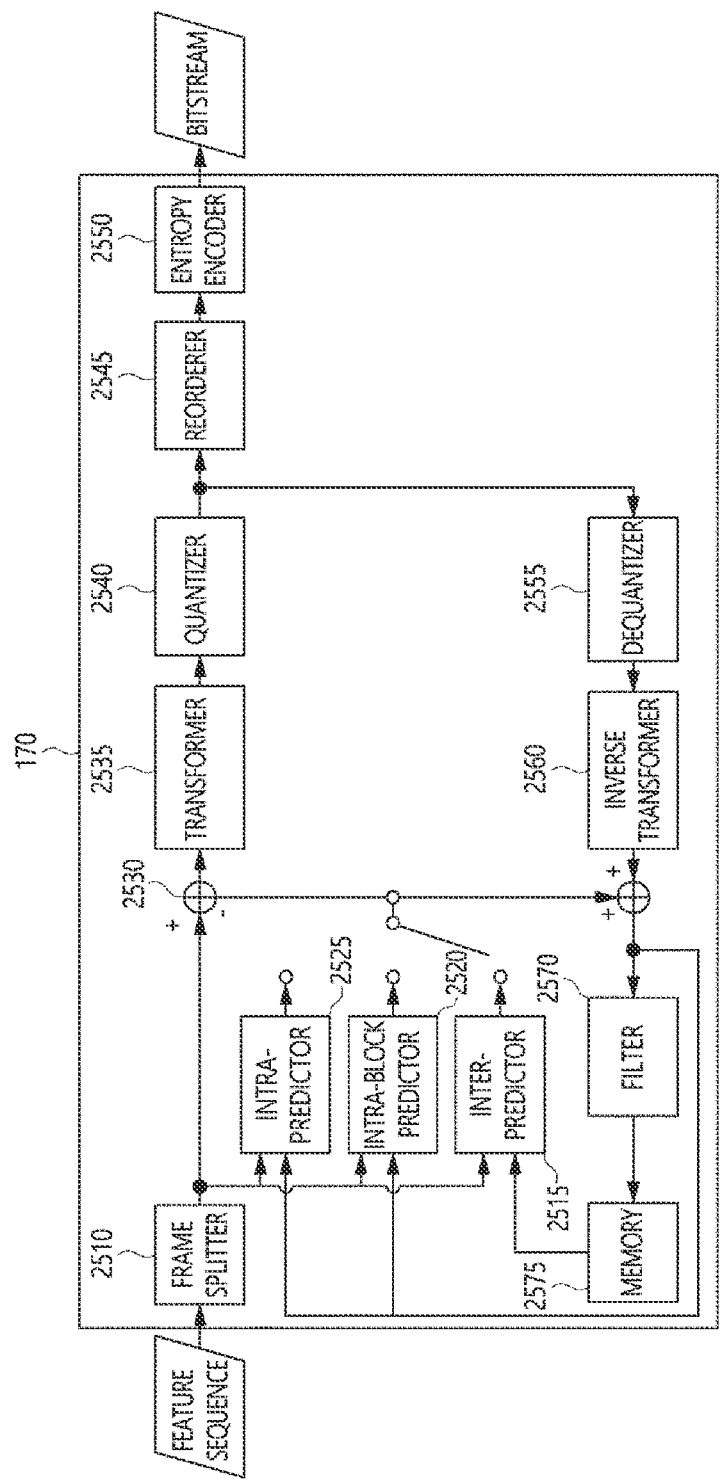
FIG. 25 illustrates the structure of a feature map information encoder according to an example.

FIG. 25 illustrates the structure of a feature map information encoder according to an example.

The feature map information encoder 170 may include one or more of a frame splitter 2510, an inter-predictor 2515, an intra-block predictor 2520, an intra-predictor 2525, a subtractor 2530, a transformer 2535, a quantizer 2540, a reorderer 2545, an entropy encoder 2550, a dequantizer 2555, an inverse transformer 2560, an adder 2565, a filter 2570, and memory 2575.

Information input to the feature map information encoder 170 may be a feature sequence. The feature sequence may be information output from the frame packer 150 or the frame classifier 160. Alternatively, the feature sequence may be one or more frames.

The feature map information encoder 170 performs encoding on the input information, thereby generating a feature map information bitstream.

The feature map information encoder 170 may generate and output a feature map information bitstream.

The feature map information encoder 170 may be an apparatus for encoding video. The feature sequence input to the feature map information encoder 170 may correspond to video input to the apparatus for encoding video.

The functions, operations, and the like of the frame splitter 2510, the inter-predictor 2515, the intra-block predictor 2520, the intra-predictor 2525, the subtractor 2530, the transformer 2535, the quantizer 2540, the reorderer 2545, the entropy encoder 2550, the dequantizer 2555, the inverse transformer 2560, the adder 2565, the filter 2570, and the memory 2575 will be described in more detail below.

Figure 26:
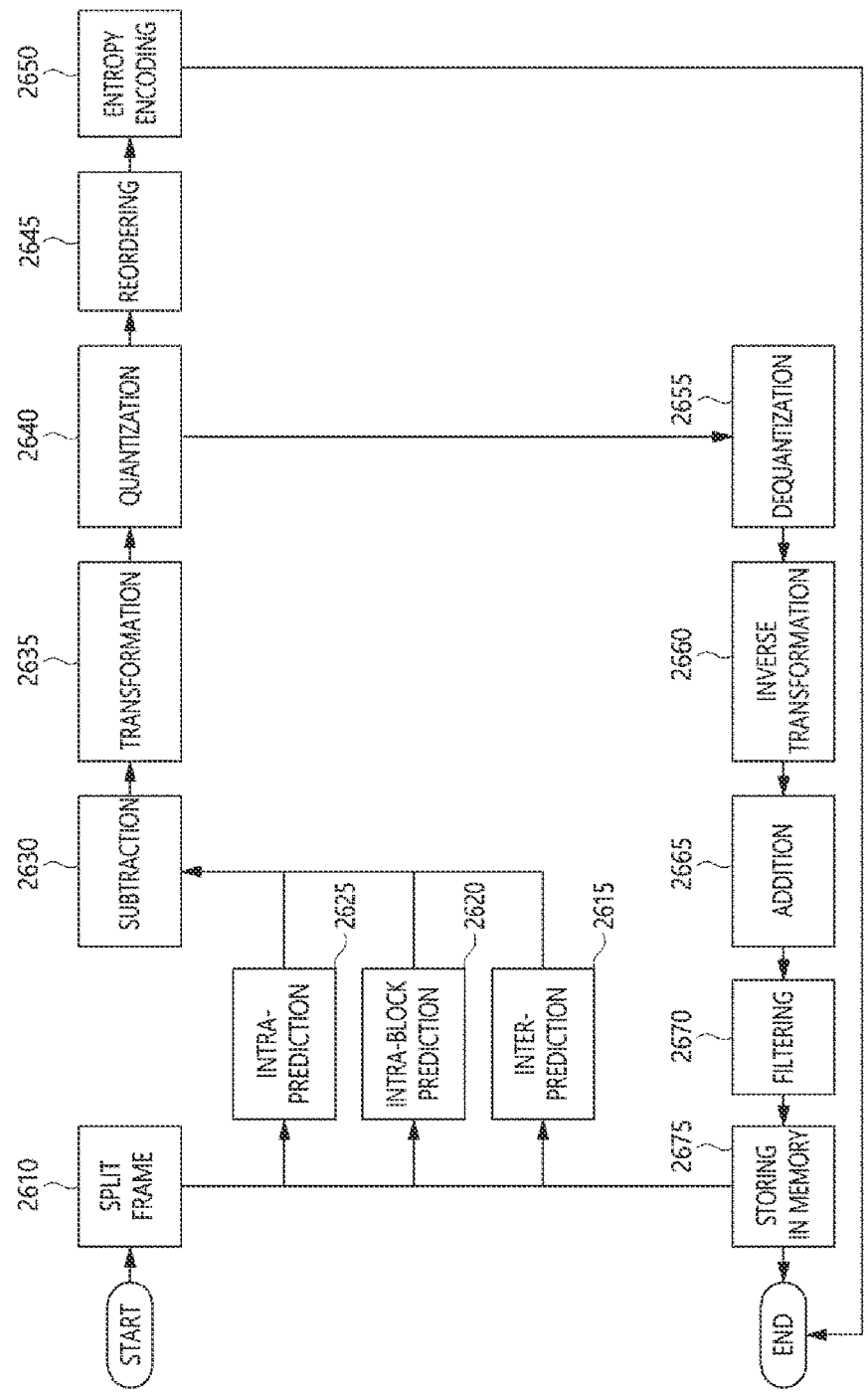
FIG. 26 is a flowchart of a method for encoding feature map information according to an example.

FIG. 26 is a flowchart of a method for encoding feature map information according to an example.

Step 260, described above with reference to FIG. 2, may include steps 2610, 2615, 2620, 2625, 2630, 2635, 2640, 2645, 2650, 2655, 2660, 2665, 2670, and 2675.

At step 2610, the frame splitter 2510 splits each frame of the feature sequence into specific units, thereby generating one or more specific units. The specific unit may be a slice, a tile, a Coding Tree Unit (CTU), or the like.

Here, when the categories of multiple packing units in a single frame are different from each other (e.g., same_category_flag=0), a split may be performed on the boundary of the regions of the multiple packing units.

At step 2615, the inter-predictor 2515 performs inter-prediction using a reconstructed frame stored in the memory 2575, thereby generating a predicted block for a current block of a current frame.

The current frame may represent the frame to be encoded and/or decoded by the feature map information encoder 170. The current block may represent the block to be encoded and/or decoded.

The current block may be part of the current frame. The current block may be part of the specific unit.

Figure 27:
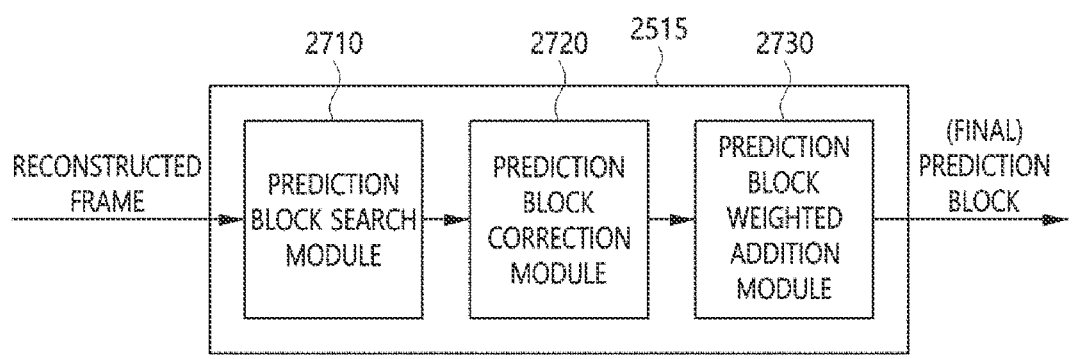
FIG. 27 is a structural diagram of an inter-predictor according to an example.

FIG. 27 is a structural diagram of an inter-predictor according to an example.

The inter-predictor 2515 may include one or more of a prediction block search module 2710, a prediction block correction module 2720, and a prediction block weighted addition module 2730.

The prediction block search module 2710 may search for and determine one or more (optimal) prediction blocks within a reconstructed frame stored in the memory 2575.

The prediction block correction module 2720 may correct the one or more prediction blocks determined by the prediction block search module 2710. The correction may include filtering.

When the one or more prediction blocks determined by the prediction block search module 2710 are multiple prediction blocks, the prediction block weighted addition module 2730 may generate a single (final) prediction block through weighted addition of the multiple prediction blocks.

The functions, operations, and the like of the prediction block search module 2710, the prediction block correction module 2720, and the prediction block weighted addition module 2730 will be described in more detail below.

Figure 28:
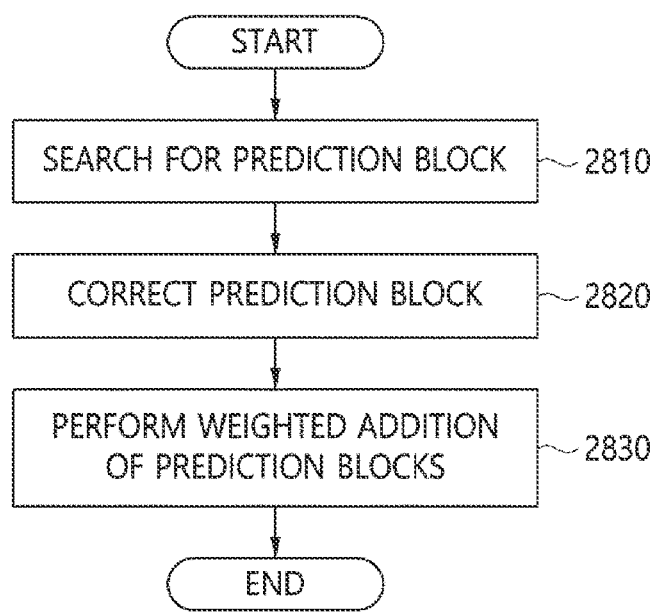
FIG. 28 is a flowchart of an inter-prediction method according to an example.

FIG. 28 is a flowchart of an inter-prediction method according to an example.

Step 2615, described above with reference to FIG. 26, may include steps 2810, 2820, and 2830.

At step 2810, the prediction block search module 2710 may search for one or more (optimal) prediction blocks in a reconstructed frame stored in the memory 2575, and may determine the prediction block and motion information pertaining thereto based on the search.

The reconstructed frame may be a reference picture.

The current frame may be one or more frames generated by the frame packer 150 and to which packing into a packing unit is applied. The one or more frames may be transformed frames or frames that are not transformed.

For example, the category of a packing unit may include 1) a feature group that is not transformed, 2) a transform matrix, 3) a transform coefficient, and the like. For example, the category of the packing unit may include a basis matrix, a coefficient, an intermediate feature, and the like.

Figure 29:
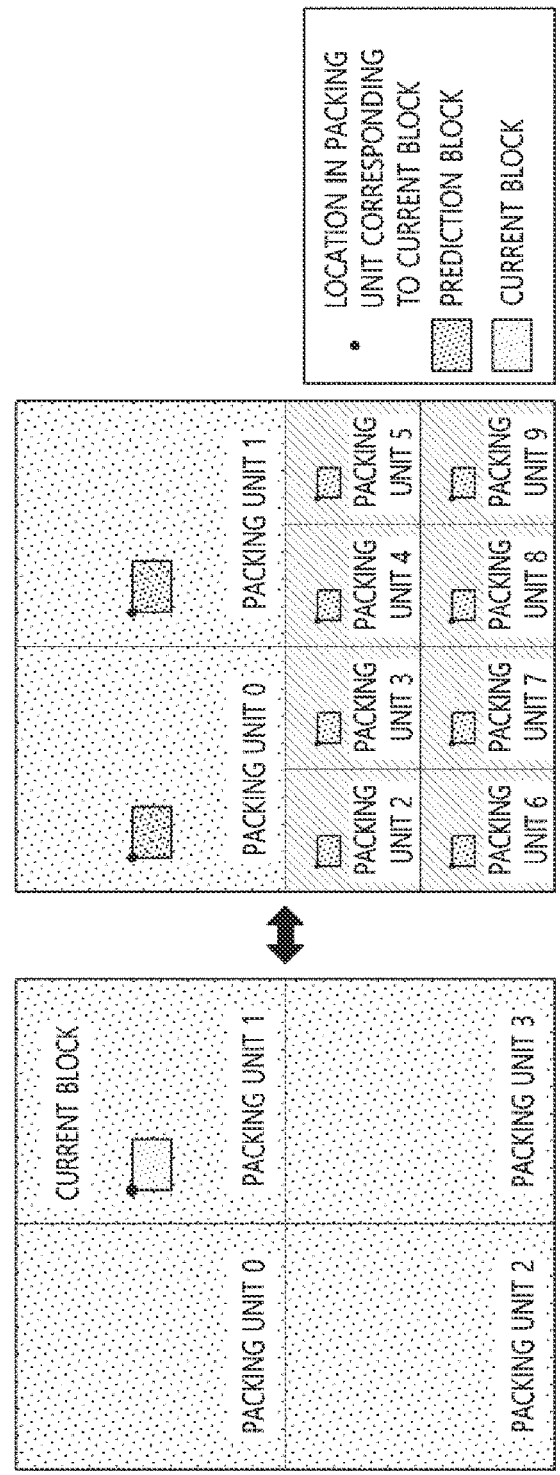
FIG. 29 illustrates a search of a prediction block according to an example.

When the reference picture includes one or more packing units having the same category as the category of the packing unit including the current block, a prediction block may be searched for, as in the description made with reference to FIG. 29.

FIG. 29 illustrates searching for a prediction block according to an example.

The location corresponding to a current block may be acquired in a reference picture like the reference frame illustrated on the right side of FIG. 29.

In a specific range determined based on the acquired location, a sub-reference region list may be configured using one or more packing units having the same category as the category of the packing unit including the current block.

For each packing unit in the sub-reference region list, the scale of the packing unit including the current block may be derived through a comparison with the packing unit of the sub-reference region list, and the location corresponding to the current block may be derived in the packing unit of the sub-reference region list in consideration of the scale. A prediction block may be generated with reference to the derived location.

When a packing unit having the same category as the category of the packing unit including the current block is not present in a reference picture, the location corresponding to the current block may be found in the reference picture, and a prediction block having the same size as the current block may be generated in a specific range determined based on the found location.

Reference is again to be made to FIG. 28.

At step 2820, the prediction block correction module 2720 may correct a prediction block based on calculation using one or more of 1) reconstructed values adjacent to the upper part of the current block, 2) reconstructed values adjacent to the left side of the current block, 3) reconstructed values adjacent to the upper part of the prediction block, and 4) reconstructed values adjacent to the left side of the prediction block. Through such correction, a corrected prediction block may be derived.

For example, such calculation may be a least squares method, or may include the least squares method.

Here, whether a corrected prediction block is derived may be determined depending on the relationship between the coordinates of the upper-left corner of the current block and the coordinates the upper-left corner of the packing unit including the current block.

When the size of the current block is different from the size of the prediction block, up-sampling or down-sampling, by which the size of the prediction block is adjusted to be the same as the size of the current block, may be applied to the prediction block. The above-described correction of the prediction block may be performed after up-sampling or down-sampling.

Figure 30:
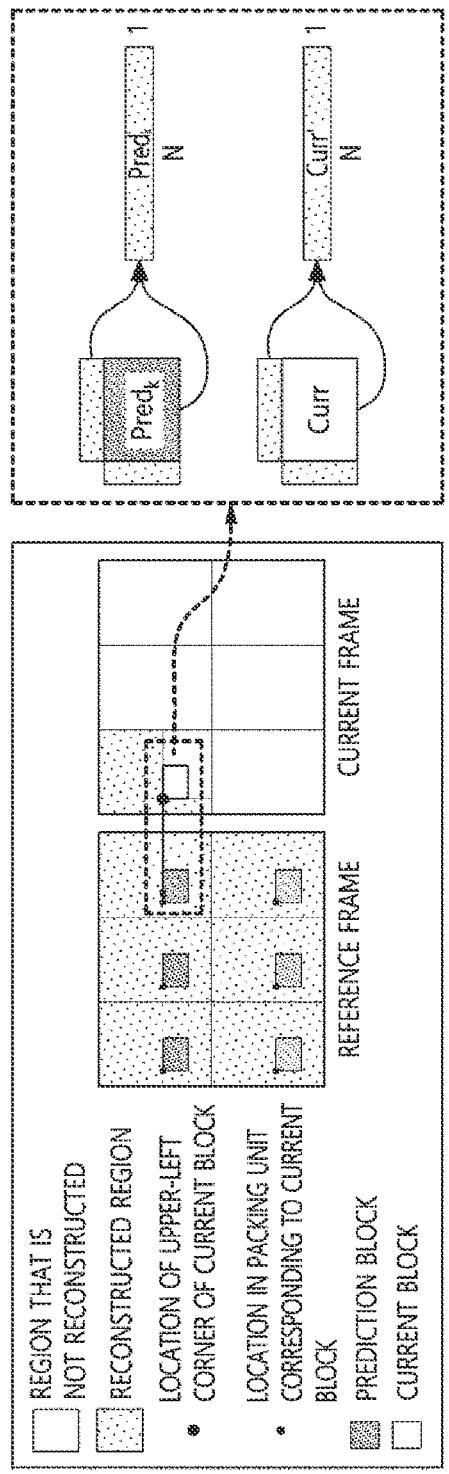
FIG. 30 illustrates correction of a prediction block according to an example.

FIG. 30 illustrates correction of a prediction block according to an example.

In FIG. 30, the operation of a prediction block correction module is illustrated.

Respective packing units present in a current frame and a reference frame may be configured as respective channels of one piece of feature map information. In this case, the category of a packing unit for the current block of the current frame may be the same as the category of a packing unit for the prediction block of the reference frame.

When the category of the packing unit for the current block of the current frame is the same as the category of the packing unit for the prediction block of the reference frame, Pred'$_k$ and Curr' may be defined.

Pred'$_k$ may be N samples adjacent to the prediction block. Each of the N samples may be a reconstructed sample adjacent to the upper part or left side of the prediction block.

Curr' may be N samples adjacent to the current block. Each of the N samples may be a reconstructed sample adjacent to the upper part or left side of the current block.

A mapping function f(Pred'$_k$) may be defined using a specific real number $\alpha_k$ and a specific real number $\beta_k$, as shown in Equation (2) below:

$$f(\text{Pred}_k) = \alpha_k \times \text{Pred}_k(q) + \beta_k, \text{ where } q=0, \ldots, N \tag{2}$$

An error, which is the difference between f(Pred'$_k$) and Curr', may be defined as shown in Equation (3) below:

$$\text{Error} = \sum_{p=1}^{N} (\text{Curr}'(p) - (\alpha_k \times \text{Pred}_k(p) + \beta_k))^2 \tag{3}$$

Values of $\alpha_k$ and $\beta_k$ at which the error is 0 may be acquired using Equation (4) and Equation (5) below:

$$\alpha_k = \frac{N \times \left(\sum_{p=1}^{N} \text{Curr}'(p) \times \text{Pred}'_k(p)\right) - \left(\sum_{p=1}^{N} \text{Curr}'(p)\right) \times \left(\sum_{p=1}^{N} \times \text{Pred}'_k(p)\right)}{N \times \left(\sum_{p=1}^{N} \text{Curr}'(p)\right)^2 - \left(\sum_{p=1}^{N} \text{Curr}'(p)\right) \times \left(\sum_{p=1}^{N} \text{Curr}'(p)\right)} \tag{4}$$

$$\beta_k = \frac{\left(\sum_{p=1}^{N} \times \text{Pred}'_k(p)\right) - \alpha_k \times \left(\sum_{p=1}^{N} \text{Curr}'(p)\right)}{N} \tag{5}$$

Using the above equations, the relationship between the current block and the prediction block may be acquired. As shown in Equation (6) below, $\alpha_k$ and $\beta_k$ are applied to the prediction block Pred'$_k$, whereby the (final) prediction block Pred$_k^f$ may be acquired.

$$\text{Pred}_k^f(p) = \alpha_k \times \text{Pred}_k(p) + \beta_k \tag{6}$$

By acquiring the (final) prediction block, correction of the prediction block may be performed.

The mapping function derived as described above may be acquired for the relationship between packing units (that is, a pair comprising the packing unit of the current frame and the packing unit of the reference frame). Mapping functions may be acquired for pairs comprising the packing units of the current frame and the packing units of the reference frames.

The acquired mapping functions may be stored in a table. When the mapping functions are stored, the already acquired mapping function may be used using an index for the table without an additional procedure for acquiring a mapping function in the procedures of predicting blocks. The index for the region of the packing unit may be stored and used as an index for a slice and/or a tile.

In the process of searching for a prediction block through the above-described procedure, filtering may be applied to the prediction block at a location accessed through a motion vector, and the prediction block to which filtering is applied may be used for the current block.

The filter used for filtering may be obtained from a predefined table, or may be directly acquired in the encoding and/or decoding procedure. Also, when an inter-prediction mode is used in the procedure of predicting an already reconstructed upper block and/or an already reconstructed left block, the filter used for the already reconstructed upper block and/or the already reconstructed left block may also be used for the prediction block.

Reference is again to be made to FIG. 28.

At step 2830, the prediction block weighted addition module 2730 performs weighted addition of one or more prediction blocks, thereby generating a single (final) prediction block. Each of the one or more prediction blocks may be a prediction block to which filtering is applied, or may be a prediction block to which filtering is not applied.

The weight for weighted addition may be set based on the distance between a frame including a current block and a reference frame including the prediction block or on a Picture Order Count (POC). Alternatively, the weight for weighted addition may be set based on the spatial distance between the current block and the prediction block.

For example, the lower the POC, the greater the weight. The shorter the distance, the greater the weight.

Reference is again to be made to FIG. 26.

At step 2620, the intra-block predictor 2520 may generate a prediction block for a current block using already reconstructed information of a current frame including the current block.

The already reconstructed information of the current frame may be already reconstructed blocks and/or already reconstructed samples in the current frame.

Figure 31:
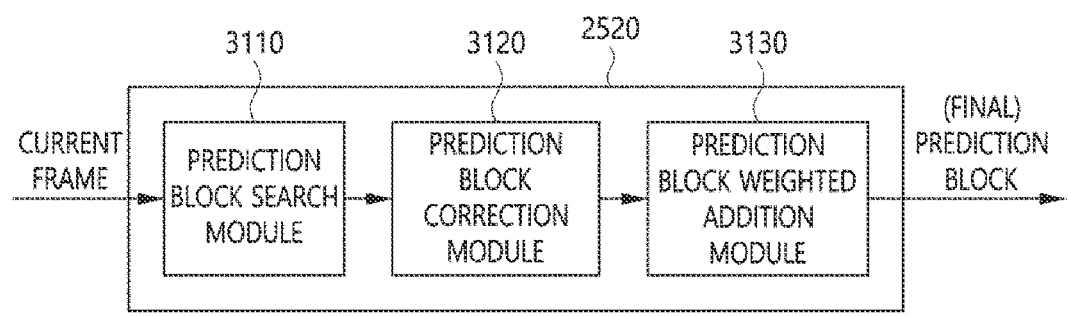
FIG. 31 is a structural diagram of an intra-block predictor according to an example.

FIG. 31 is a structural diagram of an intra-block predictor according to an example.

The intra-block predictor 2520 may include one or more of a prediction block search module 3110, a prediction block correction module 3120, and a prediction block weighted addition module 3130.

The prediction block search module 3110 may search for and determine one or more (optimal) prediction blocks in the already reconstructed information within a current frame including a current block.

The prediction block correction module 3120 may correct the one or more prediction blocks determined by the prediction block search module 3110. The correction may include filtering.

When the one or more prediction blocks determined by the prediction block search module 3110 comprise the multiple prediction blocks, the prediction block weighted addition module 3130 may generate a single (final) prediction block through weighted addition of the multiple prediction blocks.

The functions, operations, and the like of the prediction block search module 3110, the prediction block correction module 3120, and the prediction block weighted addition module 3130 will be described in more detail below.

Figure 32:
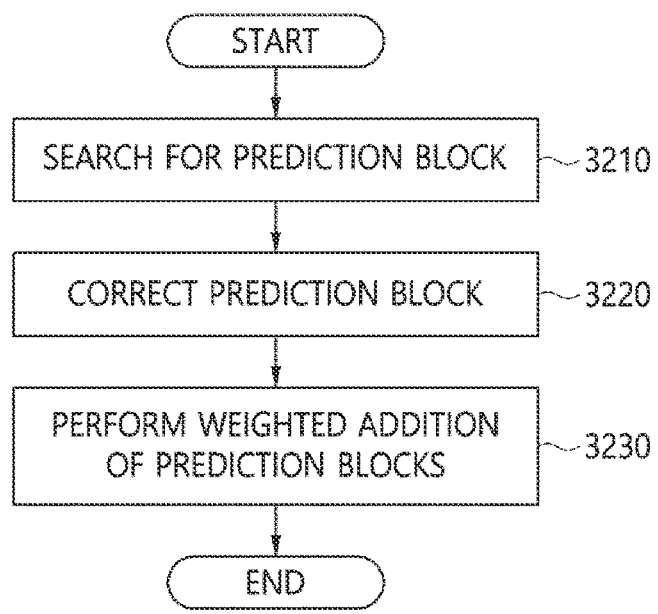
FIG. 32 is a flowchart of an intra-block prediction method according to an example.

FIG. 32 is a flowchart of an intra-block prediction method according to an example.

Step 2620, described above with reference to FIG. 26, may include steps 3210, 3220 and 3230.

At step 3210, the prediction block search module 3110 may search for and determine one or more (optimal) prediction blocks in already reconstructed information within a current frame including a current block.

Figure 33:
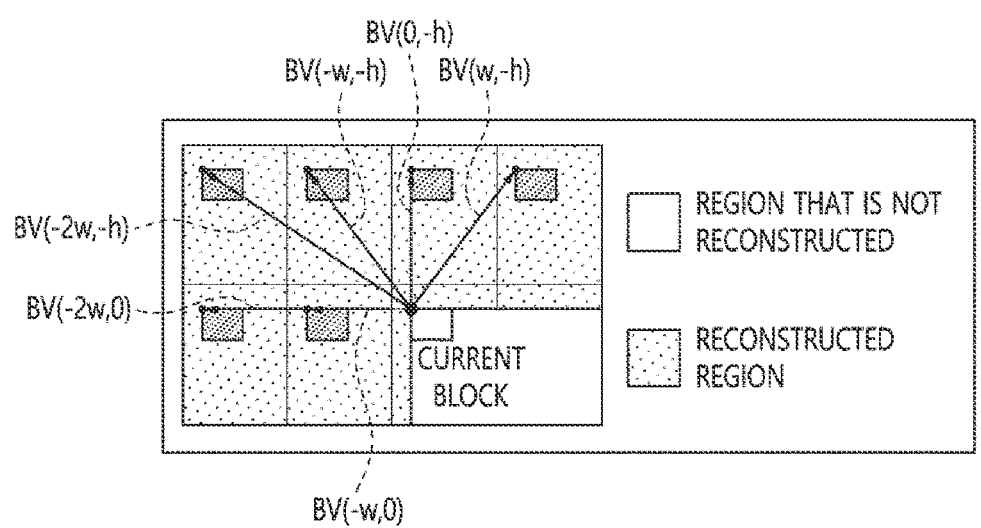
FIG. 33 illustrates a first prediction block search method according to an example.

FIG. 33 illustrates a first prediction block search method according to an example.

The prediction block search module 3110 may search for and determine one or more (optimal) prediction blocks only in a specific candidate region of the current frame.

The specific candidate region may be determined based on the size of a packing unit for the information input to the frame packer 150.

The size of the packing unit for the information input to the frame packer 150 may be w×h. For example, the coordinates of the upper-left corner of the current block may be (x, y).

When a prediction block is searched for, the size of the vertical motion vector and the size of the horizontal motion vector of a block motion vector indicating the prediction block may be limited to integer multiples of w and h. For example, the size of the vertical motion vector may be an integer multiple of h. The size of the horizontal motion vector may be an integer multiple of w.

Through this limitation, searching for the prediction block may be performed only in the specific candidate region.

Figure 34:
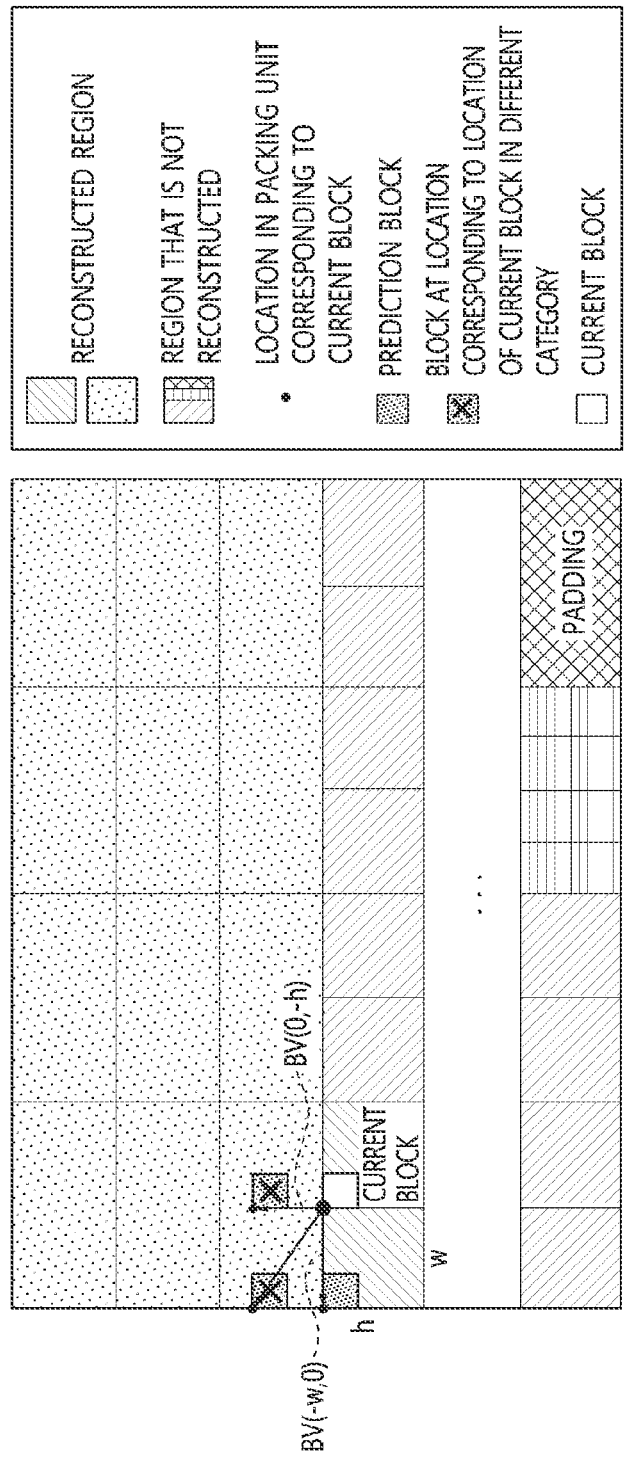
FIG. 34 illustrates a second prediction block search method according to an example.

FIG. 34 illustrates a second prediction block search method according to an example.

By applying packing to the information input to the frame packer 150, a frame to which packing is applied may be generated.

When the categories of the packing units in the frame to which packing is applied are different from each other (e.g., when the categories are a basis matrix, a coefficient, and an intermediate feature after domain transformation is applied to the feature map information), the prediction block search module 3110 may search for and determine one or more (optimal) prediction blocks only in a specific candidate region of the current frame.

The specific candidate region may be determined based on the size of the packing unit for the information input to the frame packer 150.

The size of the packing unit for the information input to the frame packer 150 may be w×h. The coordinates of the upper-left corner of the current block may be (x, y).

When a prediction block is searched for, the size of the vertical motion vector and the size of the horizontal motion vector of a block motion vector indicating the prediction block may be limited to integer multiples of w and h. For example, the size of the vertical motion vector may be an integer multiple of h. The size of the horizontal motion vector may be an integer multiple of w.

By determining the size of the vertical motion vector and the size of the horizontal motion vector, searching for the prediction block may be performed only in the specific region.

Here, when the packing unit including the region having the already reconstructed information and accessed through the block motion vector generated through the integer multiple of the size is not the packing unit including the current block, searching of the region may be limited.

Figure 35:
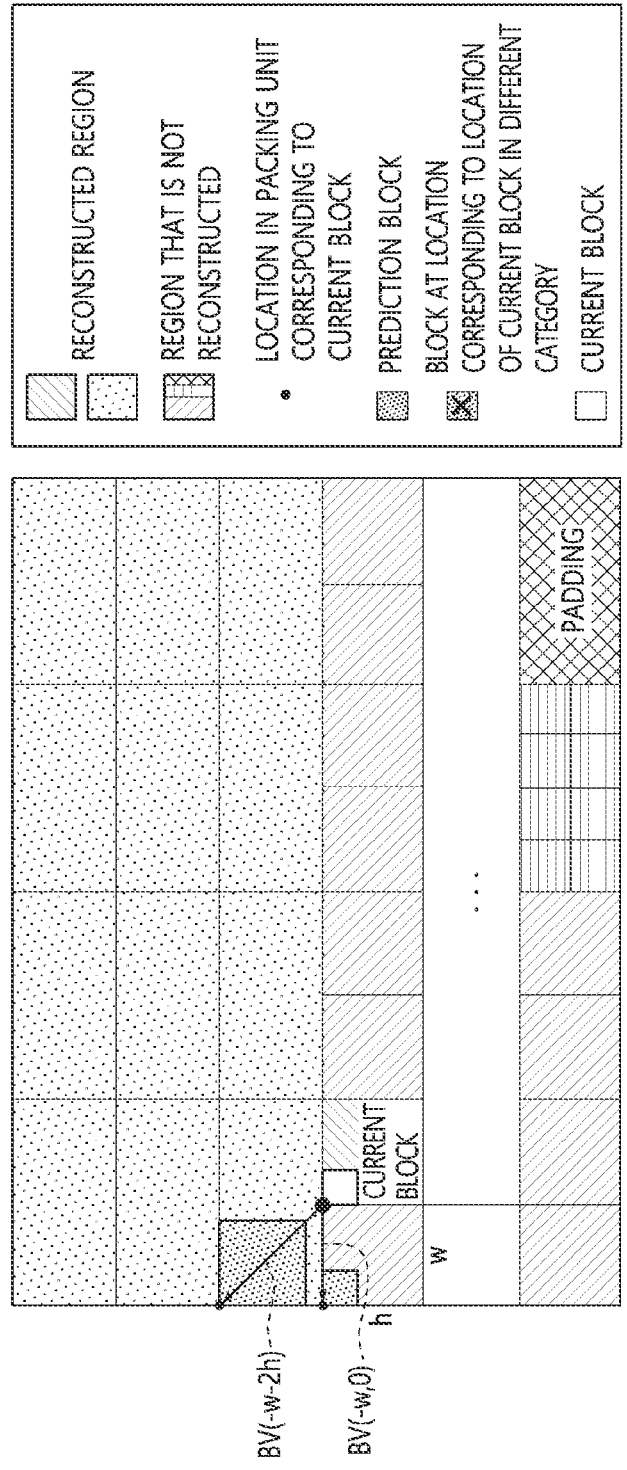
FIG. 35 illustrates a third prediction block search method according to an example.

FIG. 35 illustrates a third prediction block search method according to an example.

Figure 36:
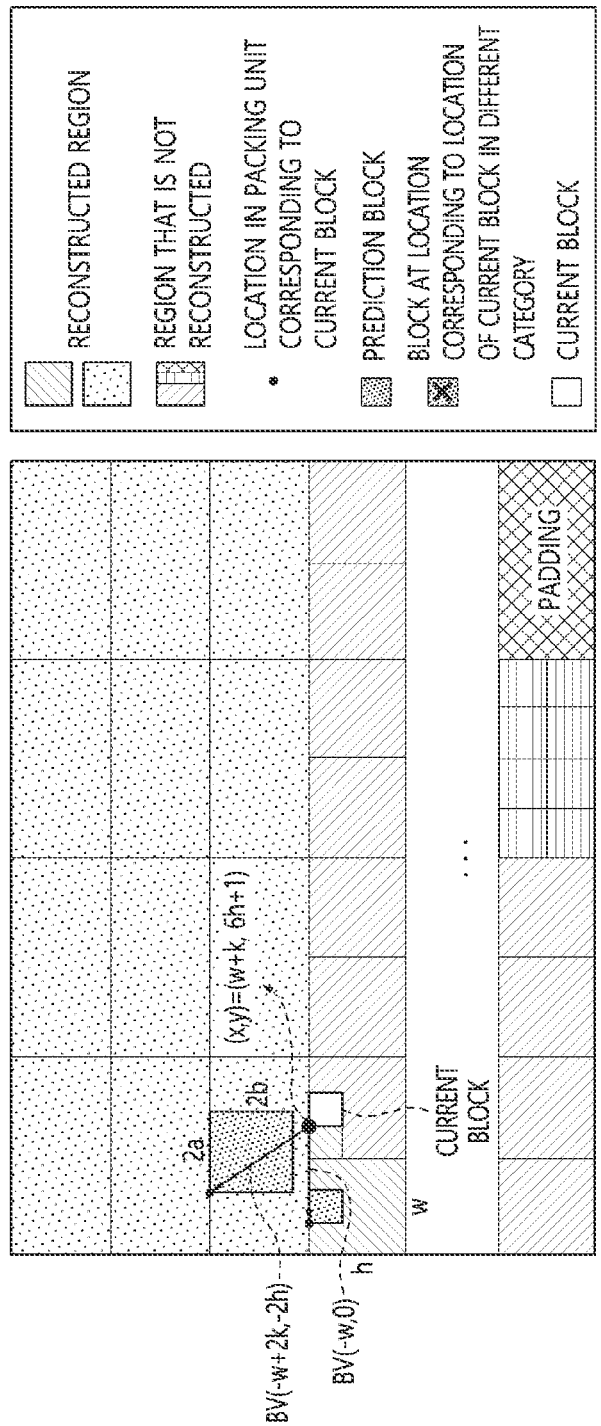
FIG. 36 illustrates a fourth prediction block search method according to an example.

FIG. 36 illustrates a fourth prediction block search method according to an example.

In the third prediction block search method, the case in which a current block is adjacent to the upper-left boundary of the packing unit is illustrated.

In the fourth prediction block search method, the case in which a current block is adjacent to the upper boundary of the packing unit is illustrated.

By applying packing to the information input to the frame packer 150, a frame to which packing is applied may be generated.

When the categories of the packing units in the frame to which packing is applied are the same as each other (e.g., when the packing units correspond to feature map information for each pyramid level output from a feature pyramid network), the prediction block search procedure to be described below may be performed.

When packing is performed for the information input to the frame packer 150, the size of the packing unit including the current block and concatenated in the frame by packing may be w×h.

When a prediction block is searched for, the size of the vertical motion vector and the size of the horizontal motion vector of a block motion vector indicating the prediction block may be determined using integer multiples of w and h. For example, the size of the vertical motion vector may be an integer multiple of h. The size of the horizontal motion vector may be an integer multiple of w.

The reconstructed information may be accessed using the block motion vector acquired as described above. When the first packing unit including a region having reconstructed information is not the second packing unit including the current block and when the difference between the scale of the first packing unit and the scale of the second packing unit is p times (or when the scale of the first packing unit and the scale of the second packing unit have a difference of p multiples of any one of the scales), the block motion vector for searching for the prediction block may be generated using 1) the coordinates (x, y) of the upper-left corner of the current block and 2) the width and height (w, h) of the packing unit including the current block. Searching for the prediction block may be performed using the generated block motion vector.

In an embodiment, Equation (7) and Equation (8) below may be defined for x and y.

$$x = n \times w + k \quad (7)$$

$$y = m \times h + l \quad (8)$$

Each of n, m, k and l may be a specific integer.

A search block motion vector based on Equation (7) and Equation (8) may indicate a prediction block. The search block motion vector may be determined using 1) a block motion vector and/or 2) n, m, k and l.

The block motion vector may be acquired using an integer multiple of (w, h). When the prediction block is searched for, the size of the vertical motion vector and the size of the horizontal motion vector of the block motion vector indicating the prediction block may be limited to integer multiples of w and h. For example, the size of the vertical motion vector may be an integer multiple of h. The size of the horizontal motion vector may be an integer multiple of w.

Also, when the search is performed, the scale of the prediction block may be taken into consideration. A prediction block having a size of p multiples of the size of the current block may be searched for. That is, the size of the prediction block may be p multiples of the size of the current block. p may be a nonzero real number.

In the procedure of adjusting the resolution of the prediction block, filtering using a Discrete Cosine Transform Interpolation Filter (DCT-IF) or the like may be performed.

An intra-block reference list for one or more packing units present in a single frame may be configured.

For each of the packing units in the intra-block reference list, the scale of the packing unit including the current block relative to the packing unit in the intra-block reference list may be considered. In consideration of the scale, a prediction block may be generated with reference to the location corresponding to a target block in the packing unit of the intra-block reference list.

Here, the index for the intra-block reference list is signaled, without signaling the block vector, whereby intra-prediction may be performed.

Reference is again to be made to FIG. 32.

The current block and the prediction block may be selected through the above-described procedure of searching for a current block and a prediction block.

At step 3220, the prediction block correction module 3120 may correct the prediction block through calculation using one or more of 1) reconstructed values adjacent to the upper part of the current block, 2) reconstructed values adjacent to the left side of the current block, 3) reconstructed values adjacent to the upper part of the prediction block, and 4) reconstructed values adjacent to the left side of the prediction block. Through such correction, a corrected prediction block may be derived.

For example, such calculation may be a least squares method, or may include the least squares method.

Here, whether the corrected prediction block is derived may be determined depending on the relationship between the coordinates of the upper-left corner of the current block and the coordinates of the upper-left corner of the packing unit including the current block.

Figure 37:
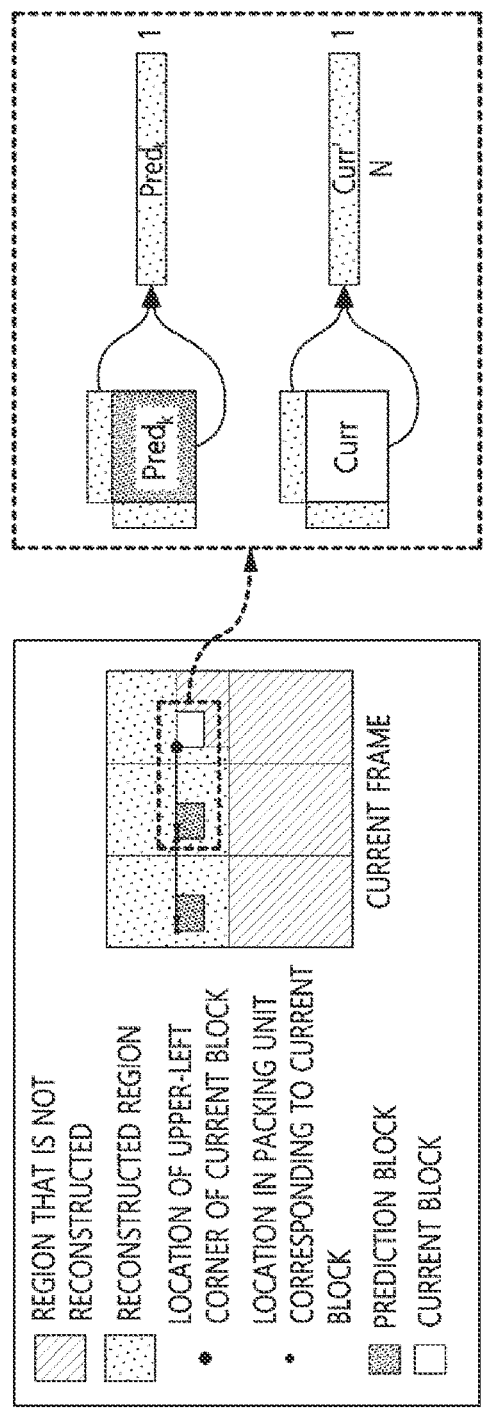
FIG. 37 illustrates correction of a prediction block according to an example.

FIG. 37 illustrates correction of a prediction block according to an example.

In FIG. 37, the operation of the prediction block correction module is illustrated.

Respective packing units present in a current frame may be configured as respective channels of one piece of feature map information. In this case, the category of a packing unit for the current block of the current frame may be the same as the category of a packing unit for a prediction block.

When the category of the packing unit for the current block of the current frame is the same as the category of the packing unit for the prediction block, Pred'$_k$ and Curr' may be defined.

Pred'$_k$ may be N samples adjacent to the prediction block. Each of the N samples may be a reconstructed sample adjacent to the upper part or left side of the prediction block.

Curr' may be N samples adjacent to the current block. Each of the N samples may be a reconstructed sample adjacent to the upper part or left side of the current block.

A mapping function f(Pred'$_k$) may be defined using a specific real number $\alpha_k$ and a specific real number $\beta_k$, as shown in Equation (9) below:

$$f(\text{Pred}_k) = \alpha_k \times \text{Pred}_k(q) + \beta_k, \text{ where } q = 0, \ldots, N$$

An error, which is the difference between f(Pred'$_k$) and Curr', may be defined as shown in Equation (10) below:

$$\text{Error} = \sum_{p=1}^{N}(\text{Curr}'(p) - (\alpha_k \times \text{Pred}_k(p) + \beta_k))^2 \quad (10)$$

Values of $\alpha_k$ and $\beta_k$ at which the error is 0 may be acquired using Equation (11) and Equation (12) below:

$$\alpha_k = \frac{N \times \left(\sum_{p=1}^{N} Curr'(p) \times Pred'_k(p)\right) - \left(\sum_{p=1}^{N} Curr'(p)\right) \times \left(\sum_{p=1}^{N} \times Pred'_k(p)\right)}{N \times \left(\sum_{p=1}^{N} Curr'(p)\right)^2 - \left(\sum_{p=1}^{N} Curr'(p)\right) \times \left(\sum_{p=1}^{N} Curr'(p)\right)} \quad (11)$$

$$\beta_k = \frac{\left(\sum_{p=1}^{N} \times Pred'_k(p)\right) - \alpha_k \times \left(\sum_{p=1}^{N} Curr'(p)\right)}{N} \quad (12)$$

Using the above equations, the relationship between the current block and the prediction block may be acquired. As shown in Equation (13) below, $\alpha_k$ and $\beta_k$ are applied to the prediction block Pred'$_k$, whereby the (final) prediction block Pred$_k^f$ may be acquired.

$$\text{Pred}_k^f(p) = \alpha_k \times \text{Pred}_k(p) + \beta_k \quad (13)$$

The (final) prediction block is acquired as described above, whereby correction of the prediction block may be performed.

The mapping function derived as described above may be acquired for the relationship between the packing units (that is, a pair comprising the packing units of the current frame). Mapping functions may be acquired for pairs comprising the packing units of the current frame.

The acquired mapping functions may be stored in a table. When the mapping functions are stored, the already acquired mapping function may be used using an index for the table without an additional procedure for acquiring a mapping function in the procedures of predicting blocks. The index for the region of the packing unit may be stored and used as an index for a slice and/or a tile.

In the process of searching for a prediction block through the above-described procedure, filtering may be applied to the prediction block at a location accessed through a block motion vector, and the prediction block to which filtering is applied may be used for the current block.

The filter used for filtering may be derived from a predefined table, or may be directly acquired in the encoding and/or decoding procedure. Also, when an inter-prediction mode is used in the procedure of predicting an already reconstructed upper block and/or an already reconstructed left block, the filter used for the already reconstructed upper block and/or the already reconstructed left block may also be used for the prediction block.

In order to acquire the optimal prediction block, an equation using the prediction block and the current block is used, whereby the (final) prediction block may be acquired. The prediction block may be a prediction block to which filtering is applied or a prediction block to which filtering is not applied.

The equation may include one or more of Sum of Absolute Differences (SAD) and Sum of Transformed Differences (SATD).

The number of blocks that are searched for in the procedure of searching for the prediction block (that is, candidates for the prediction block) may be limited depending on the size of the current block.

Here, among the multiple candidates for the prediction block, candidates for the prediction block for which SAD and/or SATD with the current block is less than a specific threshold value may be selected as prediction blocks.

When multiple prediction blocks are selected, the maximum number of prediction blocks may be limited. That is, a threshold value for the number of prediction blocks may be used.

Reference is again to be made to FIG. 32.

In the above-described procedure of searching for a prediction block, one or more prediction blocks may be acquired.

At step 3230, the prediction block weighted addition module 3130 may generate a single (final) prediction block through weighted addition of the one or more prediction blocks.

The weight in the weighted addition may be derived from a predefined table including multiple weights.

Reference is again to be made to FIG. 26.

At step 2625, the intra-predictor 2525 may generate a prediction block for the current block by performing intra-prediction using already reconstructed information of a current frame including the current block.

At step 2630, the subtractor 2530 may generate residual information. The residual information may be generated based on the current block and the prediction block. The residual information may indicate the difference between the current block and the prediction block.

At step 2635, the transformer 2535 may generate transformed information by transforming the residual information.

At step 2640, the quantizer 2540 may generate quantized information by performing quantization on the transformed information.

At step 2645, the reorderer 2545 may generate reordered information by reordering the quantized information.

At step 2650, the entropy encoder 2550 may generate entropy-encoded information by performing entropy encoding on the reordered information.

A bitstream may include the entropy-encoded information.

The bitstream may be the above-described feature map information bitstream.

At step 2655, the dequantizer 2555 may generate dequantized information by performing dequantization on the quantized information.

At step 2660, the inverse transformer 2560 may generate inversely transformed information by performing inverse transformation on the dequantized information.

The inversely transformed information may indicate a reconstructed residual block.

At step 2665, the adder 2565 may generate a reconstructed block. The reconstructed block may be generated based on the inversely transformed information and the prediction block. The reconstructed block may be the result of addition of the reconstructed residual block and the prediction block.

At step 2670, the filter 2570 may perform filtering on the reconstructed block.

At step 2675, the memory 2575 may store the reconstructed frame including the reconstructed block. The reconstructed frame stored in the memory may be used as a reference frame for prediction of another current block.

Structure and Function of Decodine Apparatus

Figure 38:
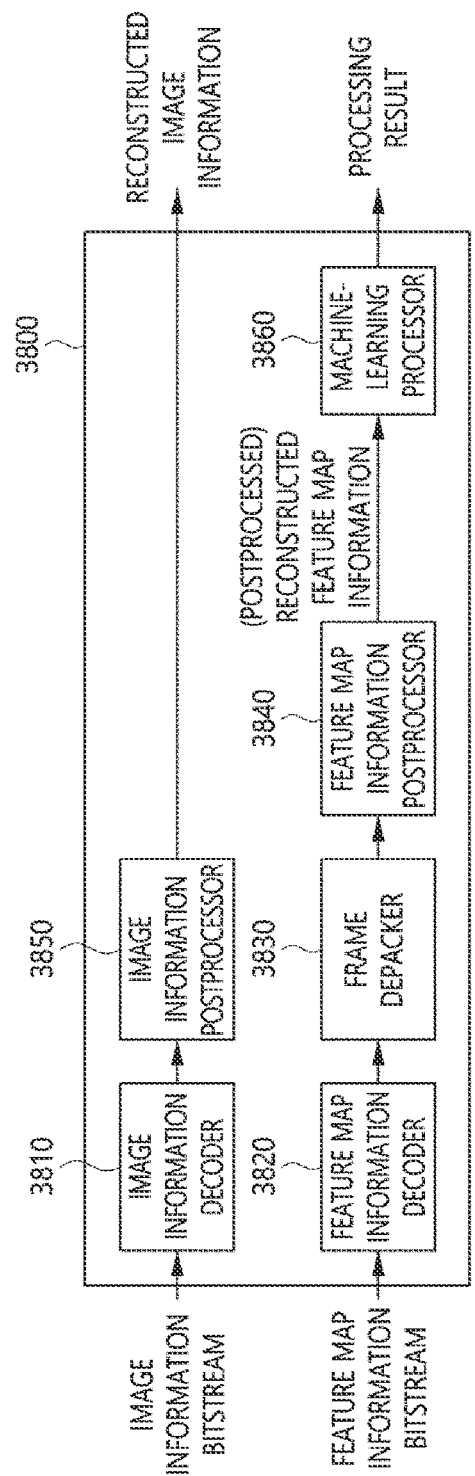
FIG. 38 is a structural diagram of a decoding apparatus according to an embodiment.

FIG. 38 is a structural diagram of a decoding apparatus according to an embodiment.

The decoding apparatus 3800 may perform decoding on an image and feature map information, and may have a pipelined structure for processing a neural network.

The decoding apparatus 3800 may include an image information decoder 3810, a feature map information decoder 3820, a frame depacker 3830, a feature map information postprocessor 3840, an image information postprocessor 3850, and a machine-learning processor 3860.

An image information bitstream and a feature map information bitstream may be input to the decoding apparatus 3800.

The decoding apparatus 3800 may output reconstructed image information and a processing result. The processing result may be the final result extracted from the neural network of the machine-learning processor 3860.

The functions, operations, and the like of the image information decoder 3810, the feature map information decoder 3820, the feature map information postprocessor 3840, the image information postprocessor 3850, and the machine-learning processor 3860 will be described in more detail below.

Figure 39:
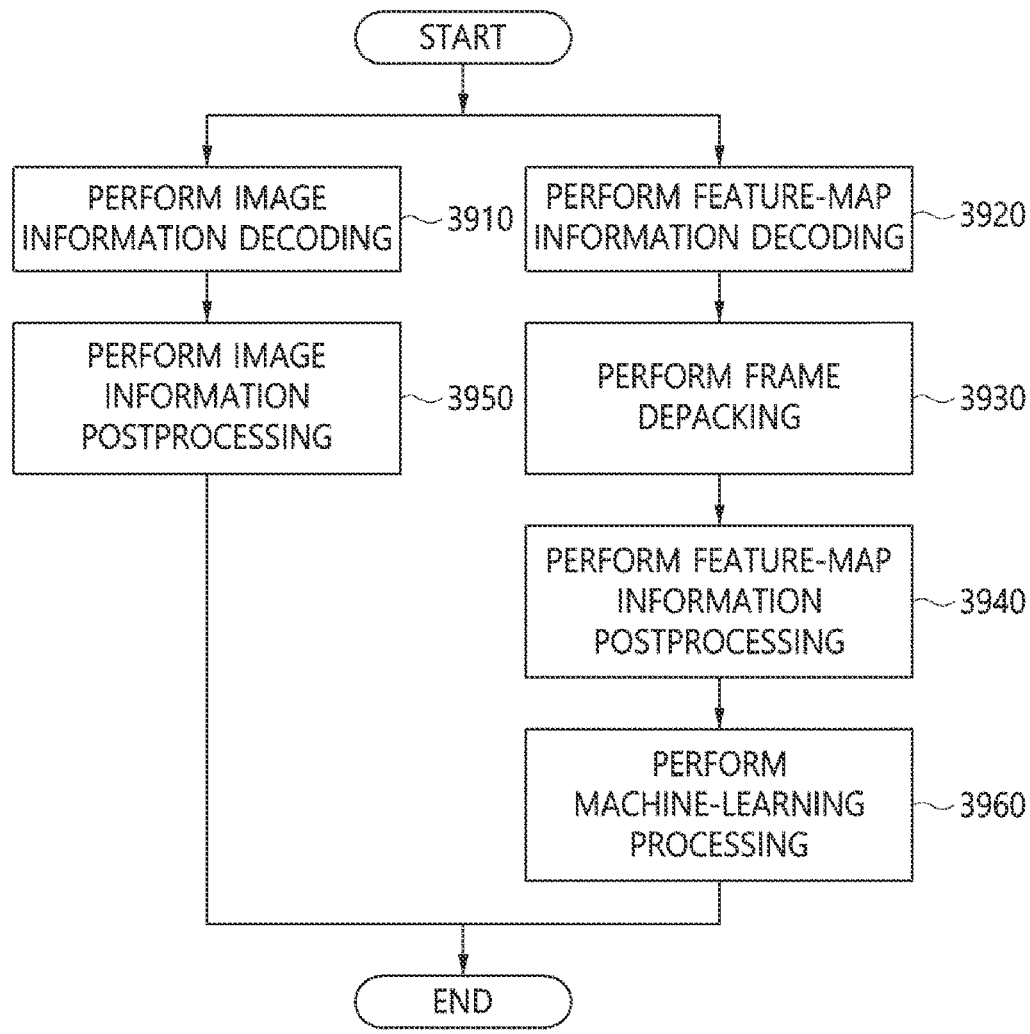
FIG. 39 is a flowchart of a method for decoding an image and feature map information according to an embodiment.

FIG. 39 is a flowchart of a method for decoding an image and feature map information according to an embodiment.

At step 3910, the image information decoder 3810 may receive an image information bitstream.

The image information bitstream may include encoded image information.

The image information bitstream may include information indicating the type of preprocessing performed by the image information preprocessor 110.

The decoding apparatus 3800 may perform postprocessing corresponding to the preprocessing. That is, the information indicating the type of preprocessing performed by the image information preprocessor 110 may be information indicating the type of postprocessing to be performed by the image information postprocessor 3850. The information indicating the type of postprocessing may specify the types of postprocessing to be performed by the image information postprocessor 3850.

The image information decoder 3810 performs decoding on the encoded image information of the image information bitstream, thereby generating reconstructed image information.

The description of the image information encoder 120 made in connection with the reconstructed image information and decoding may also be applied to the image information decoder 3810.

The image information decoder 3810 may output the reconstructed image information.

At step 3920, the feature map information decoder 3820 may receive a feature map information bitstream.

The feature map information bitstream may include encoded feature map information. Also, the feature map information bitstream may include information that was used when preprocessing was performed on the feature map information.

The feature map information decoder 3820 performs decoding on the information of the feature map information bitstream or the feature map, thereby generating reconstructed feature map information.

The feature map information decoder 3820 may perform decoding that corresponds to encoding described in connection with the feature map information encoder 170.

The feature map information decoder 3820 performs decoding on the encoded information generated by the feature map information encoder 170, thereby acquiring the original information generated in the encoding apparatus 100.

The pieces of information received and/or decoded by the feature map information decoder 3820 may be transmitted as information pertaining to High-Level Syntax (HLS). Here, the upper level of the HLS may be a sequence level or a picture level.

The feature map information decoder 3820 parses the information of the feature map information bitstream or the feature map, thereby acquiring the information generated in the encoding apparatus 100. The generated information may be provided to the feature map information postprocessor 3840.

At step 3930, the frame depacker 3830 may perform one or more of depacking and inverse reordering for the reconstructed feature map information.

At step 3940, the feature map information postprocessor 3840 performs postprocessing on the reconstructed feature map information, thereby generating postprocessed reconstructed feature map information.

In an embodiment, the postprocessing may include one or more of inverse domain transformation, dequantization, and inverse sampling.

The postprocessing at step 3940 may be selectively performed. Depending on the postprocessing that is selectively performed, the postprocessed reconstructed feature map information to be described later may be considered the reconstructed feature map information.

The feature map information postprocessor 3840 may perform operations and functions that work in the reverse manner from the operations and functions described in connection with the feature map information preprocessor 140.

At step 3950, the image information postprocessor 3850 performs postprocessing on the reconstructed image information, thereby generating postprocessed reconstructed image information.

The postprocessing at step 3950 may be optional. When postprocessing is not performed, the postprocessed reconstructed image information described in connection with the embodiments may be replaced with the reconstructed image information.

The image information bitstream may include information indicating postprocessing. The image information postprocessor 3850 performs postprocessing on the reconstructed image information using the information indicating postprocessing, thereby generating postprocessed reconstructed image information.

In an embodiment, the postprocessing may include one or more of inverse transformation of a color format and inverse sampling.

At step 3960, the machine-learning processor 3860 may receive the (postprocessed) reconstructed feature map information, and may acquire a processing result by performing a machine-learning task for the (postprocessed) reconstructed feature map information using one or more neural networks.

The machine-learning task by the machine-learning processor 3860 may indicate the course from a specific point in the entire structure of the neural network (e.g., layers) to the final result. As described above, the feature map information of the reconstructed image information may be extracted from an intermediate layer. The specific point may be a point after the intermediate layer.

Hereinafter, the steps described above with reference to FIG. 39 and the components of the decoding apparatus 3800 described above with reference to FIG. 38 will be described in more detail.

At step 3920, the feature map information decoder 3820 may extract an encoded index from the feature map information bitstream or the encoded feature map information. The encoded index may indicate the feature-map-information-encoding method used by the encoding apparatus 100. The encoded index may be generated by the feature map information encoder 170.

The feature map information decoder 3820 performs decoding on the encoded index, thereby generating an index. The index may indicate the feature-map-information-encoding method used by the encoding apparatus 100.

The feature map information decoder 3820 performs decoding on the information of the feature map information bitstream or the feature map using the decoding method corresponding to the feature-map-information-encoding method indicated by the index, thereby generating reconstructed feature map information.

The feature map information bitstream may be a bitstream generated using the image information encoder 120. Here, the image information encoder 120 may perform one or more of 1) segmentation of feature map information, 2) prediction, 3) transformation, 4) quantization, 5) entropy encoding, 6) dequantization, 7) inverse transformation, 8) filtering, and 9) storage of reconstructed feature map information.

When the feature map information bitstream is a bitstream including information generated using the image information encoder 120, the feature map information decoder 3820 may acquire prediction information through 1) entropy decoding, 2) dequantization, 3) inverse transformation, and 4) prediction of information of the bitstream, and may generate or reconstruct reconstructed feature map information using the prediction information.

Then, filtering may be applied to the reconstructed feature map information, and the reconstructed feature map information to which filtering is applied may be stored in memory or the like. The reconstructed feature map information stored in the memory or the like may be used again for prediction of another target, and may be output for prediction or the like.

The encoded feature map information may include encoded geometry information and encoded feature coefficient information. The feature map information decoder 3820 performs decoding on the encoded geometry information, thereby generating geometry information. The feature map information decoder 3820 performs decoding on the encoded feature coefficient information, thereby generating feature coefficient information.

Using the geometry information and the feature coefficient information, 3D data may be formed.

Information, such as the feature-map-information-encoding method and the like, may indicate whether 3D data is segmented into geometry information and feature coefficient information.

When 3D data is segmented into geometry information and feature coefficient information, the encoding procedure by the feature map information encoder 170 may be performed separately on each of the geometry information and the feature coefficient information, which are generated through segmentation. In this case, the feature map information decoder 3820 separately performs decoding on each of the encoded geometry information and the encoded feature coefficient information, thereby generating reconstructed feature map information. Also, the feature map information decoder 3820 may store and output the reconstructed feature map information.

At step 3950, the image information postprocessor 3850 may extract the feature map information of the reconstructed image information from the reconstructed image information using the index provided from the feature map information decoder 3820.

As described above, the processing by the feature map information extractor 130 may be omitted from the encoding apparatus 100.

The encoded feature map information may include encoded omission information. The encoded omission information may indicate whether or not the processing procedure by the feature map information extractor 130 is omitted. That is, the omission information may indicate whether to extract the feature map information of the reconstructed image information or whether to omit extraction of the feature map information of the reconstructed image information.

The feature map information decoder 3820 performs decoding on the encoded omission information, thereby generating the omission information.

The omission information may indicate whether to extract the feature map information of the reconstructed image information. For example, only when the omission information indicates extraction of the feature map information of the reconstructed image information may the feature map information decoder 3820 extract the feature map information of the reconstructed image information from the reconstructed image information. When the omission information indicates that the feature map information of the reconstructed image information is not to be extracted, the feature map information decoder 3820 may not extract the feature map information of the reconstructed image information therefrom, and the postprocessed reconstructed feature map information may be used as the reconstructed feature map information.

The encoded feature map information may include encoded feature extraction information. The feature map information decoder 3820 performs decoding on the encoded feature extraction information, thereby generating feature extraction information.

The feature extraction information may include 1) neural network information and 2) layer location information.

The neural network information may indicate the neural network used to extract the reconstructed feature map information. The neural network information may be an index indicating the neural network used to extract the feature map information of the reconstructed image information, among multiple neural networks.

The layer location information may indicate the layer from which the reconstructed feature map information is to be extracted, among the multiple layers of the neural network. The layer location information may be an index indicating the layer from which the feature map information of the reconstructed image information is to be extracted, among the multiple layers.

The feature map information decoder 3820 may extract the feature map information of the reconstructed image information from the layer indicated by the layer location information, among the layers of the neural network indicated by the neural network information.

The feature map information decoder 3820 may generate reconstructed feature map information using the feature map information of the reconstructed image information and the postprocessed reconstructed feature map information output from the feature map information postprocessor 3840.

At step 3920, the feature map information decoder 3820 performs decoding on the feature map, thereby generating reconstructed feature map information.

The reconstructed feature map information may correspond to the preprocessed feature map information in the encoding apparatus 100. The reconstructed feature map information may include a reconstructed transform coefficient and/or a reconstructed transform basis vector.

At step 3940, the feature map information postprocessor 3840 may perform one or more of inverse (domain) reordering, dequantization, inverse domain transformation, and inverse sampling on the reconstructed feature map information, the reconstructed transform coefficient, and/or the reconstructed transform basis vector.

The encoded feature map information may include encoded postprocessing information. The encoded postprocessing information may be the encoded preprocessing information generated by the encoding apparatus 100.

At step 3920, the feature map information decoder 3820 performs decoding on the encoded postprocessing information, thereby generating postprocessing information. The postprocessing information may correspond to the preprocessing information in the encoding apparatus 100.

The postprocessing information may indicate the processing tasks to be performed on the reconstructed feature map information, the reconstructed transform coefficient, and/or the reconstructed transform basis vector, among dequantization, inverse domain transformation, and inverse sampling.

For example, the postprocessing information may include dequantization information. The dequantization information may indicate whether dequantization is applied to the reconstructed feature map information, and the like. The dequantization information in the postprocessing information may correspond to the quantization information in the preprocessing information of the encoding apparatus 100.

For example, the postprocessing information may include inverse domain transformation information. The inverse domain transformation information may indicate whether inverse domain transformation is applied to the reconstructed feature map information, and the like. The inverse domain transformation information in the postprocessing information may correspond to the domain transformation information in the preprocessing information of the encoding apparatus 100.

For example, the postprocessing information may include inverse sampling information. The inverse sampling information may indicate whether inverse sampling is applied to the reconstructed feature map information, and the like. The inverse sampling information in the postprocessing information may correspond to the sub-sampling information in the preprocessing information of the encoding apparatus 100.

The order in which inverse (domain) reordering, dequantization, inverse domain transformation, and inverse sampling are performed may be changed.

The postprocessing information may be transmitted to the feature map information postprocessor 3840.

Figure 40:
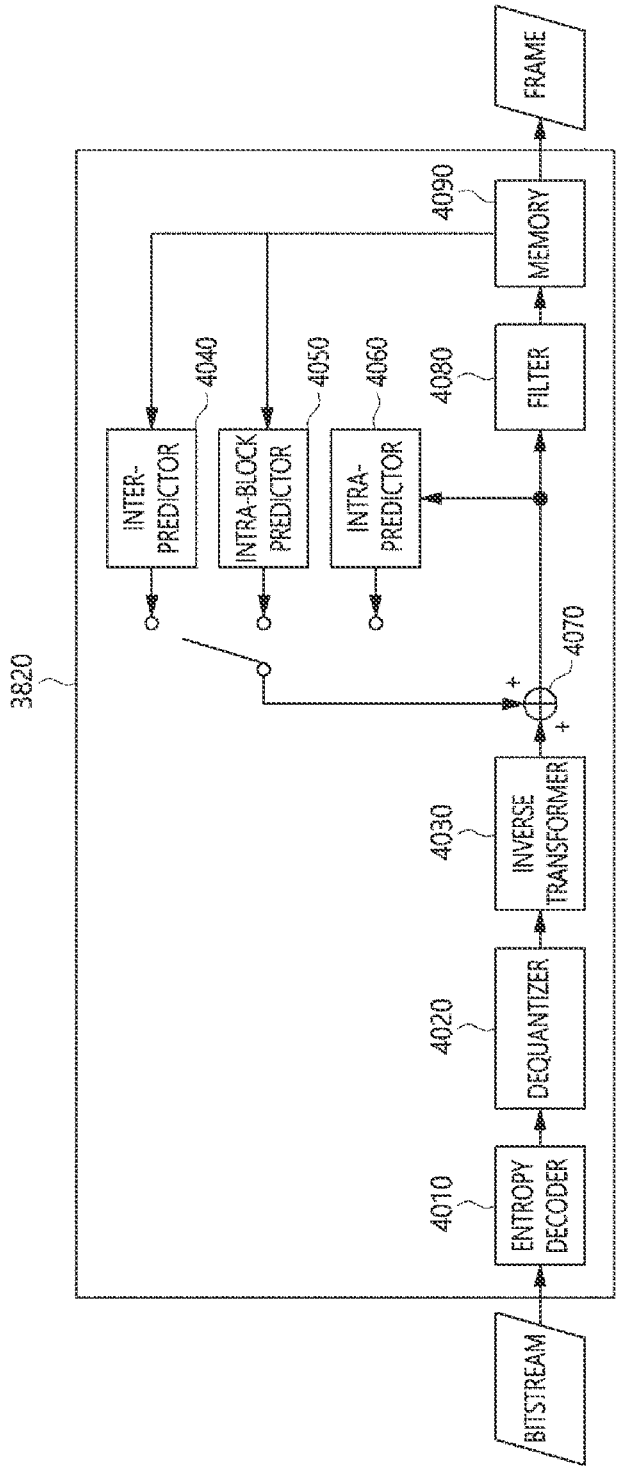
FIG. 40 illustrates the structure of a feature map information decoder according to an example.

FIG. 40 illustrates the structure of a feature map information decoder according to an example.

The feature map information decoder 3820 may include one or more of an entropy decoder 4010, a dequantizer 4020, an inverse transformer 4030, an inter-predictor 4040, an intra-block predictor 4050, an intra-predictor 4060, an adder 4070, a filter 4080, and memory 4090.

The information input to the feature map information decoder 3820 may be a bitstream.

The bitstream may be a feature map information bitstream.

The feature map information decoder 3820 may generate and output a frame.

The feature map information decoder 3820 may be an apparatus for decoding video. The feature map information bitstream input to the feature map information decoder 3820 may be a bitstream input to the apparatus for decoding video.

The functions, operations, and the like of the entropy decoder 4010, the dequantizer 4020, the inverse transformer 4030, the inter-predictor 4040, the intra-block predictor 4050, the intra-predictor 4060, the adder 4070, the filter 4080, and the memory 4090 will be described in more detail below.

Figure 41:
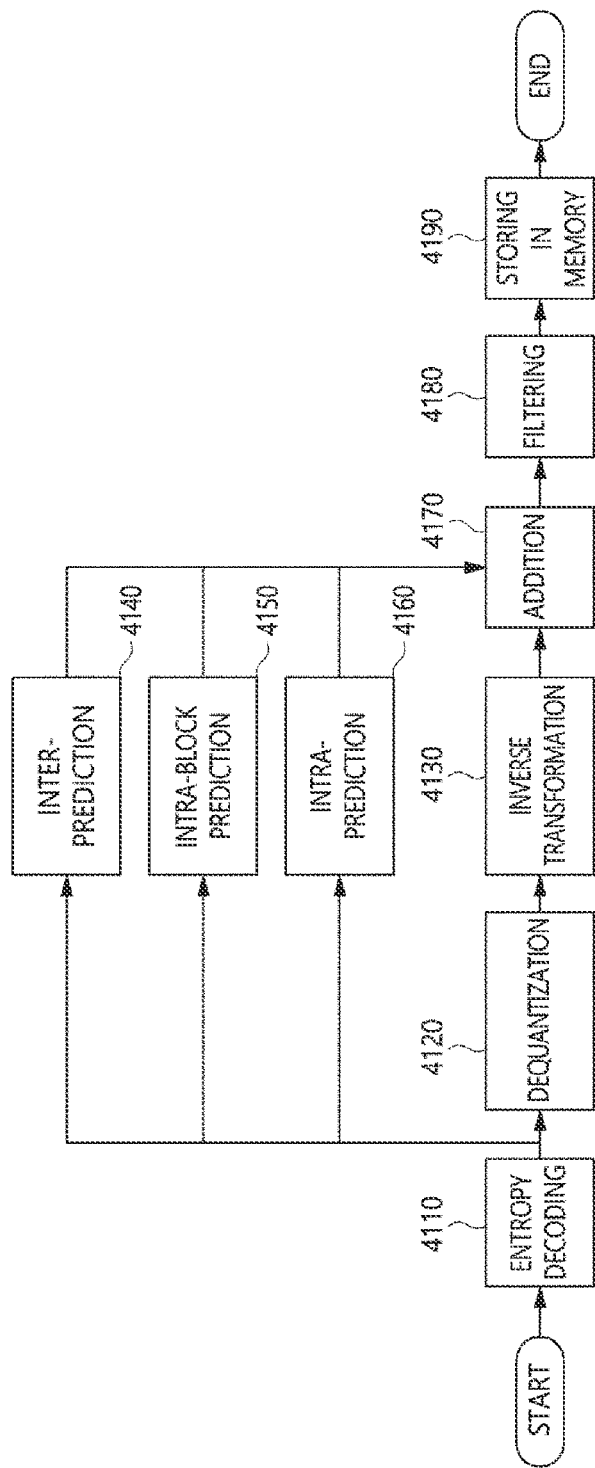
FIG. 41 is a flowchart of a method for decoding feature map information according to an example.

FIG. 41 is a flowchart of a method for decoding feature map information according to an example.

Step 3920, described above with reference to FIG. 39, may include steps 4110, 4120, 4130, 4140, 4150, 4160, 4170, 4180, and 4190.

At step 4110, the entropy decoder 4010 performs entropy decoding on the entropy-encoded information in a bitstream, thereby generating entropy-decoded information.

The entropy-decoded information may correspond to the reordered information or quantized information described above with reference to FIG. 26.

At step 4120, the dequantizer 4020 performs dequantization on the entropy-decoded information, thereby generating dequantized information.

The dequantized information generated by the dequantizer 4020 may correspond to the dequantized information generated by the dequantizer 2555 described above with reference to FIG. 26.

At step 4130, the inverse transformer 4030 preforms inverse 13 transformation on the dequantized information, thereby generating inversely transformed information.

The inversely transformed information may indicate a reconstructed residual block.

The inversely transformed information generated by the inverse transformer 4030 may correspond to the inversely transformed information generated by the inverse transformer 2560 described above with reference to FIG. 26. That is, the reconstructed residual block generated by the inverse transformer 4030 may be the same as the reconstructed residual block generated by the inverse transformer 2560.

At step 4140, the inter-predictor 4040 performs inter-prediction using a reconstructed frame stored in the memory 4090, thereby generating a prediction block for the current block of a current frame.

The current frame may indicate the frame to be decoded by the feature map information decoder 3820. The current block may indicate the block to be decoded.

Figure 42:
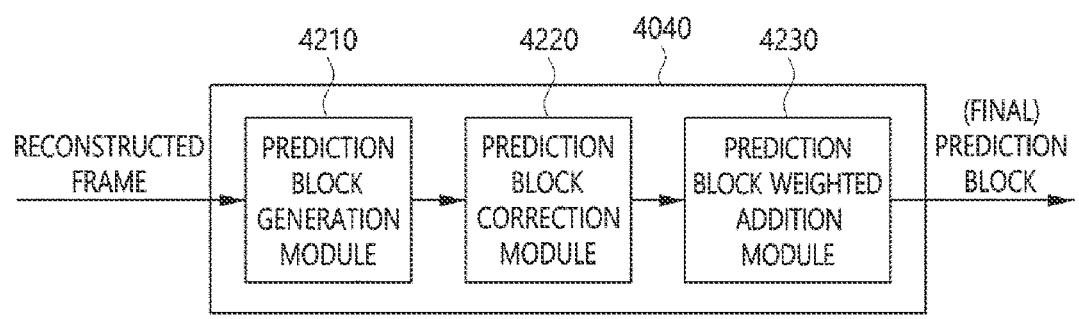
FIG. 42 is a structural diagram of an inter-predictor according to an example.

FIG. 42 is a structural diagram of an inter-predictor according to an example.

The inter-predictor 4040 may include one or more of a prediction block generation module 4210, a prediction block correction module 4220, and a prediction block weighted addition module 4230.

The prediction block generation module 4210 may generate one or more prediction blocks using a reconstructed frame stored in the memory 4090.

The prediction block correction block 4220 may correct the one or more prediction blocks determined by the prediction block generation module 4210. The correction may include filtering.

When the one or more prediction blocks determined by the prediction block generation module 4210 are multiple prediction blocks, the prediction block weighted addition module 4230 may generate a single (final) prediction block through weighted addition of the multiple prediction blocks.

The functions, operations, and the like of the prediction block generation module 4210, the prediction block correction module 4220, and the prediction block weighted addition module 4230 will be described in more detail below.

Figure 43:
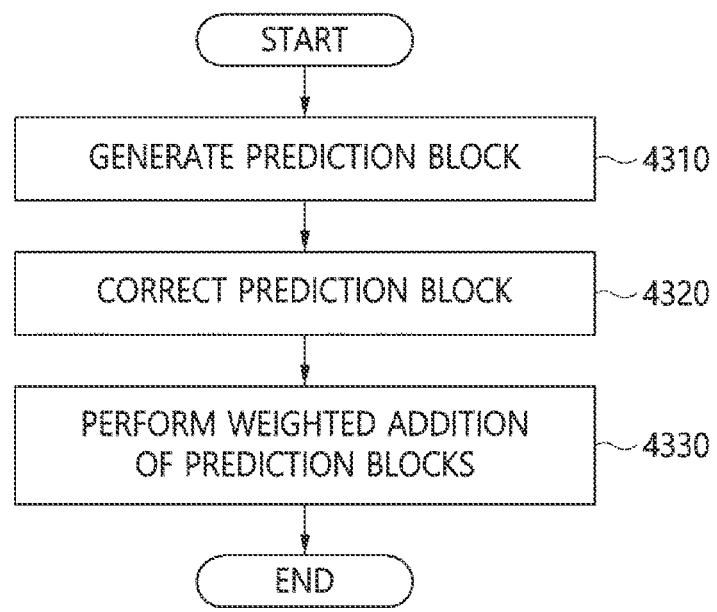
FIG. 43 is a flowchart of an inter-prediction method according to an example.

FIG. 43 is a flowchart of an inter-prediction method according to an example.

Step 4140, described above with reference to FIG. 41, may include steps 4310, 4320, and 4330.

At step 4310, the prediction block generation module 4210 may generate one or more prediction blocks using a reconstructed frame stored in the memory 4090.

The reconstructed frame may be a reference picture.

By parsing the information input to the feature map information decoder 3820, the number of one or more prediction blocks may be acquired.

One or more reference frames, the number of which is equal to the number of the one or more prediction blocks, may be specified. The reference frame may be specified using an index for the reference frame.

The index for each of the one or more reference frames may be parsed. Accordingly, indices equal to the number of the one or more reference frames may be parsed.

Figure 44:
FIG. 44 illustrates inter-prediction using a current frame and a reference frame according to an example.

FIG. 44 illustrates inter-prediction using a current frame and a reference frame according to an example.

A prediction block in the reference frame may be acquired through the method to be described later.

When at least one packing unit having the same category as the category of a packing unit including a current block is present in the reference frame, a sub-reference region list may be configured, and a prediction block may be generated using the sub-reference region list.

The sub-reference region list may be configured to include one or more packing units. Here, the one or more packing units constituting the sub-reference region list may be packing units within a specific range based on a corresponding location. The corresponding location may be the location in the packing unit of the reference frame (that is, the packing unit of the sub-reference region list) corresponding to the location of the current block in the packing unit including the current block of the current frame.

For example, the coordinates of the location of the current block in the packing unit including the current block may be the same as the coordinates of the corresponding location in the packing unit of the sub-reference region list.

Also, the one or more packing units constituting the sub-reference region list may be packing units having the same category as the category of the packing unit including the current block, among the packing units within the specific range.

When the sub-reference region list is configured, the index of the packing unit to be referenced, among the packing units in the sub-reference region list, may be acquired. The index may be acquired by parsing the information input to the feature map information decoder 3820.

A prediction block may be generated with reference to the corresponding location in the packing unit indicated by the index. The corresponding location may be the location in the reference frame corresponding to the location of the current block. That is, the coordinates of the location of the current block in the packing unit including the current block may be the same as the coordinates of the corresponding location in the packing unit indicated by the index.

When a prediction block is generated, the scale of the packing unit including the current block relative to the packing unit of the sub-reference region list may be considered. In consideration of the scale, the prediction block may be generated with reference to the corresponding location in the packing unit of the sub-reference region list.

When no packing unit having the same category as the category of the packing unit including the current block is present in the reference frame, a motion vector may be acquired. The motion vector may be acquired by parsing the information input to the feature map information decoder 3820.

Reference is again to be made to FIG. 43.

At step 4320, the prediction block correction module 4220 may correct one or more prediction blocks determined by the prediction block generation module 4210. The correction may include filtering.

The above description of the prediction block correction module 2720 of the inter-predictor 2515 may also be applied to the prediction block correction module 4220. A repeated description will therefore be omitted.

At step 4330, when the one or more prediction blocks determined by the prediction block search module 4210 are multiple prediction blocks, the prediction block weighted addition module 4230 may generate a single (final) prediction block through weighted addition of the multiple prediction blocks.

The above description of the prediction block weighted addition module 2730 of the inter-predictor 2515 may also be applied to the prediction block weighted addition module 4230. A repeated description will therefore be omitted.

Reference is again to be made to FIG. 41.

At step 4150, the intra-block predictor 4050 may generate a prediction block for a current block using already reconstructed information of a current frame including the current block.

The already reconstructed information of the current frame may be already reconstructed blocks and/or already reconstructed samples in the current frame.

By parsing the information input to the feature map information decoder 3820, information about one or more prediction blocks may be acquired.

The information about the one or more prediction blocks may include 1) block motion vectors for the one or more prediction blocks and 2) indices for the one or more prediction blocks.

Figure 45:
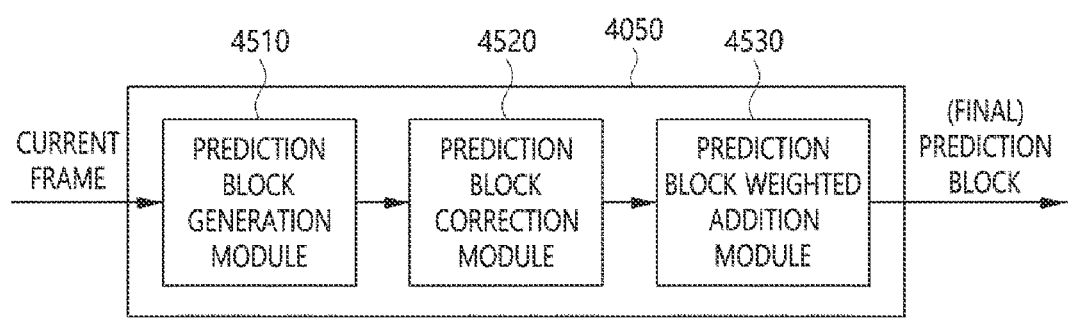
FIG. 45 is a structural diagram of an intra-block predictor according to an example.

FIG. 45 is a structural diagram of an intra-block predictor according to an example.

The intra-block predictor 4050 may include one or more of a prediction block generation module 4510, a prediction block correction module 4520, and a prediction block weighted addition module 4530.

The prediction block generation module 4510 may generate one or more prediction blocks in already reconstructed information in a current frame including a current block.

The prediction block correction module 4520 may correct the one or more prediction blocks generated by the prediction block generation module 4510. The correction may include filtering.

When the one or more prediction blocks generated by the prediction block generation module 4510 are multiple prediction blocks, the prediction block weighted addition module 4530 may generate a single (final) prediction block through weighted addition of the multiple prediction blocks.

The functions, operations, and the like of the prediction block generation module 4510, the prediction block correction module 4520, and the prediction block weighted addition module 4530 will be described in more detail below.

Figure 46:
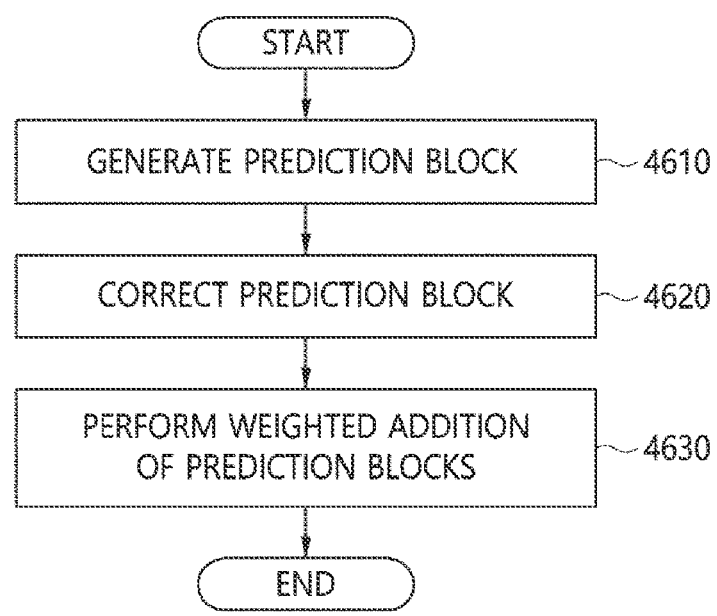
FIG. 46 is a flowchart of an intra-block prediction method according to an example.

FIG. 46 is a flowchart of an intra-block prediction method according to an example.

Step 4150, described above with reference to FIG. 41, may include steps 4610, 4620, and 4630.

At step 4610, the prediction block generation module 4510 may generate one or more (optimal) prediction blocks in already reconstructed information in a current frame including a current block.

When at least one packing unit having the same category as the category of the packing unit including the current block is present in the already reconstructed region in the current frame, an intra-block reference list may be configured, and a prediction block may be generated using the intra-block reference list.

The intra-block reference list may be configured to include one or more packing units. Here, the one or more packing units constituting the intra-block reference list may be packing units within a specific range based on a corresponding location in the already reconstructed region of the current frame. The corresponding location may be a location in the packing unit of the intra-block reference list that corresponds to the location of the current block in the packing unit including the current block. That is, the coordinates of the location of the current block in the packing unit including the current block may be the same as the coordinates of the corresponding location in the packing unit of the intra-block reference list.

Also, the one or more packing units constituting the intra-block reference list may be packing units having the same category as the category of the packing unit including the current block, among the packing units in the specific range.

When the intra-block reference list is configured, the index of the packing unit to be referenced, among the packing units in the intra-block reference list, may be acquired. The index may be acquired by parsing the information input to the feature map information decoder 3820.

In the procedure of generating a prediction block, the scale of the packing unit including the current block relative to the packing unit of the intra-block reference list may be considered.

For example, when there is a difference between the scale of the packing unit of the intra-block reference list and the scale of the current block, an up-sampling function and/or a down-sampling function may be acquired. The up-sampling function and/or the down-sampling function may be acquired by parsing the information input to the feature map information decoder 3820.

Using the up-sampling function and/or the down-sampling function, the corresponding location in the packing unit of the intra-block reference list may be acquired, and a prediction block may be generated with reference to the acquired corresponding location.

If no packing unit having the same category as the category of the packing unit including the current block is present in the already reconstructed region in the current frame, a prediction block may be generated using a block motion vector.

The block motion vector may be acquired by parsing the information input to the feature map information decoder 3820.

At step 4620, the prediction block correction module 4520 may correct the one or more prediction blocks determined by the prediction block generation module 4510. The correction may include filtering.

The above description of the prediction block correction module 3120 of the intra-block predictor 2520 may also be applied to the prediction block correction module 4520. A repeated description will therefore be omitted.

The function used for filtering may be specified by a predefined table and information signaled from the encoding apparatus 100.

An index may indicate the function used for filtering, among multiple functions in the predefined table.

The index may be acquired by parsing the information input to the feature map information decoder 3820. Using the function indicated by the acquired index, filtering may be performed for the prediction block.

Alternatively, as in the process described in connection with the prediction block correction module 3120, an equation may be derived using already reconstructed samples in the vicinity of the current block and/or the prediction block, and filtering of the prediction block may be performed using the derived equation.

At step 4630, the prediction block weighted addition module 4530 may generate a single (final) prediction block through weighted addition of the one or more prediction blocks.

The above description of the prediction block weighted addition module 3130 of the intra-block predictor 2520 may also be applied to the prediction block weighted addition module 4530. A repeated description will therefore be omitted.

A weight may be acquired by parsing the information input to the feature map information decoder 3820.

The weight may be acquired using a predefined table and by parsing the information input to the feature map information decoder 3820.

An index may be acquired by parsing the information input to the feature map information decoder 3820. The weighted addition of the one or more prediction blocks may be performed using the weight indicated by the acquired index, among multiple weights in the predefined table.

Figure 47:
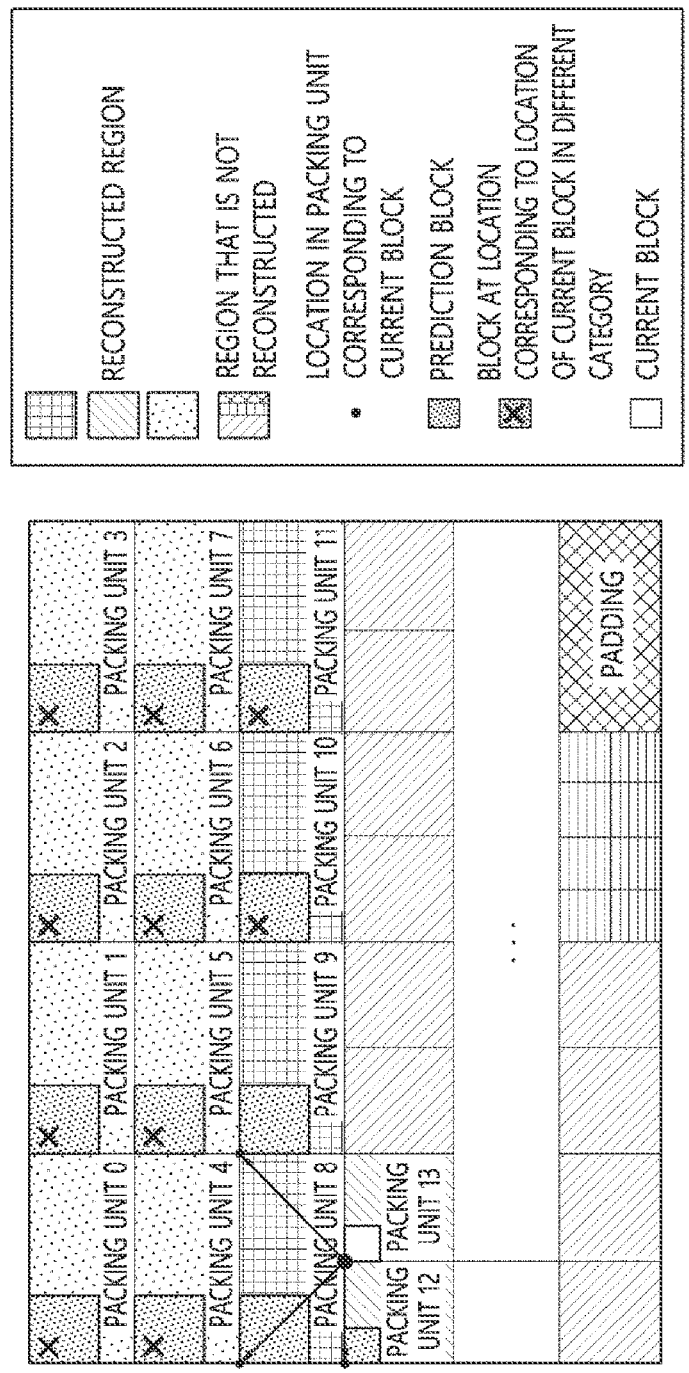
FIG. 47 illustrates an intra-block prediction method according to an example.

FIG. 47 illustrates an intra-block prediction method according to an example.

As illustrated in FIG. 47, a current block may be included in packing unit 13.

The categories of packing units 0 to 7 may be the same as each other. The categories of packing units 8 to 13 may be the same as each other. The categories of packing units 0 to 7 may be different from the categories of packing units 8 to 13.

In this case, reference blocks at the locations corresponding to the location of the current block may be specified in packing unit 8, packing unit 9, and packing unit 12 using an index for the intra-block reference list. Prediction using the specified reference blocks may be performed.

Down-sampling may be performed on the prediction block generated in packing unit 8 and the prediction block generated in packing unit 9, among the three prediction blocks at the three corresponding locations. The down-sampling may be based on DCT-IF. Through the down-sampling, two prediction blocks, the sizes of which are adjusted to have the same size as the current block, may be generated.

Filtering may be applied to each of the three prediction blocks. Here, the three prediction blocks may be the two prediction blocks, the sizes of which are adjusted, and the prediction block, the size of which is not adjusted, and which is generated in packing unit 12.

A (final) prediction block may be generated through weighted addition of the three prediction blocks to which filtering is applied or the three prediction blocks to which filtering is not applied.

Figure 48:
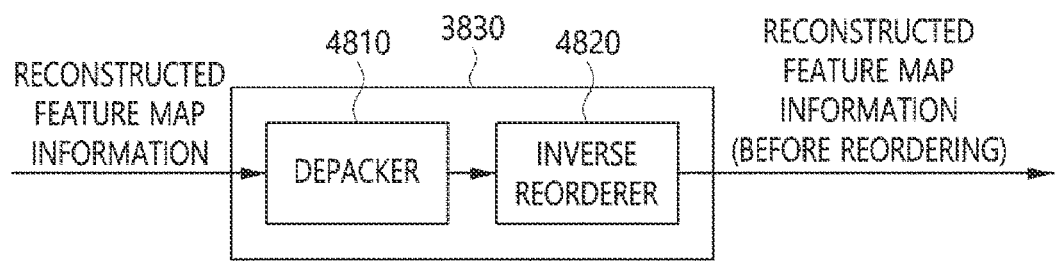
FIG. 48 illustrates the structure of a frame depacker according to an example.

FIG. 48 illustrates the structure of a frame depacker according to an example.

The frame depacker 3830 may include one or more of a depacker 4810 and an inverse reorderer 4820.

The information input to the frame depacker 3830 may be the output from the feature map information decoder 3820.

The functions, operations, and the like of the depacker 4810 and the inverse reorderer 4820 will be described in more detail below.

Figure 49:
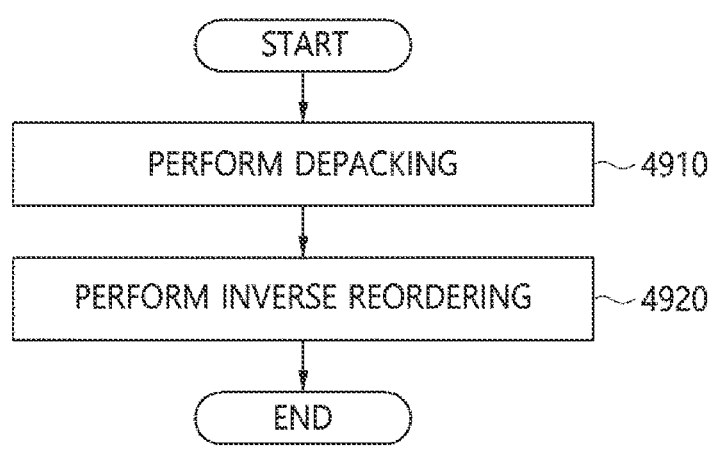
FIG. 49 is a flowchart of a frame-depacking method according to an embodiment.

FIG. 49 is a flowchart of a frame-depacking method according to an embodiment.

Step 3930, described above with reference to FIG. 39, may include steps 4910 and 4920.

At step 4910, the depacker 4810 may perform depacking of one or more pieces of reconstructed feature map information.

The depacker 4810 may perform depacking of one or more frames of the pieces of reconstructed feature map information.

Depacking may be performed based on pieces of information transmitted from the encoding apparatus 100.

For example, the pieces of information transmitted from the encoding apparatus 100 may include 1) a method for scanning reconstructed frames, 2) the category of a packing unit in each frame, 3) the size of a packing unit in each frame, 4) the number of packing units in each frame, and the like.

The above-mentioned pieces of information may be acquired by parsing the information input to the feature map information decoder 3820.

In the procedure of performing depacking, respective packing units having the same size and the same category may be reconstructed into the form before packing was performed in the encoding apparatus 100.

Through such reconstruction, the depacker 4810 may output one or more pieces of multi-dimensional information. The packing units may be reconstructed into one or more pieces of multi-dimensional information by the depacker 4810.

At step 4920, the one or more pieces of multi-dimensional information may be input to the inverse reorderer 4820.

The inverse reorderer 4820 performs inverse reordering on the one or more pieces of multi-dimensional information, thereby reconstructing information having the form before reordering was performed in the encoding apparatus 100.

The inverse reorderer 4820 may perform inverse reordering on the information that is input thereto after reordering is applied thereto, and information having the form before reordering is performed in the encoding apparatus 100 may be reconstructed through inverse reordering.

The inverse reordering may be performed based on pieces of information transmitted from the encoding apparatus 100.

For example, the pieces of information transmitted from the encoding apparatus 100 may include an index for each inverse reordering unit. The inverse reordering unit may correspond to the reordering unit in the reorderer 2110.

Figure 50:
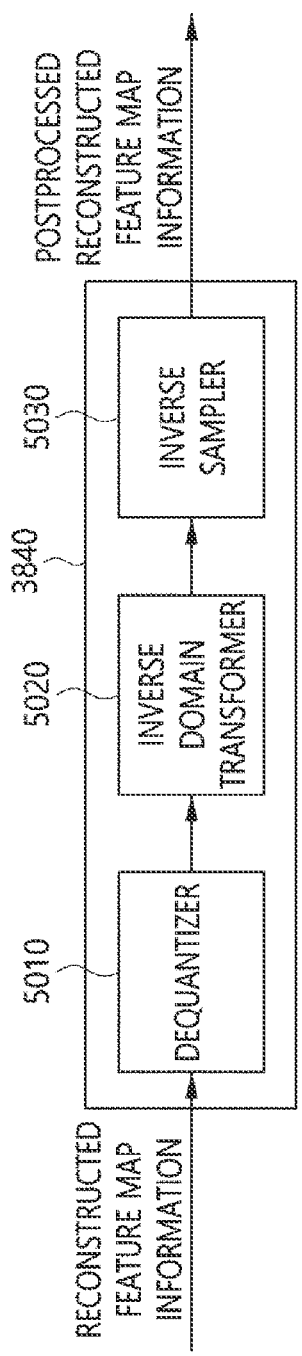
FIG. 50 illustrates the structure of a feature map information postprocessor according to an example.

FIG. 50 illustrates the structure of a feature map information postprocessor according to an example.

The feature map information postprocessor 3840 may include one or more of a dequantizer 5010, an inverse domain transformer 5020, and an inverse sampler 5030.

The reconstructed feature map information output from the frame depacker 3830 or the reconstructed information output from the inverse reorderer 4820 may be input to the feature map information postprocessor 3840.

The feature map information postprocessor 3840 may generate postprocessed reconstructed feature map information.

The dequantizer 5010 may perform operations and functions that work in the reverse manner from the operations and functions described above in connection with the quantizer 530.

The inverse domain transformer 5020 may perform operations and functions that work in the reverse manner from the operations and functions described above in connection with the domain transformer 520.

The inverse sampler 5030 may perform operations and functions that work in the reverse manner from the operations and functions described above in connection with the sub-sampler 510.

Figure 51:
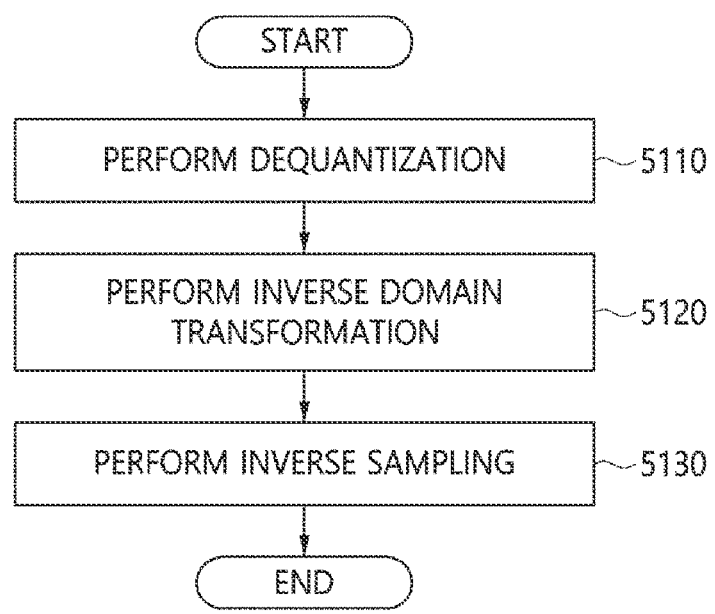
FIG. 51 is a flowchart of a method for postprocessing reconstructed feature map information according to an example.

FIG. 51 is a flowchart of a method for postprocessing reconstructed feature map information according to an example.

Step 3940, described above with reference to FIG. 39, may include steps 5110, 5120, and 5130.

The order of steps 5110, 5120, and 5130 may be changed. Also, some of steps 5110, 5120, and 5130 may be skipped.

At step 5110, the output from the inverse domain transformer 5020, the output from the inverse reorderer 4820, or the reconstructed feature map information may be input to the dequantizer 5010.

The dequantizer 5010 performs dequantization on the information input thereto, thereby generating dequantized information. The information transmitted from the frame depacker 3830 may be reordered feature map information.

The dequantized information may indicate transformed feature map information.

For example, the dequantizer 5010 performs dequantization on the quantized feature map information, thereby generating transformed feature map information.

The dequantizer 5010 may receive information generated in the quantizer 530 via the feature map information decoder 3820 and perform dequantization on the quantized feature map information using the received information, thereby generating transformed feature map information.

The dequantization may be fixed dequantization or non-fixed dequantization.

The dequantizer 5010 may acquire information required for dequantization using the high-level information and low-level information used for decoding of the feature map information. Also, the dequantizer 5010 may acquire information required for dequantization using additional high-level information and additional low-level information.

Figure 52:
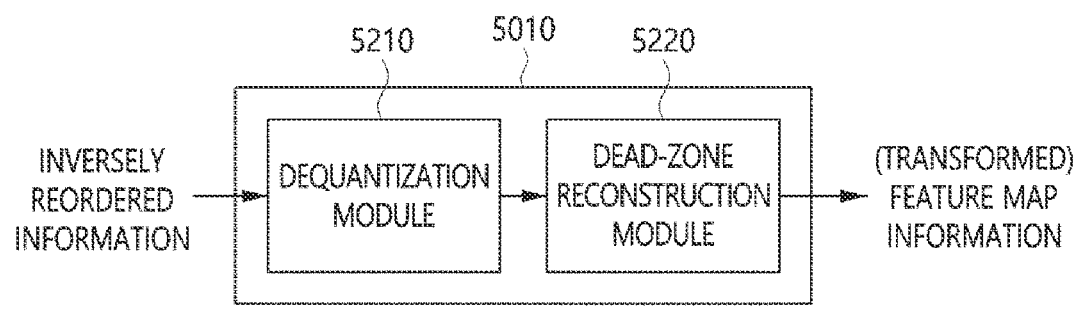
FIG. 52 illustrates the structure of a dequantizer according to an embodiment.

FIG. 52 illustrates the structure of a dequantizer according to an embodiment.

The dequantizer 5010 may include one or more of a dequantization module 5210 and a dead-zone reconstruction module 5220.

The inversely reordered information may be input to the dequantization module 5210.

The dead-zone reconstruction module 5220 may generate transformed feature map information.

The functions, operations, and the like of the dequantization module 5210 and the dead-zone reconstruction module 5220 will be described in more detail below.

Figure 53:
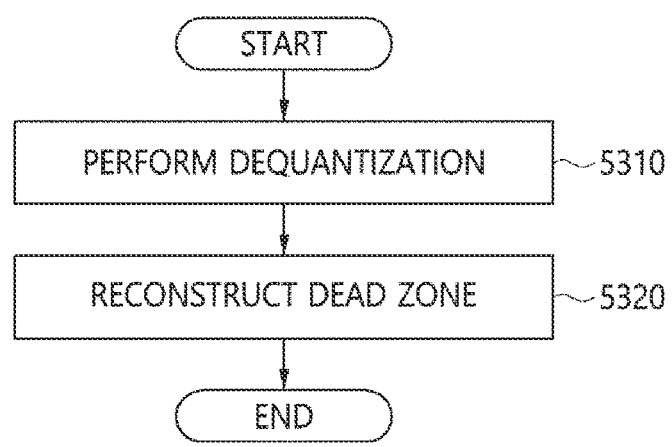
FIG. 53 is a flowchart of a dequantization method according to an embodiment.

FIG. 53 is a flowchart of a dequantization method according to an embodiment.

Step 5110, described above with reference to FIG. 51, may include steps 5310 and 5320.

The order of steps 5310 and 5320 may be changed. Also, some of steps 5310 and 5320 may be skipped.

At step 5310, the dequantization module 5210 performs dequantization on the inversely reordered information, thereby generating transformed feature map information. Here, the transformed feature map information may be transformed feature map information to which a dead-zone scheme is applied.

The dequantization module 5210 may perform dequantization using the information generated by the quantizer 530 and transmitted from the feature map information decoder 3820.

When the transform unit used in the inverse domain transformer 5020 is used as the quantization unit, the decoding apparatus 3800 may not receive additional information about the quantization unit from the encoding apparatus 100.

In this case, the transform unit used in the inverse domain transformation procedure may be used as the quantization unit in the dequantization procedure.

The dequantization module 5210 may receive quantization method information applied to each of the transform units from the feature map information decoder 3820.

The dequantization may be fixed dequantization or non-fixed dequantization.

When fixed quantization is used for a transform unit, the dequantization module 5210 may receive the fixed quantization information applied to the transform unit from the feature map information decoder 3820. The dequantization module 5210 may reconstruct dequantized information using the fixed quantization information. The dequantized information may be transformed feature map information.

The fixed quantization information may include information indicating the quantization level used in the quantization procedure and information indicating a quantization parameter and a fixed quantization function.

When a non-fixed quantization method is used for a transform unit, the dequantization module 5210 may receive non-fixed quantization information applied to the transform unit from the feature map information decoder 3820. The dequantization module 5210 may reconstruct dequantized information using the non-fixed quantization information. The dequantized information may be transformed feature map information.

The non-fixed quantization information may include 1) one or more quantization levels, 2) a quantization parameter, 3) information about mapping between a value before quantization and a value after quantization, and 4) a non-fixed quantization function.

The information about the mapping may include an index for a mapping table and information about the mapping table. The mapping table may be generated in the encoding procedure, or may be a predefined table.

When clipping has been performed by the clipping module 1720 in the quantization procedure performed by the quantizer 530 of the encoding apparatus 100, the dequantization module 5210 may receive clipping information from the feature map information decoder 3820. The dequantization module 5210 may perform dequantization using the clipping information.

The clipping information may include 1) a clipping range (that is, the maximum value and/or minimum value of the clipping range) and 2) information indicating the quantization method for the clipping range.

When clipping is performed, the dequantization module 5210 may perform dequantization using the maximum value and minimum value of the clipping range.

When clipping using the maximum value and the minimum value that are fixed for one or more quantization units (that is, the maximum value and the minimum value that are common thereto) has been performed, the dequantization module 5210 may perform clipping using a single (common) maximum value and a single (common) minimum value for the one or more quantization units.

When clipping by the clipping module 1720 is not performed in the quantization procedure performed by the quantizer 530 of the encoding apparatus 100, the dequantization module 5210 may acquire the maximum value and minimum value of each quantization unit before quantization using the fixed quantization information, the non-fixed quantization information, or the like. The dequantization module 5210 may perform dequantization on the quantization unit using the maximum value and the minimum value.

In an embodiment, when quantization based on an escape quantization method has been performed in the quantization module 1750 of the encoding apparatus 100, the dequantization module 5210 may perform dequantization based on the escape quantization method.

When the escape quantization method has been used, the dequantization module 5210 may receive information related to the escape quantization method from the feature map information decoder 3820. The dequantization module 5210 may perform dequantization using the information related to the escape quantization method.

For example, the information related to the escape quantization method may include quantization range information and dequantization information.

The dequantization module 5210 may perform fixed dequantization or non-fixed dequantization for the integer values of the information input thereto using the acquired information related to the escape quantization method. By performing fixed dequantization or non-fixed dequantization, the integer values may be mapped to real number values.

The dequantization module 5210 may acquire the range to which the escape quantization method has been applied using the information related to the escape quantization method (e.g., the quantization range information), and may apply the escape quantization method to values falling within the acquired range.

The range to which the escape quantization method is applied may include multiple sections.

The dequantization module 5210 may perform dequantization by adding a multiple of k to a real number value or by subtracting a multiple of k from a real number value for each of the multiple sections using a table.

At step 5320, the dead-zone reconstruction module 5220 may reconstruct the dead zone of the dequantized information.

When a dead-zone scheme has been performed by the dead-zone scheme module 1730 of the encoding apparatus 100, the dead-zone reconstruction module 5220 may receive dead-zone scheme information from the feature map information decoder 3820. The dead-zone scheme information may include information indicating whether a dead-zone scheme is performed and information indicating the range on which the dead-zone scheme is performed.

The dead-zone reconstruction module 5220 may identify the region that is mapped to 0 due to application of the dead-zone scheme, among the regions of the quantization unit, using the dead-zone scheme information. In an embodiment, the range of values within the feature map information acquired by dequantization performed by the dequantization module 5210 may be [n, m]. n may be a real number. m may be a real number.

If a dead-zone scheme by which values falling within a range [p, q] are mapped to 0 has been performed by the dead-zone scheme module 1730 of the encoding apparatus 100, the dead-zone reconstruction module 5220 may perform dead-zone reconstruction corresponding to the dead-zone scheme.

The dead-zone reconstruction module 5220 may subtract p from values falling within the range [n, t] and add q to values falling within the range [t, m] using the dead-zone scheme information. t may be equal to or greater than p and equal to or less than q.

Through such addition and subtraction, the dead-zone reconstruction module 5220 may reconstruct values within the range that were mapped to 0 due to application of the dead-zone scheme.

Reference is again to be made to FIG. 51.

At step 5120, the inverse domain transformer 5020 performs inverse domain transformation on the dequantized information, thereby generating inversely transformed information.

The inversely transformed information may be sub-sampled feature map information.

The encoded feature map information may include encoded inverse domain transform type information.

At step 3920, the feature map information decoder 3820 performs decoding on the encoded inverse domain transform type information, thereby generating inverse domain transform type information. The inverse domain transform type information may correspond to the domain transform type information of the encoding apparatus 100.

The inverse domain transform type information may indicate the type of inverse domain transform to be applied to the dequantized information, among available types of inverse domain transform. For example, the type of inverse domain transform may be 1) 3-dimensional (3D) Discrete Cosine Transform (DCT), 2) 2D-DCT, or 3) Principal Component Analysis (PCA).

Depending on the inverse domain transform type, the feature map information postprocessor 3840 may perform inverse domain transformation on the reconstructed transform coefficient or the reconstructed transform basis vector, and may generate inversely transformed information as the result of inverse domain transformation.

Figure 54:
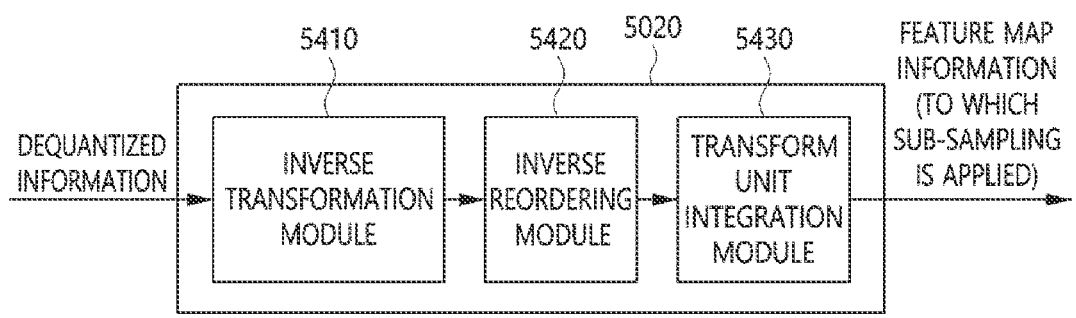
FIG. 54 illustrates the structure of an inverse domain transformer according to an embodiment.

FIG. 54 illustrates the structure of an inverse domain transformer according to an embodiment.

The inverse domain transformer 5020 may include one or more of an inverse transformation module 5410, an inverse reordering module 5420, and a transform unit integration module 5430.

The dequantized information may be input to the inverse transformation module 5410.

The transform unit integration module 5430 may generate feature map information to which sub-sampling is applied.

The functions, operations, and the like of the inverse transformation module 5410, the inverse reordering module 5420, and the transform unit integration module 5430 will be described in more detail below.

Figure 55:
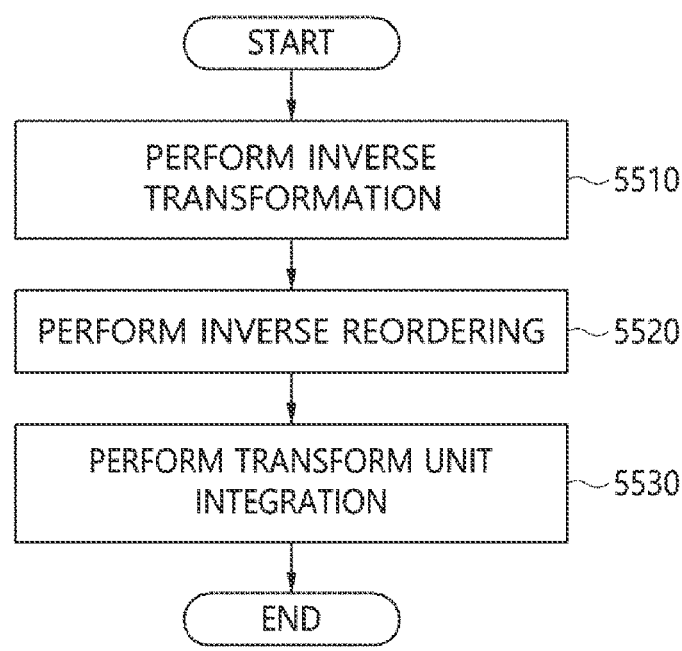
FIG. 55 is a flowchart of an inverse domain transformation method according to an embodiment.

FIG. 55 is a flowchart of an inverse domain transformation method according to an embodiment.

Step 5120, described above with reference to FIG. 51, may include steps 5510, 5520 and 5530.

The order of steps 5510, 5520 and 5530 may be changed. Also, some of steps 5510, 5520 and 5530 may be skipped.

At step 5510, the reconstructed transform coefficient, the reconstructed transform matrix, or the reconstructed matrix index of a transform unit may be input to the inverse transformation module 5410.

The inverse transformation module 5410 performs inverse transformation on the input information, thereby generating a reconstructed transform unit. The inverse transformation module 5410 may output the reconstructed transform unit.

When the inverse transformation module 5410 receives a reconstructed transform coefficient and a reconstructed transform matrix, the inverse transformation module 5410 may generate a reconstructed transform unit by multiplying the reconstructed transform coefficient by the reconstructed transform matrix.

When the inverse transformation module 5410 receives a reconstructed transform coefficient and a reconstructed matrix index, the inverse transformation module 5410 may derive a matrix matching the reconstructed matrix index with reference to a matrix list. The matrix list may be transmitted for and applied to a fixed unit. Alternatively, the matrix list may be transmitted for and applied to a sequence. Alternatively, the matrix list may be transmitted for and applied to a frame.

The inverse transformation module 5410 may generate a reconstructed transform unit by multiplying the matrix derived from the matrix list by the reconstructed transform coefficient.

The inverse transformation module 5410 may inversely transpose the reconstructed transform unit.

The inverse transformation module 5410 may inversely transpose the reconstructed transform unit using transformation information or transposition information transmitted from the feature map information decoder 3820.

The transposition information may indicate transposition applied to one or more axes. The inverse transformation module 5410 may select the axes to which inverse transposition is to be applied using the transposition information, and may inversely transpose the selected axes.

At step 5520, the inverse reordering module 5420 inversely reorders the reconstructed transform unit, thereby changing the form of the reconstructed transform unit. The inverse reordering module 5420 may generate a reconstructed transform unit having a changed form.

Reordering information may include 1) the number of times reordering is performed and 2) information about each type of reordering when multiple types of reordering are performed.

The information about reordering may include 1) the size and shape of a transform unit before a split, 2) the shape of the split transform unit, 3) the number of axes along which the transform unit is split, 4) the ratio of the split, 5) the number of directions along which segments of the split transform unit are concatenated, 6) information indicating the direction along which the segments of the split transform unit are concatenated (e.g., the index of the direction), 7) the scan order in which the segments of the split transform unit are scanned, and the like.

The inverse reordering module 5420 may perform inverse reordering using the reordering information transmitted from the feature map information decoder 3820.

The inverse reordering module 5420 may perform inverse reordering the number of times indicated by the reordering information.

The inverse reordering module 5420 may evenly split the reconstructed transform unit by the size of an inverse reordering unit, thereby generating multiple inverse reordering units.

The inverse reordering module 5420 scans the inverse reordering units according to the scan order and performs inverse reordering thereon according to the order of inverse reordering, thereby generating an inversely reordered reconstructed transform unit.

When inverse reordering is performed, the width, the height, and the channel length of the inversely reordered reconstructed transform unit may satisfy the following conditions.

(width of reconstructed transform unit)<=(width of inversely reordered reconstructed transform unit (after inverse reordering is performed))<(width of reconstructed transform unit+width of inverse reordering unit)

(height of reconstructed transform unit)<=(height of inversely reordered reconstructed transform unit (after inverse reordering is performed))<(height of reconstructed transform unit+height of inverse reordering unit)

(channel length of reconstructed transform unit)<= (channel length of inversely reordered reconstructed transform unit (after inverse reordering is performed))<(channel length of reconstructed transform unit+channel length of inverse reordering unit)

When the width, height, or channel length of the inversely reordered reconstructed transform unit, generated by performing inverse reordering, is greater than the width, height, or channel length of the reconstructed transform unit, the inverse reordering module 5420 crops information at a specific location in the inversely reordered reconstructed transform unit such that the widths, the heights, or the channel lengths of the inversely reordered reconstructed transform unit and the reconstructed transform unit have the same size, thereby generating a cropped inversely reordered reconstructed transform unit.

The information about reordering may include information indicating a scan order. The information indicating the scan order may be an index for a scan order table.

The inverse reordering module 5420 may derive the scan order to be used thereby using the information about reordering. The inverse reordering module 5420 may derive the scan order mapped to the transmitted index from the scan order table.

The information about reordering may include information indicating the order of reordering. The information indicating the order of reordering may be an index for a reordering order table.

The inverse reordering module 5420 may derive the order of inverse reordering to be used thereby using the information about reordering. The inverse reordering module 5420 may derive the order of inverse reordering mapped to the transmitted index from the inverse reordering order table.

Figure 56:
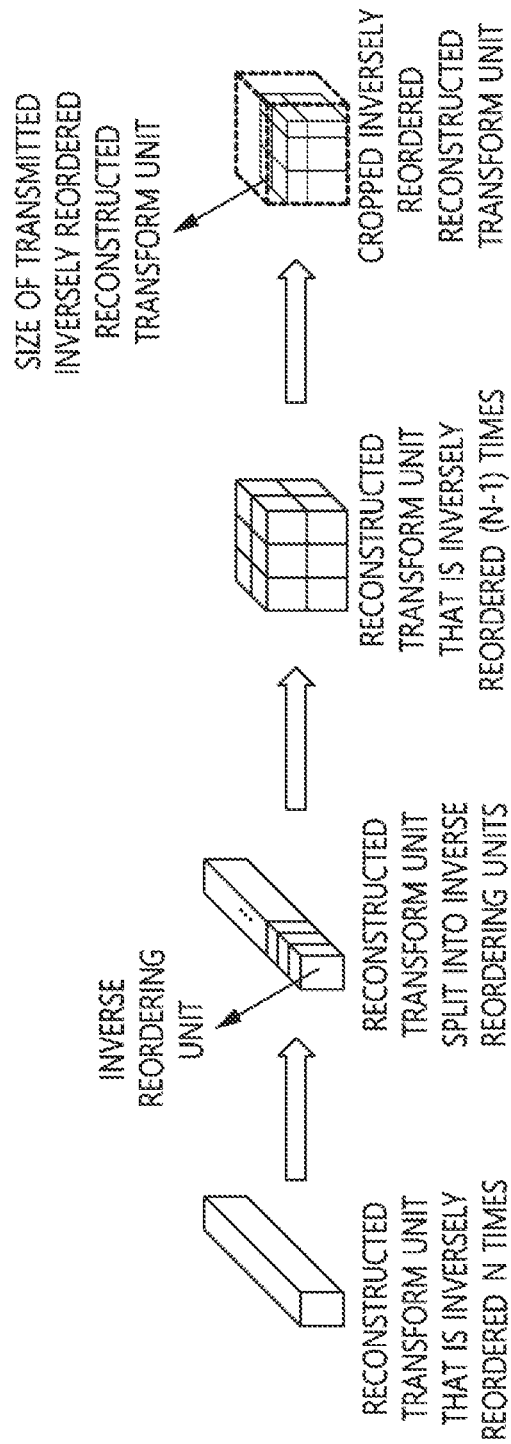
FIG. 56 illustrates an inverse reordering procedure according to an example.

FIG. 56 illustrates an inverse reordering procedure according to an example.

The inverse reordering module 5420 may split the reconstructed transform unit that is inversely reordered N times into inverse reordering units. The inversely reordered unit has a size of N×M×L. N may be a size with respect to a width axis. M may be a size with respect to a height axis. L may be a size with respect to a channel axis.

The inverse reordering module 5420 may scan the inverse reordering units in the order of a channel, a width, and a height or in the order of a channel, a height, and a width.

Through the scan, the inverse reordering module 5420 may inversely reorder the inverse reordering units according to the priority order of width, height and channel such that they match the form of the inversely reordered reconstructed transform unit.

Reference is again to be made to FIG. 55.

At step 5530, the transform unit integration module 5430 consecutively integrates the reconstructed transform units, thereby generating a reconstructed feature map.

The transform unit integration module 5430 consecutively integrates some of the reconstructed transform units, thereby generating a reconstructed feature map.

The transform unit integration module 5430 may output the reconstructed feature map.

The transform unit integration module 5430 may generate a reconstructed feature map using split information transmitted from the feature map information decoder 3820.

The split information may include feature map shape information indicating the shape of a feature map. Also, the split information may include feature map split information indicating the method of splitting a feature map.

Also, the split information may include 1) a transform unit index of each transform unit and 2) coordinates of each transform unit in a feature map.

The transform unit integration module 5430 may split the feature map having the shape indicated by the feature map shape information using the method indicated by the feature map split information. The transform unit integration module 5430 may derive the location of each transform unit in the feature map by splitting the feature map.

The transform unit integration module 5430 may attach the transform units to the feature map according to the sequence of the transform unit indices of the transform units. Here, the coordinates of each transform unit in the feature map may indicate the location thereof in the feature map.

Reference is again to be made to FIG. 51.

At step 5130, the inverse sampler 5030 performs inverse sampling on the inversely transformed information, thereby generating postprocessed reconstructed feature map information.

When it performs inverse sampling on the inversely transformed information, the feature map information postprocessor 3840 may perform inverse sampling in units of channels or in units of feature regions. The inverse sampling may be fixed sampling or non-fixed sampling.

When inverse sampling is performed in units of channels, inverse sampling method information may be used.

The encoded feature map information may include encoded inverse sampling method information. At step 3920, the feature map information decoder 3820 performs decoding on the encoded inverse sampling method information, thereby generating inverse sampling method information. The inverse sampling method information may correspond to the sub-sampling method information of the encoding apparatus 100.

The inverse sampling method information may indicate the type of inverse sampling that is applied to the inversely transformed information. The inverse sampling method information may be an index indicating the inverse sampling method that is applied to the inversely transformed information, among multiple inverse sampling methods.

When fixed sampling is performed on the inversely transformed information, the index indicating the first channel to which inverse sampling is to be applied and a sampling rate may be used. Here, the first channel to which inverse sampling is to be applied may be the first sub-sampled channel in the encoding apparatus 100.

The encoded feature map information may include encoded sampling rate information. At step 3920, the feature map information decoder 3820 performs decoding on the encoded sampling rate information, thereby generating sampling rate information.

The feature map information postprocessor 3840 may arrange the sub-sampled feature map information in units of channels. Here, the arrangement of the sub-sampled feature map information may start from the channel indicated by the index. The arrangement in units of channels may be performed by skipping over channels at an interval of the sampling rate. That is, the arrangement of the sub-sampled feature map information in channels may start from the channel indicated by the index, and may be performed to skip over channels at the interval of the sampling rate.

The values of the channel that is not to be reconstructed (that is, the channel in which the sub-sampled feature map information is not arranged) may be filled with the weighted average of the values of one or more channels adjacent to the channel that is not to be reconstructed.

When non-fixed sampling is performed on the inversely transformed information, the feature map information postprocessor 3840 may arrange the sub-sampled feature map information in the original channel location using sampling criterion information.

The encoded feature map information may include encoded sampling criterion information. At step 3920, the feature map information decoder 3820 performs decoding on the encoded sampling criterion information, thereby generating sampling criterion information.

The sampling criterion information may indicate specific criteria for non-fixed sampling. The sampling criterion information may include the number of sampled channels, the range of the sampled channels, and/or the indices of the sampled channels.

The values of the channel that is not reconstructed (that is, the channel in which the sub-sampled feature map information is not arranged) may be set to a specific value. For example, the specific value may be 0. Alternatively, the values of the channel that is not reconstructed may be set using the weighted average of the values of one or more channels adjacent to the channel that is not reconstructed.

When inverse sampling is performed in units of feature regions, inverse sampling method information may be used.

The encoded feature map information may include encoded inverse sampling method information. At step 3920, the feature map information decoder 3820 performs decoding on the encoded inverse sampling method information, thereby generating inverse sampling method information. The inverse sampling method information may correspond to the sub-sampling method information of the encoding apparatus 100.

The inverse sampling method information may indicate the type of inverse sampling that is applied to the inversely transformed information. The inverse sampling method information may be an index indicating the inverse sampling method that is applied to the inversely transformed information, among multiple inverse sampling methods.

When fixed sampling is performed on the inversely transformed information, the feature map information postprocessor 3840 may perform inverse sampling on the inversely transformed information using specific criteria.

The specific criteria may include a sampling phase and a sampling rate.

The encoded feature map information may include encoded sampling information. The feature map information decoder 3820 performs decoding on the encoded sampling information, thereby generating sampling information. The sampling information may include a sampling rate and a sampling phase.

The feature map information postprocessor 3840 may arrange the sub-sampled feature map information from the sampling phase while maintaining an interval equal to the sampling rate in a horizontal direction and a vertical direction.

The values of the feature that are not reconstructed (that is, the values to which the sub-sampled feature map information is not assigned) may be set to a specific value. For example, the specific value may be 0. Alternatively, the value of the feature that is not reconstructed may be set using the weighted average of the values of one or more features adjacent to the feature.

When non-fixed sampling is performed on the inversely transformed information, the feature map information postprocessor 3840 may perform inverse sampling on the inversely transformed information using sub-sampling region information.

The encoded feature map information may include encoded sub-sampling region information. The feature map information decoder 3820 performs decoding on the encoded sub-sampling region information, thereby generating sub-sampling region information.

The sub-sampling region information may include the number of sub-sampled regions within a channel, the coordinates of the upper-left corner of the sub-sampled region, the width of the sub-sampled region, the height of the sub-sampled region, and the like.

The feature map information postprocessor 3840 may arrange the sub-sampled feature map information in the location specified by inverse sampling using the sub-sampling region information.

The values of the feature that are not reconstructed (that is, the values to which the sub-sampled feature map information is not assigned) may be set to a specific value. For example, the specific value may be 0. Alternatively, the value of the feature that is not reconstructed may be set using the weighted average of the values of one or more features adjacent to the feature.

Figure 57:
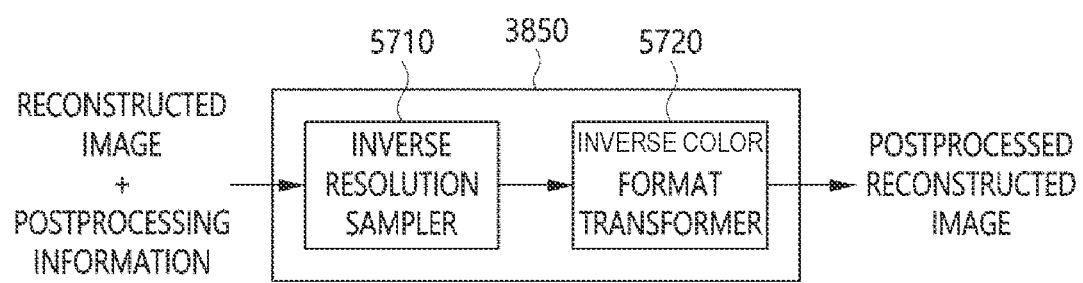
FIG. 57 illustrates the structure of an image information postprocessor according to an example.

FIG. 57 illustrates the structure of an image information postprocessor according to an example.

The image information postprocessor 3850 may include an inverse resolution sampler 5710 and an inverse color format transformer 5720.

Reconstructed image information and image-postprocessing information may be input to the inverse resolution sampler 5710.

The inverse resolution sampler 5710 may generate inversely sampled reconstructed image information.

The inverse color format transformer 5720 may generate postprocessed reconstructed image information.

The functions, operations, and the like of the inverse resolution sampler 5710 and the inverse color format transformer 5720 will be described in more detail below.

Figure 58:
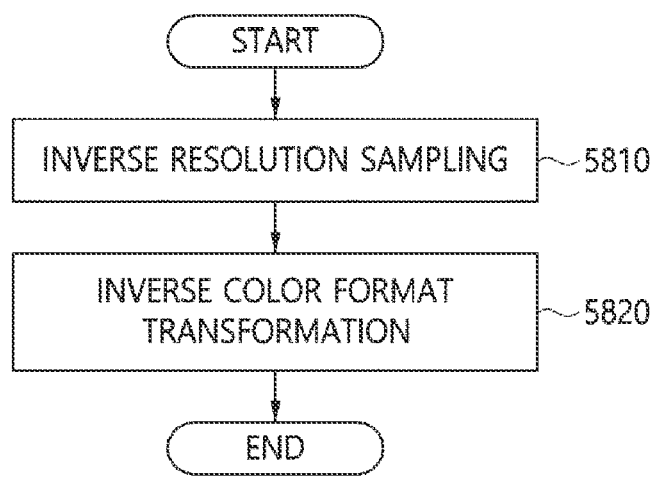
FIG. 58 is a flowchart of a method for postprocessing reconstructed image information according to an embodiment.

FIG. 58 is a flowchart of a method for postprocessing reconstructed image information according to an embodiment.

Step 3950, described above with reference to FIG. 39, may include steps 5810 and 5820. The order of steps 5810 and 5820 may be changed. Also, some of steps 5810 and 5820 may be skipped.

An image information bitstream may include encoded image-postprocessing information. The image information decoder 3810 performs decoding on the encoded image-postprocessing information, thereby generating image-postprocessing information. The image-postprocessing information may correspond to the image-preprocessing information of the encoding apparatus 100.

The image-postprocessing information may indicate whether each of inverse resolution sampling and inverse transformation of a color format is applied. Also, the image-postprocessing information may indicate the order in which inverse transformation of a color format and inverse resolution sampling are performed.

At step 5810, the inverse resolution sampler 5710 performs inverse sampling on the reconstructed image information, thereby generating inversely sampled reconstructed image information.

The inverse resolution sampling at step 5810 may correspond to step 420 described above with reference to FIG. 4.

The inverse resolution sampler 5710 may use inverse resolution sampling information for inverse resolution sampling.

The image information bitstream may include encoded inverse resolution sampling information. The image information decoder 3810 performs decoding on the encoded inverse resolution sampling information, thereby generating inverse resolution sampling information. The inverse resolution sampling information may correspond to the resolution sub-sampling information of the encoding apparatus 100.

The inverse resolution sampling information may include 1) information (or a flag) indicating whether inverse resolution sampling is performed and/or 2) unit information indicating the unit based on which inverse resolution sampling is performed.

For example, the unit information may indicate whether the unit based on which inverse resolution sampling is performed is the entire image or a frame of the image.

The unit information may represent a sampling rate. For example, the sampling rate may be 50% of the resolution or 75% of the resolution.

The inverse resolution sampler 5710 may perform inverse resolution sampling on the unit of processing according to the sampling rate.

At step 5820, the inverse color format transformer 5720 performs inverse color format transformation on the inversely sampled reconstructed image information, thereby generating postprocessed reconstructed image information.

The inverse color format transformer 5720 may perform inverse color format transformation on the inversely sampled reconstructed image information using inverse color format transformation information.

The image information bitstream may include encoded inverse color format transformation information. The image information decoder 3810 performs decoding on the encoded inverse color format transformation information, thereby generating inverse color format transformation information. The inverse color format transformation information may correspond to the color format transformation information of the encoding apparatus 100.

The inverse color format transformation information may include 1) information (or a flag) indicating whether inverse transformation of a color format is performed and/or 2) information representing color formats.

The color formats may include a color format before inverse transformation and a color format after inverse transformation.

The inverse color format transformer 5720 may perform inverse transformation of the color format of a unit corresponding to the entire image or a frame of the image using the inverse color format transformation information.

For example, when the inverse color format transformation information indicates that inverse transformation of the color format is to be performed and that transformation from an RGB color format to a YCbCr color format has been performed in the encoding apparatus 100, the inverse color format transformer 5720 may perform inverse transformation from the YCbCr color format to the RGB color format.

Syntax

The syntax expressions described with reference to FIGS. 59 to 63 below may be parsed by the domain transformer 520 or the like. A combination of one or more of the syntax expressions described with reference to FIGS. 59 to 63 may be parsed by the domain transformer 520 or the like.

The names of the syntax expressions described with reference to FIGS. 59 to 63 are examples, and may be changed. Also, another syntax expression that is additionally parsed may be present, in addition to the syntax expressions described with reference to FIGS. 59 to 63.

FIG. 59 illustrates the syntax of a prediction unit according to an example.

PredictionUnit may indicate the above-described prediction block.

prediction_type may indicate the prediction type of the prediction block. prediction_type may indicate one of intra-prediction, inter-prediction, and intra-block prediction.

num_of_predictor may indicate the number of prediction blocks.

ref_pic_idx may indicate an index for a reference frame that is referenced in order to generate a prediction block when inter-prediction is used for the current block.

packing_unit_idx may indicate the index of the packing unit that is referenced in a packing unit list in order to generate a prediction block.

motion_vector may indicate a motion vector for generating a prediction block.

FIG. 60 indicates the syntax of a video frame feature information parameter set according to an example.

Video_Frame_Feature_Info_Parameter_Set may indicate a video frame feature information parameter set.

featuremap_num may indicate the number of pieces of feature map information generated in a single input frame.

featuremap_idx may indicate an index for feature map information.

transform flag may indicate whether transformation is performed on feature map information.

matrix_flag may indicate whether a transform matrix is transmitted.

matrix_width may indicate the width of a transform matrix.

matrix_height may indicate the height of a transform matrix.

matrix_depth may indicate the depth of a transform matrix.

mean_channel_flag may indicate whether a mean channel is transmitted.

mean_channel_width may indicate the width of a mean channel.

mean_channel_height may indicate the height of a mean channel.

mean_channel_depth may indicate the depth of a mean channel.

coef_width may indicate the width of a transform coefficient.

coef_height may indicate the height of a transform coefficient.

coef_depth may indicate the depth of a transform coefficient.

featuremap_width may indicate the width of feature map information.

featuremap_height may indicate the height of feature map information.

featuremap_depth may indicate the depth of feature map information.

Figure 61:
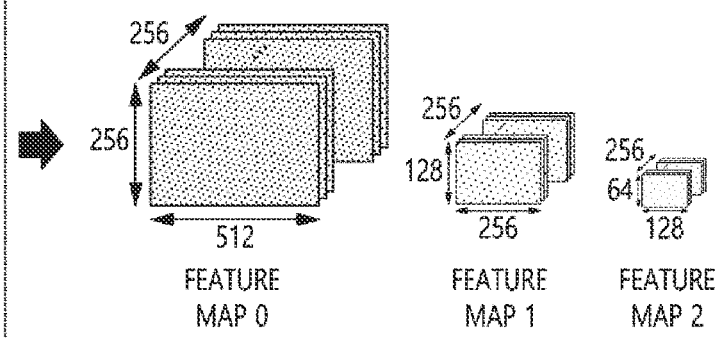
FIG. 61 illustrates feature maps configured using a video fame feature information parameter set according to an example.

FIG. 61 illustrates feature maps configured using a video frame feature information parameter set according to an example.

FIG. 62 illustrates the syntax of a video frame feature parameter set according to an example.

feature_frame_width may indicate the width of a feature frame after packing is applied.

feature_frame_height may indicate the height of a feature frame after packing is applied.

same_category_flag may indicate whether all packing units in a feature frame are included in the same category.

packing_unit_category_num may indicate the number of different categories of packing units in a feature frame.

input_domain_info may indicate domain information of input information.

packing_unit_num may indicate the number of packing units in a feature frame.

reordering_flag may indicate whether reordering is performed.

reordering_index may indicate an index for each packing unit for performing reordering when reordering is performed.

featuremap_level may indicate the feature map level in which a packing unit is included.

transform_data type may indicate one of a transform matrix, a transform coefficient, and a mean channel when a packing unit is transformed information.

start_idx may indicate the start index of a packing unit included in a current feature frame, among packing units included in the same category.

end_idx may indicate the last index of a packing unit included in a current feature frame, among packing units included in the same category.

Figure 63:
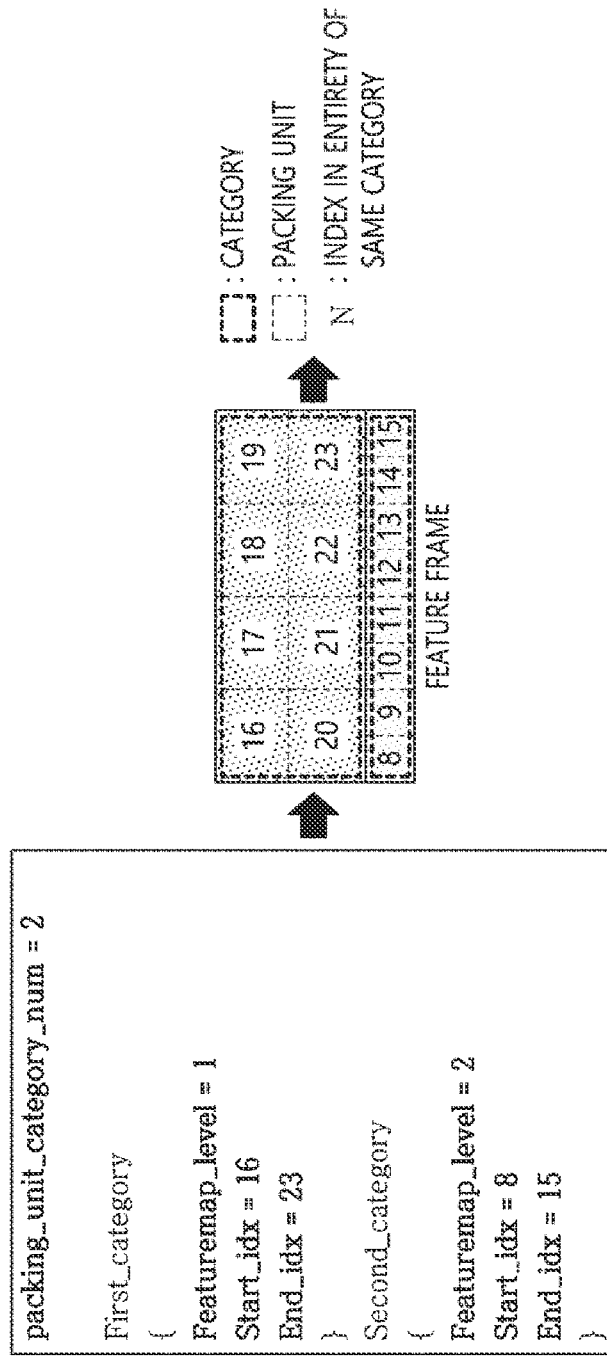
FIG. 63 illustrates a feature frame configured using a video frame feature parameter set according to an example.

FIG. 63 illustrates a feature frame configured using a video frame feature parameter set according to an example.

Through the above-described embodiments, feature map information and image information may be split using a specific method, and may be reordered and packed into a form facilitating the procedures of encoding and decoding through such a split. Also, efficient prediction may be performed for reordering and packing.

Figure 64:
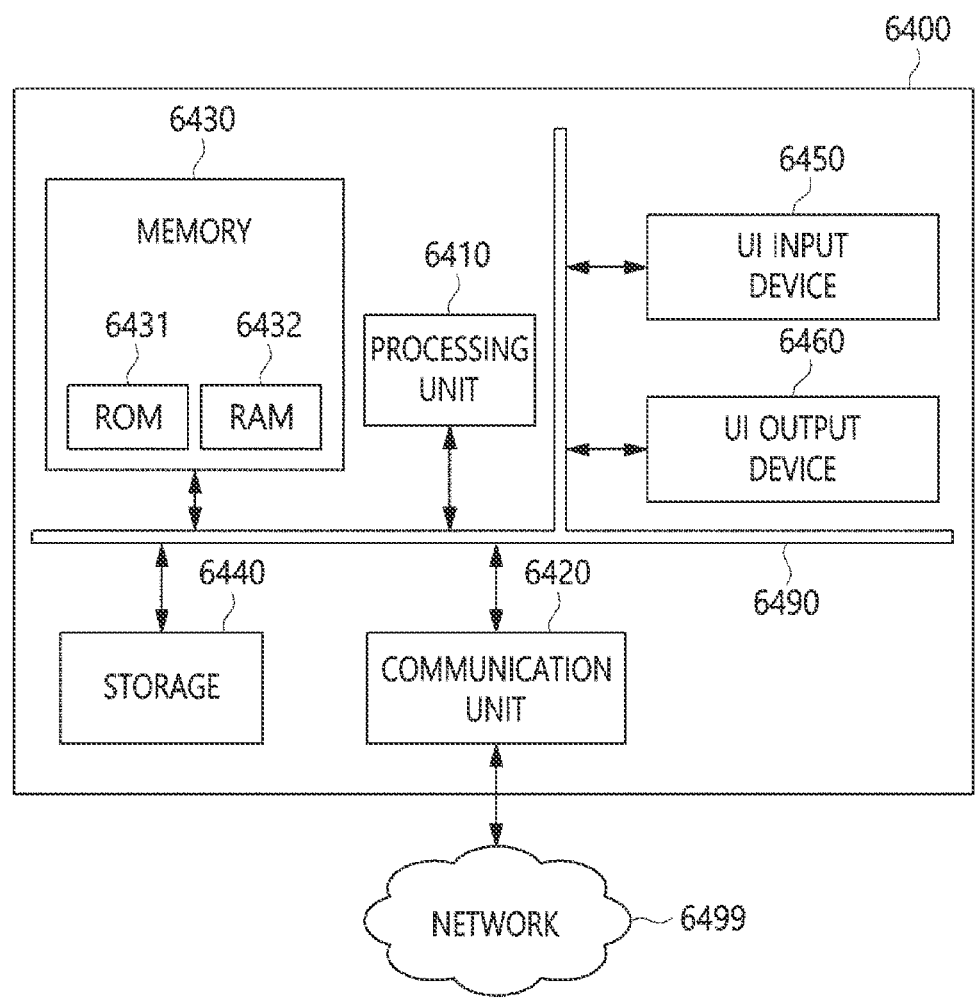
FIG. 64 illustrates an electronic device for implementing an encoding apparatus according to an embodiment.

FIG. 64 illustrates an electronic device for implementing an encoding apparatus according to an embodiment.

The encoding apparatus 100 may be implemented as the electronic device 6400 illustrated in FIG. 64. The electronic device 6400 may be a general-purpose computer system that operates as the encoding apparatus 100.

As illustrated in FIG. 64, the electronic device 6400 may include at least some of a processing unit 6410, a communication unit 6420, memory 6430, storage 6440, and a bus 6490. The components of the electronic device 6400, such as the processing unit 6410, the communication unit 6420, the memory 6430, the storage 6440, and the like, may communicate with each other via the bus 6490.

The processing unit 6410 may be a semiconductor device for executing processing instructions stored in the memory 6430 or the storage 6440. For example, the processing unit 6410 may be at least one hardware processor.

The processing unit 6410 may process tasks required for the operation of the electronic device 6400. The processing unit 6410 may execute code pertaining to the operations or steps of the processing unit 6410 described in the embodiments.

The processing unit 6410 may include an image information preprocessor 110, an image information encoder 120, a feature map information extractor 130, a feature map information preprocessor 140, a frame packer 150, a frame classifier 160, and a feature map information encoder 170.

The communication unit 6420 may be connected to a network 6499. The communication unit 6420 may receive data or information required for the operation of the electronic device 6400, and may transmit data or information required for the operation of the electronic device 6400. The communication unit 6420 may transmit data to other devices and receive data from other devices via the network 6499. For example, the communication unit 6420 may be a network chip or a port.

The communication unit 6420 may transmit an image information bitstream and a feature map information bitstream to a decoding apparatus 3800. The communication unit 6420 may receive feedback information from the decoding apparatus 3800.

The memory 6430 and the storage 6440 may be any of various types of volatile or nonvolatile storage media. For example, the memory 6430 may include at least one of ROM 6431 and RAM 6432. The storage 6440 may include internal storage media, such as RAM, flash memory, a hard disk, and the like, and detachable storage media, such a memory card and the like.

The function or operation of the electronic device 6400 may be performed when the processing unit 6410 executes at least one program module. The memory 6430 and/or the storage 6440 may store at least one program module. The at least one program module may be configured to be executed by the processing unit 6410.

At least part of the above-described encoding apparatus 100 may be at least one program module.

Program modules in the form of an operating system, an application module, a library, and other program modules may be included in the electronic device 6400, and may be physically stored in various known storage devices. Also, at least some of the program modules may be stored in a remote storage device that is capable of communicating with the electronic device 6400. Meanwhile, the program modules may include a routine, a subroutine, a program, an object, a component, a data structure, and the like for performing a specific operation or task or implementing a specific abstract data type according to an embodiment, but the program modules are not limited thereto.

The electronic device 6400 may further include a user interface (UI) input device 6450 and a UI output device 6460. The UI input device 6450 may receive user input required for the operation of the electronic device 6400. The UI output device 6460 may output information or data based on the operation of the electronic device 6400.

Figure 65:
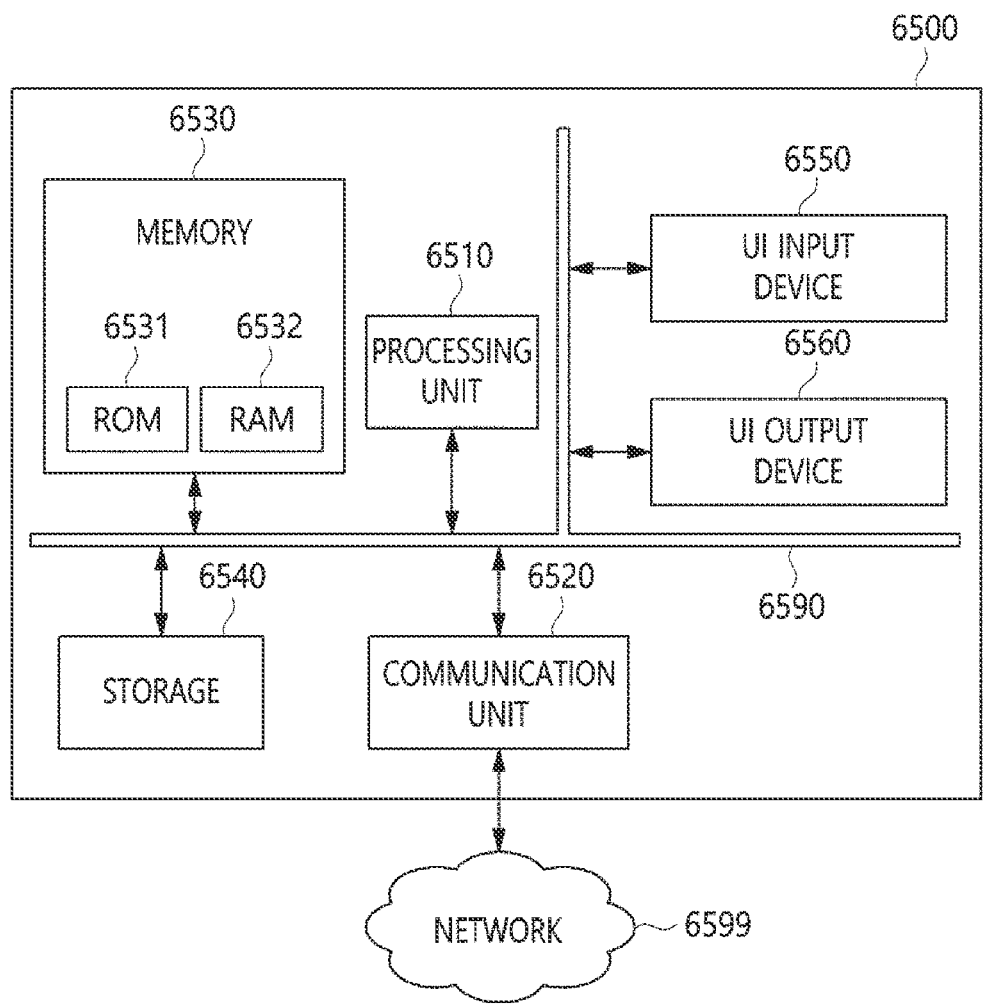
FIG. 65 illustrates an electronic device for implementing a decoding apparatus according to an embodiment.

FIG. 65 illustrates an electronic device for implementing a decoding apparatus according to an embodiment.

The decoding apparatus 3800 may be implemented as the electronic device 6500 illustrated in FIG. 65. The electronic device 6500 may be a general-purpose computer system that operates as the decoding apparatus 3800.

As illustrated in FIG. 65, the electronic device 6500 may include at least some of a processing unit 6510, a communication unit 6520, memory 6530, storage 6540, and a bus 6590. The components of the electronic device 6500, such as the processing unit 6510, the communication unit 6520, the memory 6530, the storage 6540, and the like, may communicate with each other via the bus 6590.

The processing unit 6510 may be a semiconductor device for executing processing instructions stored in the memory 6530 or the storage 6540. For example, the processing unit 6510 may be at least one hardware processor.

The processing unit 6510 may process tasks required for the operation of the electronic device 6500. The processing unit 6510 may execute code pertaining to the operations or steps of the processing unit 6510 described in the embodiments.

The processing unit 6510 may include an image information decoder 3810, a feature map information decoder 3820, a frame depacker 3830, a feature map information postprocessor 3840, an image information postprocessor 3850, and a machine-learning processor 3860.

The communication unit 6520 may be connected to a network 6599. The communication unit 6520 may receive data or information required for the operation of the electronic device 6500, and may transmit data or information required for the operation of the electronic device 6500. The communication unit 6520 may transmit data to other devices and receive data from other devices via the network 6599. For example, the communication unit 6520 may be a network chip or a port.

The communication unit 6520 may receive an image information bitstream and a feature map information bitstream from an encoding apparatus 100. The communication unit 6520 may transmit feedback information to the encoding apparatus 100.

The memory 6530 and the storage 6540 may be any of various types of volatile or nonvolatile storage media. For example, the memory 6530 may include at least one of ROM 6531 and RAM 6532. The storage 6540 may include internal storage media, such as RAM, flash memory, a hard disk, and the like, and detachable storage media, such a memory card and the like.

The function or operation of the electronic device 6500 may be performed when the processing unit 6510 executes at least one program module. The memory 6530 and/or the storage 6540 may store at least one program module. The at least one program module may be configured to be executed by the processing unit 6510.

At least part of the above-described decoding apparatus 3800 may be at least one program module.

Program modules in the form of an operating system, an application module, a library, and other program modules may be included in the electronic device 6500, and may be physically stored in various known storage devices. Also, at least some of the program modules may be stored in a remote storage device that is capable of communicating with the electronic device 6500. Meanwhile, the program modules may include a routine, a subroutine, a program, an object, a component, a data structure, and the like for performing a specific operation or task or implementing a specific abstract data type according to an embodiment, but the program modules are not limited thereto.

The electronic device 6500 may further include a user interface (UI) input device 6550 and a UI output device 6560. The UI input device 6550 may receive user input required for the operation of the electronic device 6500. The UI output device 6560 may output information or data based on the operation of the electronic device 6500.

The above-described embodiments may be performed using a method that is the same as or corresponds to the methods used in the encoding apparatus 100 and the decoding apparatus 3800. Also, a combination of one or more of the above-described embodiments may be used for encoding and/or decoding of an image.

The order in which the above-described embodiments are applied in the encoding apparatus 100 may be different from that in the decoding apparatus 3800. Alternatively, the order in which the above-described embodiments are applied in the encoding apparatus 100 and that in the decoding apparatus 3800 may be (at least partially) the same as each other.

The above-described embodiments may be performed separately on each of a luma signal and a chroma signal. The above-described embodiments may be equally performed on the luma signal and the chroma signal.

In the above-described embodiments, it may be construed that, when specified processing is applied to a specified target, specified conditions may be required. Also, it may be construed that, when a description is made such that the specified processing is performed under a specified decision, whether the specified conditions are satisfied may be determined based on a specified coding parameter and that, alternatively, when a description is made such that a specified decision is made based on a specified coding parameter, the specified coding parameter may be replaced with an additional coding parameter. In other words, it may be considered that a coding parameter that influences the specified condition or the specified decision is merely exemplary, and it may be understood that, in addition to the specified coding parameter, a combination of one or more other coding parameters may function as the specified coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented as program instructions that can be executed by various computer means and may be recorded on a computer-readable storage medium. The computer-readable storage medium may include program instructions, data files, and data structures, either solely or in combination. Program instructions recorded on the computer-readable storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

Provided are an apparatus, method, system, and recording medium for reordering and packing feature map information and image information in a form for input to an encoding apparatus.

Provided are an apparatus, method, system, and recording medium for predicting information generated by reordering and packing.

Provided are an apparatus, method, system, and recording medium for splitting feature map information and image information.

Provided are an apparatus, method, system, and recording medium for reordering and packing information, generated by splitting feature map information and image information, into a form facilitating an encoding procedure.

Provided are an apparatus, method, system, and recording medium for encoding information, generated by reordering and packing, by predicting the information.

Provided are an apparatus, method, system, and recording medium for generating a bitstream by encoding information generated by reordering and packing and for storing and transmitting the bitstream.

Provided are an apparatus, method, system, and recording medium for receiving a bitstream, decoding the received bitstream, and performing depacking and inverse reordering using information transmitted through the bitstream.

Provided are an apparatus, method, system, and recording medium for using the results of depacking and inverse reordering for a machine-learning task performed by a neural network.

As described above, although the present disclosure has been described based on specific details such as detailed components and a limited number of embodiments and drawings, the embodiments are merely provided for easy understanding of the entire disclosure, the present disclosure is not limited thereto, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. An encoding method, comprising:
generating feature map information based on image information;
performing reordering of the feature map information into a reordering unit; and
performing packing of the feature map information to which the reordering is applied, wherein the packing comprises:
splitting multi-dimensional information based on a specific axis of the multi-dimensional information; and
concatenating pieces of information generated by the splitting in a specific order to configure a frame.

2. The encoding method of claim 1,
wherein the reordering is performed based on the specific axis of the multi-dimensional information.

3. The encoding method of claim 1,
wherein the frame is configured to have a rectangular shape by padding for the frame in a case that the frame does not have a rectangular shape.

4. The encoding method of claim 1, further comprising:
generating a feature map information bitstream by performing encoding on the frame,
wherein when the encoding is performed, inter-prediction using a reconstructed frame is performed, whereby a prediction block for a current block of a current frame is generated.

5. The encoding method of claim 4,
the reconstructed frame is a frame to which packing is applied.

6. The encoding method of claim 4, wherein:
a first location corresponding to the current block is acquired in a reconstructed frame,
a second location corresponding to the current block in a second packing unit having the same category as a category of a first packing unit comprising the current block is derived in a specific region determined based on the acquired first location, and
the prediction block is generated with reference to the derived second location.

7. The encoding method of claim 6, wherein:
a scale of the first packing unit is derived through a comparison with the second packing unit, and
the corresponding second location is derived in consideration of the scale.

8. The encoding method of claim 4, wherein:
one or more prediction blocks are searched for in the reconstructed frame, and
the prediction block is generated through weighted addition of the one or more prediction blocks.

9. The encoding method of claim 8, wherein:
a weight of the weighted addition is determined based on a distance or a picture order count between a current frame comprising the current block and the reconstructed frame comprising the prediction block.

10. The encoding method of claim 8, wherein:
filtering is performed for the one or more prediction blocks.

11. The encoding method of claim 1, further comprising:
generating a feature map information bitstream by performing encoding on the frame, wherein
when the encoding is performed, a prediction block for the current block is generated by performing intra block prediction using already reconstructed information of the frame including a current block.

12. The encoding method of claim 11, wherein:
a size of a packing unit of the packing is w×h, and
when the prediction block is searched for, a size of a vertical motion vector of a block motion vector indicating the prediction block is integer multiples of w, and a size of a horizontal motion vector of the block motion vector is integer multiples of h.

13. The encoding method of claim 12, wherein:
searching of a region is limited in a case that a packing unit comprising the region having an already reconstructed information accessed through the block motion vector is different from a packing unit comprising the current block.

14. The encoding method of claim 11, wherein:
a size of the prediction block is determined based on a first scale and a second scale in a case the first scale of a packing unit having an already reconstructed information accessed through the block motion vector is different from the second scale of a packing unit comprising the current block.

15. The encoding method of claim 11, wherein:
a correction for the prediction block is performed based on an error between specific samples of the current block and a mapping function using specific samples of the prediction block.

16. The encoding method of claim 11, wherein:
one or more prediction blocks are searched for in the frame, and
the prediction block is generated through weighted addition of the one or more prediction blocks.

17. A decoding method, comprising:
generating reconstructed feature map information by performing decoding on encoded feature map information of a feature map information bitstream; and
generating postprocessed reconstructed feature map information by performing postprocessing on the reconstructed feature map information, wherein:
depacking of a frame of the reconstructed feature map information is performed to generate multi-dimensional information of the reconstructed feature map information,
the frame is a concatenation of pieces of split information in a specific order,
the pieces of split information correspond to a result of splitting multi-dimensional information based on a specific axis of the multi-dimensional information, and
inverse-reordering on the multi-dimensional information is performed.

18. A non-transitory computer-readable recoding medium for storing a bitstream, the bitstream comprising:
encoded feature map information, wherein:
reconstructed feature map information is generated by performing decoding on the encoded feature map information,
postprocessed reconstructed feature map information is generated by performing postprocessing on the reconstructed feature map information,
depacking of a frame of the reconstructed feature map information is performed to generate multi-dimensional information of the reconstructed feature map information,
the frame is a concatenation of pieces of split information in a specific order,
the pieces of split information correspond to a result of splitting multi-dimensional information based on a specific axis of the multi-dimensional information, and
inverse-reordering on the multi-dimensional information is performed.

* * * * *